「12」 United States Patent
Zandi et al.

(10) Patent No.: US 6,219,458 B1
(45) Date of Patent: Apr. 17, 2001

(54) OVERLAPPED REVERSIBLE TRANSFORMS FOR UNIFIED LOSSLESS/LOSSY COMPRESSION

(75) Inventors: Ahmad Zandi, Cupertino; Edward L. Schwartz, Sunnyvale, both of CA (US)

(73) Assignees: Ricoh Co., Ltd., Tokyo (JP); Ricoh Corporation, Menlo Park, CA (US)

( * ) Notice: Subject to any disclaimer, the term of this patent is extended or adjusted under 35 U.S.C. 154(b) by 0 days.

(21) Appl. No.: 09/364,854

(22) Filed: Jul. 30, 1999

Related U.S. Application Data

(62) Division of application No. 08/784,366, filed on Jan. 17, 1997, now Pat. No. 5,999,656.

(51) Int. Cl.[7] ............................ G06K 9/36; G06K 9/46; G06F 15/316
(52) U.S. Cl. ..................... 382/248; 382/232; 382/278
(58) Field of Search .................... 382/232, 240, 382/248, 239, 244, 276, 277; 358/261.3, 539, 432, 433, 426; 348/395, 398, 400, 403, 420, 437; 364/715.02, 724.011; 708/300, 301, 308, 400

(56) References Cited

U.S. PATENT DOCUMENTS

| | | | | |
|---|---|---|---|---|
| 4,633,386 | * | 12/1986 | Terepin | 710/132 |
| 5,561,616 | * | 10/1996 | Slavin | 364/724.01 |
| 6,018,753 | * | 1/2000 | Kovacevic et al. | 708/313 |

OTHER PUBLICATIONS

A. Zandi et al., "CREW: Compression with Reversible Embedded Wavelets", Proceedings DCC '95 Data Compression Conference, pp. 212–221, Snowbird, UT, Mar. 28–30, 1995, IEEE Comput. Soc. Press.*

* cited by examiner

Primary Examiner—Leo Boudreau
Assistant Examiner—Dmitry A. Novik
(74) Attorney, Agent, or Firm—Blakely, Sokoloff, Taylor & Zafman LLP

(57) ABSTRACT

Recently, a number of reversible wavelet transforms have been identified which allow for exact reconstruction in integer arithmetic. Different transforms vary in how rounding is performed. The present invention provides a transform, which is linear except for the rounding with non-linear operations in order to create a reversible implementation. Also, the present invention also provides transforms which are decomposed into all FIR parts.

20 Claims, 20 Drawing Sheets

| $S_N$ | | $S_{N+2}$ | | $M_K=U?$ |
|---|---|---|---|---|
| 1 | 0 | 1 | 0 | |
| 0 | 0 | 0 | 0 | 0 |
| 0 | 0 | 0 | 1 | 0 |
| 0 | 0 | 1 | 0 | 1 |
| 0 | 0 | 1 | 1 | 0 |
| 0 | 1 | 0 | 0 | 0 |
| 0 | 1 | 0 | 1 | 0 |
| 0 | 1 | 1 | 0 | 0 |
| 0 | 1 | 1 | 1 | 1 |
| 1 | 0 | 0 | 0 | 1 |
| 1 | 0 | 0 | 1 | 0 |
| 1 | 0 | 1 | 0 | 0 |
| 1 | 0 | 1 | 1 | 0 |
| 1 | 1 | 0 | 0 | 0 |
| 1 | 1 | 0 | 1 | 1 |
| 1 | 1 | 1 | 0 | 0 |
| 1 | 1 | 1 | 1 | 0 |

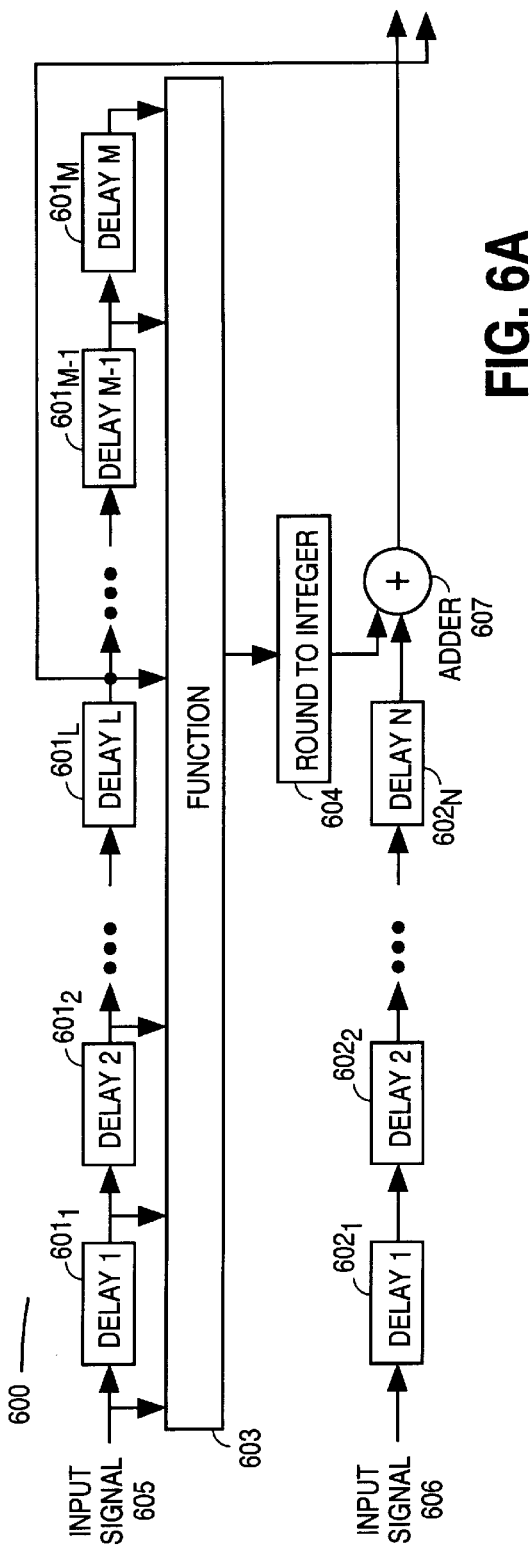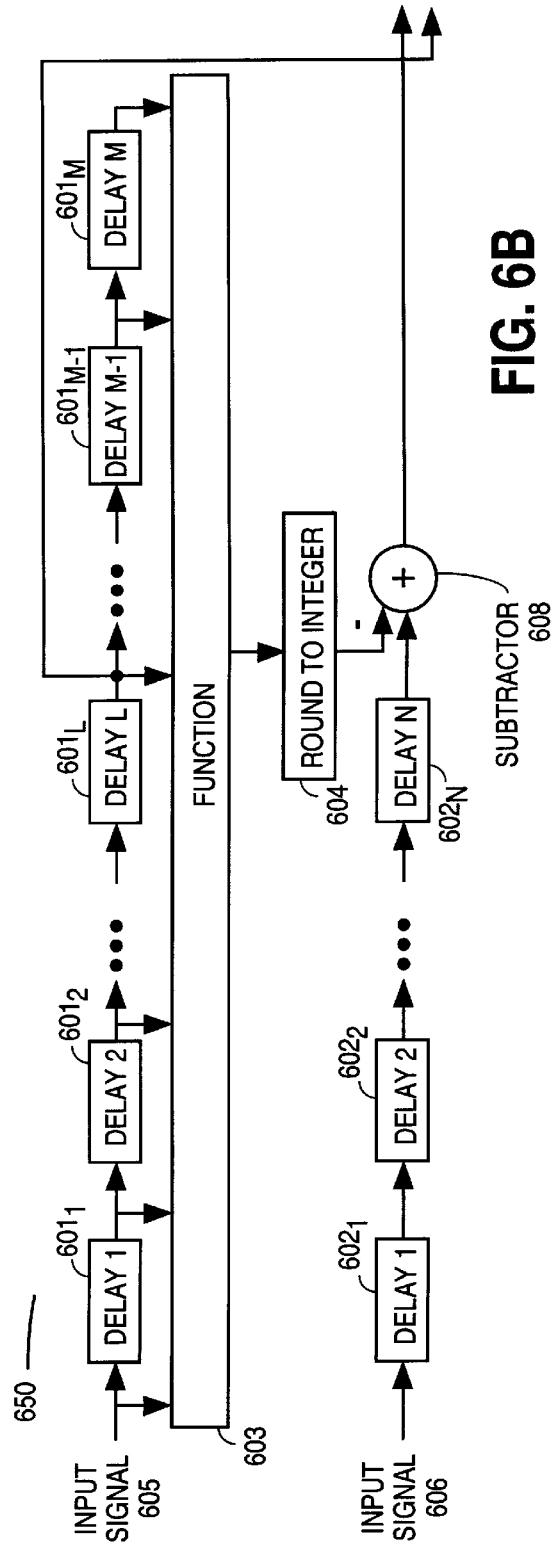

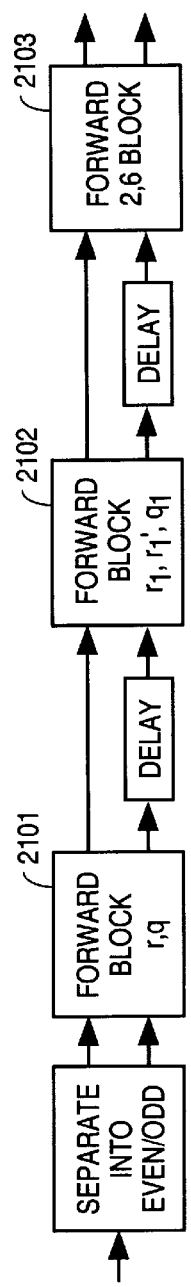
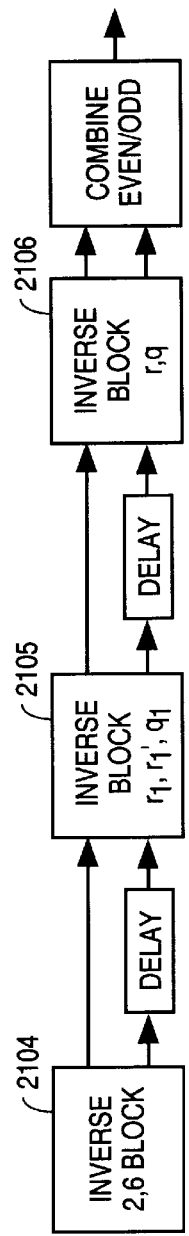
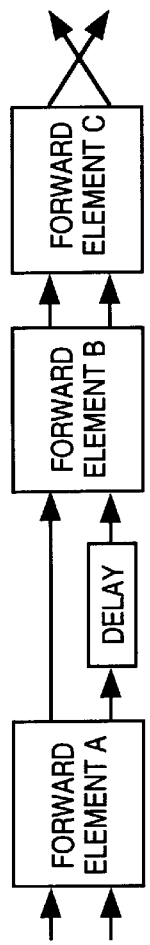
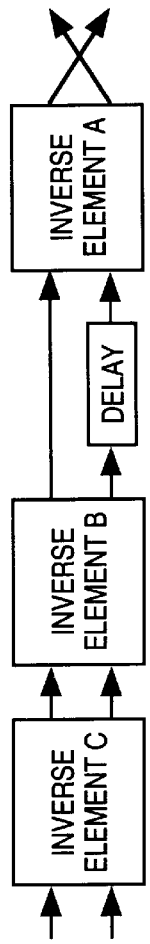
FIG. 21A
FIG. 21B
FIG. 22A
FIG. 22B

OVERLAPPED REVERSIBLE TRANSFORMS FOR UNIFIED LOSSLESS/LOSSY COMPRESSION

This is a divisional U.S. patent application Ser. No. 08/784,366 filed on Jan. 17, 1997, now U.S. Pat. No. 5,999,656.

FIELD OF THE INVENTION

The present invention relates to the field of data compression and decompression systems; particularly, the present invention relates to overlapped transforms which are both reversible and efficient, including filters which may be decomposed such that all parts of an implementation are finite impulse response (FIR).

BACKGROUND OF THE INVENTION

Many different data compression techniques exist in the prior art. Compression techniques can be divided into two broad categories, lossy coding and lossless coding. Lossy coding involves coding that results in the loss of information, such that there is no guarantee of perfect reconstruction of the original data. The goal of lossy compression is that changes to the original data are done in such a way that they are not objectionable or detectable. In lossless compression, all the information is retained and the data is compressed in a manner which allows for perfect reconstruction. Lossless coding methods include dictionary methods of coding (e.g., Lempel-Ziv), run length coding, enumerative coding and entropy coding.

Recent developments in image signal processing continue to focus attention on a need for efficient and accurate forms of data compression coding. Various forms of transform or pyramidal signal processing have been proposed, including multi-resolution pyramidal processing and wavelet pyramidal processing. These forms are also referred to as subband processing and hierarchical processing. Wavelet pyramidal processing of image data is a specific type of multi-resolution pyramidal processing that may use quadrature mirror filters (QMFs) to produce subband decomposition of an original image. Note that other types of non-QNF wavelets exist For more information on wavelet processing, see Antonini, M., et al., "Image Coding Using Wavelet Transform", *IEEE Transactions on Image Processing*, Vol. 1, No. 2, April 1992; Shapiro, J., "An Embedded Hierarchical Image Coder Using Zerotrees of Wavelet Coefficients", *Proc. IEEE Data Compression Conference*, pgs. 214–223, 1993.

A wavelet transform which is implemented with integer arithmetic that has exact reconstruction is referred to as reversible transform. Examples of reversible wavelet transforms are shown in the CREW wavelet compression system, such as described in Edward L. Schwartz, Ahmad Zandi, Martin Boliek, "Implementation of Compression with Reversible Embedded Wavelets," Proc. of SPIE 40th Annual Meeting, vol. 2564, San Diego, Calif., July 1995.

A reversible implementation of the LeGall-Tabatabai 5,3 filters was discovered. See S. Komatsu, K. Sezaki, and Y. Yasuda, "Reversible Sub-band Coding Method of Light/Dark Images", *Electronic Information Communication Research Dissertation D*-11, vol. J78-D-II, no. 3, pp. 429–436, 1995. This implementation has growth in the size of the low pass (smooth) coefficients, which is undesirable, particularly for applications having multiple pyramidal decompositions. See also K. Irie and R. Kishimoto, "A Study on Perfect Reconstruction Subband Coding", *IEEE Trans. Circuits Syst.*, vol. 1, no. 1, pp. 42–48, 1991, and C. Lu, N. Omar, and Y. Zhang, "A Modified Short-Kernal Filter Pair for Perfect Reconstruction of HDTV Signals", *IEEE Trans. Circuits Syst.*, vol. 3, no. 2, pp. 162–164, 1993.

Said and Pearlman created a number of reversible transforms. They start with the simple S-transform and predict high pass coefficients with other known information to create larger transforms. Although not apparent, Said and Pearlman use a "predictor A" that is essentially the TS-transform. For more information, see A. Said and W. Pearlman, "Reversible Image Compression Via Multiresolution Representation and Predictive Coding", in *Visual Communications and Image Processing*, vol. 2094, pp. 664–674, SPIE, November 1993.

Overlapped transforms such as wavelet filter pairs are well-known in the art of lossy image compression. For lossy image compression, when the output of a non-overlapped transform is quantized, discontinuities between adjacent transform basis vectors often result in undesirable artifacts. Overlapped transforms do not have these discontinuities, resulting in better lossy compression. However, such transforms are not used in lossless compression because they are either inefficient or not reversible, or both. It is desirable to utilize overlapped transforms in lossless compression systems.

Polyphase decompositions and ladder filters are known in the art. Ladder filters are a cascade of ladder steps, in which each ladder step performs an operation on a two dimensional vector. Prior art ladder filter methods provide a reversible decomposition of overlapped filters. For example, see F. Bruckers & A. van den Enden, "New Networks for Perfect Inversion and Perfect Reconstruction," IEEE Journal on Selected Areas in Communications, Vol. 10, No. 1 (IEEE 1992). However, the reversible decomposition using ladder filter methods may be infinite impulse response (IIR). IIR decompositions may result in systems that cannot be implemented. Furthermore, IIR decomposition may require the use of intermediate values that grow without bound. The storage and processing of values without bound is clearly impractical. On the other hand, finite impulse response (FIR) implementations require finite storage and processing and, therefore, are practical. Thus, what is needed is a ladder filter decomposition that results in an FIR implementation.

The present invention provides overlapped transforms which are both reversible and efficient so that the transform may be used for both lossy and lossless compression. Furthermore, the present invention also provides filters and methods for decomposing filters such that all parts of an implementation are finite impulse response (FIR). This provides for long reversible, efficient filters.

SUMMARY OF THE INVENTION

A system for compression and/or decompression is described. An apparatus that may be used in the system comprises a wavelet transform and an encoding unit. The wavelet transform has dynamically selectable non-linearities to maintain reversibility. The encoding unit has an input that receives coefficients from the wavelet transform and outputs compressed data.

The present invention also provides an apparatus for transforming an input signal. In one embodiment, the apparatus comprises a separation unit and a set of forward transforms. The separation unit separates the input into even and odd samples. The set of forward transforms are reversible and are coupled in a finite impulse response (FIR) ladder configuration as ladder filter elements. The set of forward reversible transforms have integer inputs and outputs, and the transform is such that it has no redundancy in the least significant bits of the output.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 6A and 6B are block diagrams of one embodiment of ladder filter elements for a forward and inverse transforms respectively.

FIGS. 21A and 21B illustrate an embodiment of the forward and inverse decomposed filters, respectively, of the 6,10 irrational transform using 2,6 blocks respectively.

FIGS. 22A and 22B are block diagrams of one embodiment of the forward and inverse even filter decomposition block, respectively.

DETAILED DESCRIPTION OF THE INVENTION

Figure 1:
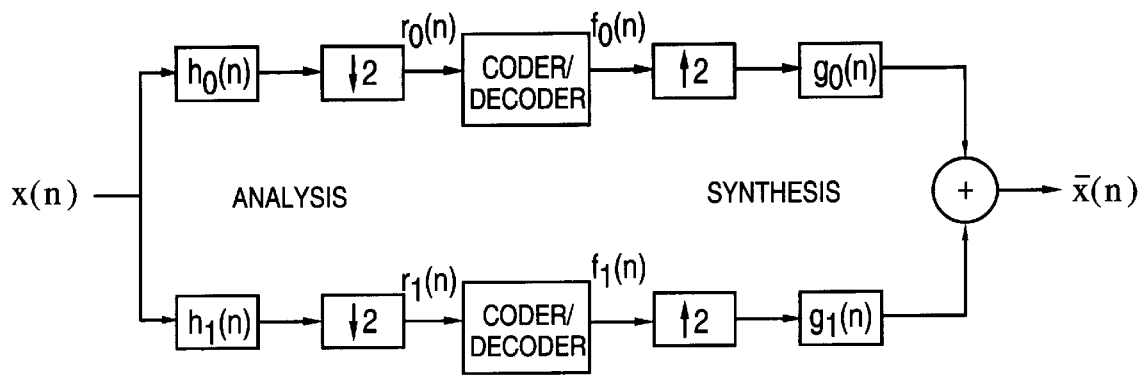
FIG. 1 is a block diagram of a wavelet analysis/synthesis system.

Wavelet transforms that are reversible and efficient is described. In the following detailed description of the present invention numerous specific details are set forth, such as, numbers of bits, signal names, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "cakulating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

The following terms are used in the description that follows. A definition has been included for these various terms. However, the definition provided should not be considered limiting to the extent that the terms are known in the art. These definitions are provided to help in the understanding of the present invention.

Overlapped Transform:

A transform where a single source sample point contributes to multiple coefficients of the same frequency. Examples include many wavelets and the Lapped Orthogonal Transform.

Reversible Transform:

An efficient transform implemented with integer arithmetic that has exact reconstruction.

TS-transform:

Two-Six transform, a specific wavelet filter pair with a 2-tap low pass and a 6-tap high pass filter.

Wavelet Filters:

The high and low pass synthesis and analysis filters used in wavelet transform.

Wavelet Transform:

A transformation with both "frequency" and "time (or space)" domain constraints. In a described embodiment, it is a transform consisting of a high pass filter and a low pass filter. The resulting coefficients are decimated by two (critically filtered) and the filters are applied to the low pass coefficients.

OVERVIEW OF THE PRESENT INVENTION

The present invention provides for implementing overlapped transforms in a manner that is both efficient and reversible. A transform is efficient for purposes of the present invention when the determinant of the transform is 1 (or almost 1). When the input and output of a transform are integer, an efficient transform has no redundancy in the least significant bits of the output integers. The present invention provides such implementations in two separate ways. One method is reversibility by dynamic offset selection, while the second is decomposition into finite impulse response (FIR) ladder filters.

The present invention provides transforms that have reversibility by dynamic offset selection. Prior art transforms exist that are linear except for the rounding associated with integer division. The inverses sometimes have non-linear operations to undo rounding. The dynamic offset selection of the present invention explicitly controls rounding in the forward transform with non-linear operations (in addition to rounding associated with division).

Wavelet Decomposition

The present invention performs decomposition of an image (in the form of image data) or another data signal using reversible wavelets. In the present invention, a reversible wavelet transform comprises an implementation of an exact-reconstruction system in integer arithmetic, such that a signal with integer coefficients can be losslessly recovered. By using reversible wavelets, the present invention is able to provide lossless compression with finite precision arithmetic. The results generated by applying the reversible wavelet transform to the image data are a series of coefficients.

The reversible wavelet transform of the present invention may be implemented using a set of filters. Also, in an embodiment of the present invention, the high-pass filter generates its output using the results of the low-pass filter. The resulting high-pass, or detail, coefficients are only a few bits greater than the pixel depth and the low-pass, or smooth, coefficients are the same as the pixel depth. Because only the low-pass coefficients are repeatedly filtered in a pyramidal decomposition, coefficient resolution is not increased in multi-level decompositions.

Using the low-pass and high-pass filters of the present invention, a multi-resolution decomposition is performed. The number of levels of composition is variable and may be any number; however, currently the number of decomposition levels equals from two to eight levels. The number of levels is typically limited by the log2 (number of samples).

The most common way to perform the transform on two-dimensional data, such as an image, is to apply the one-dimensional filters separately, i.e., along the rows and then along the columns. The first level of decomposition leads to four different bands of coefficients, referred to herein as LL, HL, LH, and HH. The letters stand for low (L) and high (H) corresponding to the application smooth and detail filters defined above respectively. Hence, the LL band consist of coefficients from the smooth filter in both row and column directions.

A wavelet transform system is defined by a pair of FIR analysis filters $h_0(n)$, $h_1(n)$, and a pair of FIR synthesis filters $g_0(n)$, $g_1(n)$. In the present invention, $h_0$ and $g_0$ are the low-pass filters and $h_1$ and $g_1$ are the high-pass filters. A block diagram of the wavelet system is shown in FIG. 1. Referring to FIG. 1, for an input signal, x(n), the analysis filters $h_0$ and $h_1$ are applied and the outputs are decimated by 2 (critically subsampled) to generate the transformed signals $y_0(n)$ and $y_1(n)$, referred to herein as low-passed (smooth) and high-passed (detail) coefficients respectively. The analysis filters and their corresponding decimation, or subsampling, blocks form the analysis portion of the wavelet transform system. The coder/decoder contain all the processing logic and routines performed in the transformed domain (e.g., prediction, quantization, coding, etc.). The wavelet system shown in FIG. 1 also includes a synthesis portion in which the transformed signals are upsampled by 2 (e.g., a zero is inserted after every term) and then passed through synthesis filters, $g_0(n)$ and $g_1(n)$. The low-passed (smooth) coefficients $y_0(n)$ are passed through the low-pass synthesis filter $g_0$ and the high-passed (detail) coefficients $y_1(n)$ are passed through the high-passed filter $g_1$. The output of filters $g_0(n)$ and $g_1(n)$ are combined to produce $\hat{x}(n)$.

While downsampling and upsampling are performed in some embodiments, in other embodiments, filters are used such that computations which are unneeded due to downsampling and upsampling are not performed.

The wavelet system may be described in terms of the Z-transform, where $X(Z)$, $\hat{X}(Z)$ are the input and output signals respectively, $Y_0(Z)$, $Y_1(Z)$ are the low-passed and high-passed transformed signals, $H_0(Z)$, $H_1(Z)$ the low-pass and the high-pass analysis filters and finally $G_0(Z)$, $G_1(Z)$ are the low-pass and the high-pass synthesis filters. If there is no alteration or quantization in the transform domain, the output $\hat{X}(Z)$ is given by $$X(Z) = \frac{1}{2}[H_0(Z)G_0(Z) + H_1(Z)G_1(Z)]X(Z) +$$
$$\frac{1}{2}[H_0(-Z)G_0(Z) + H_1(-Z)G_1(Z)]X(-Z).$$

In the present invention, the second term of $\hat{X}(Z)$, referred to as the "aliasing" term, is canceled because the synthesis filters are defined to be the quadrature mirror of the analysis filters, i.e., $$\begin{cases} G_0(Z) = H_1(-Z) \\ G_1(Z) = -H_0(-Z) \end{cases}$$

In terms of the filter coefficients, $$\begin{cases} g_0(n) = (-1)^n h_1(n) \\ g_1(n) = -(-1)^n h_0(n) \end{cases}$$

Therefore, for a quadrature mirror filter pairs, after substitution, the output is:

$$\hat{X}(z) = \frac{1}{2}[H_0(Z)H_1(-Z) - H_1(Z)H_0(-Z)]X(Z).$$

The wavelet transform is applied recursively to the transformed signals in that the outputs generated by the filters are used as inputs, directly or indirectly, into the filters. In the described embodiment, only the low-passed transformed component $y_0(n)$ is recursively transformed such that the system is pyramidal.

The Z transform is a convenient notation for expressing the operation of hardware and/or software on data. Multiplication by $Z^{-m}$ models a m clock cycle delay in hardware, and an array access to the mth previous element in software. Such hardware implementations include memory, pipestages, shifters, registers, etc.

In the present invention, the signals, $x(n)$ and $\hat{x}(n)$, are identical up to a multiplicative constant and a delay term, i.e. in terms of the Z-transform, $$\hat{X}(Z) = cZ^{-m}X(Z).$$

This is called an exact reconstruction system. Thus, in one embodiment of the present invention, the wavelet transform initially applied to the input data is exactly reconstructable. Exact reconstruction systems are typically not both efficient and reversible. In the present invention, novel rounding is used to make exact reconstruction systems both efficient and reversible.

Minimal length filters implement a non-overlapped transform because the length of the filters is equal to the number of filters. Overlapped transforms use at least one filter which has length greater than the number of filters. Overlapped transforms using longer (non-minimal length) filters can provide better energy compaction. The present invention provides non-minimal length reversible filters which permits an overlapped transform.

Short Odd Filters

Odd filters, for purposes of the present invention, have a region of support which is an odd number of samples (the length of the filter is odd). For a linear phase odd filter, the symmetry of the filter weights is:

$W_k = W_{L-1-k}$ where L is the length of filter and $0 \leq k < (L-1)/2$

A minimal length odd filter has length one, which is not overlapped. If one filter in a pair has length three, then the center of the filter does not overlap portions of neighboring applications of the filter. A filter pair with at least one filter of length 3 are short filters. If the filters in a filter pair are of length 5 or more, the filters are considered herein as long filters.

The generic form of odd reversible filters may be generalized in creating reversible filters to:

$s(n) = x_{2n} + \psi(\text{odd terms})$ $d(n) = x_{2n+1} - \zeta(s(n)\text{'s})$ The $x_{2n+1}$ represents the odd terms, and the $x_{2n}$ represents the even terms. During decoding, in order to recover the input signal x from the $s(n)$ and $d(n)$ pairs (where all s and d pairs are known), the equation of the detail output $d(n)$ is solved to obtain the odd terms. Once all of the odd terms have been recovered, all of the even terms may be recovered for the $s(n)$ equation using the odd terms. Thus, because there are only known values in the detail $d(n)$ equation, it is solved first to provide information to solve the smooth $s(n)$ equation.

The following is a general pair of filters with dynamic offset $\alpha$. Any integer greater than 1 may be chosen for the divisor $\beta$. The choice of $\beta$ controls the growth of the low pass filter. One choice of $\beta$ results in no growth in the low pass filter. Other choices may result in filters that are orthogonal, close to orthoganal or that have other desirable properties.

$$s(n) = \frac{1}{\beta}(x_{2n} + \beta/2) + \psi(\text{odd terms})$$

$$d(n) = \beta x_{2n+1} + \xi((s(n))'s) + \alpha$$

$$\alpha = X_{2n} \% \beta$$

where % represents the modulus (MOD) function.

Reversible 3,5 Transform

An alternate transform of the present invention comprises a reversible implementation of the 5,3 filters of LeGall-Tabatabai. The implementation of the present invention has at least two advantages over the 5,3 reversible implementation of Komatsu et al. First, in the present invention, there is no growth in the low pass (smooth) filter output. Second, in the present invention, the dual 3,5 filter pair, with the longer low pass filter used for synthesis, is used for better lossy quality.

Let $x_0, x_1 \ldots$ be the input signal, and $s_n$, $d_n$ the smooth (low pass) and detail (high pass) outputs respectively. The 3,5 system has weights 1 2 1 and −1 −2 6 −2 −1 for the low and high pass filters respectively. The following implementation is reversible, assuming integer division with rounding towards negative infinity is used:

$$S_n = \frac{x_{2n}}{2} + \frac{x_{2n-1} + x_{2n+1} + 2}{4}$$

$$d_n = 2x_{2n+2} + a - (S_n + S_{n+1})$$

where a=0 or 1 and is the parity (LSB) of $x_{2n+1}$. Note that the a is chosen dynamically based on the input data. For example, if $x_{2n+1}$ equals 7, then a equals 1; if $x_{2n+1}$ equals 8, then a equals 0. The addition of a is a non-linearity not associated with rounding caused by division. There are no non-linearities in Komatsu et al. other than the rounding involved in integer division.

To recover the output during decoding, because a is the LSB of $x_{2n+1}$, the d equation is solved to recover all odd terms along with all LSBs of the even terms. Using this information, all of the even terms may be recovered (excluding their LSB's which have already been recovered).

Note that the additional "+2" term at the numerator of the s(n) equation may provide better rounding. Furthermore, rewriting the smooth equation as follows may also provide better rounding:

$$S_n = \frac{x_{2n}}{2} + \frac{2a + x_{2n-1} + x_{2n+1} + 2}{4}$$

Figure 2:
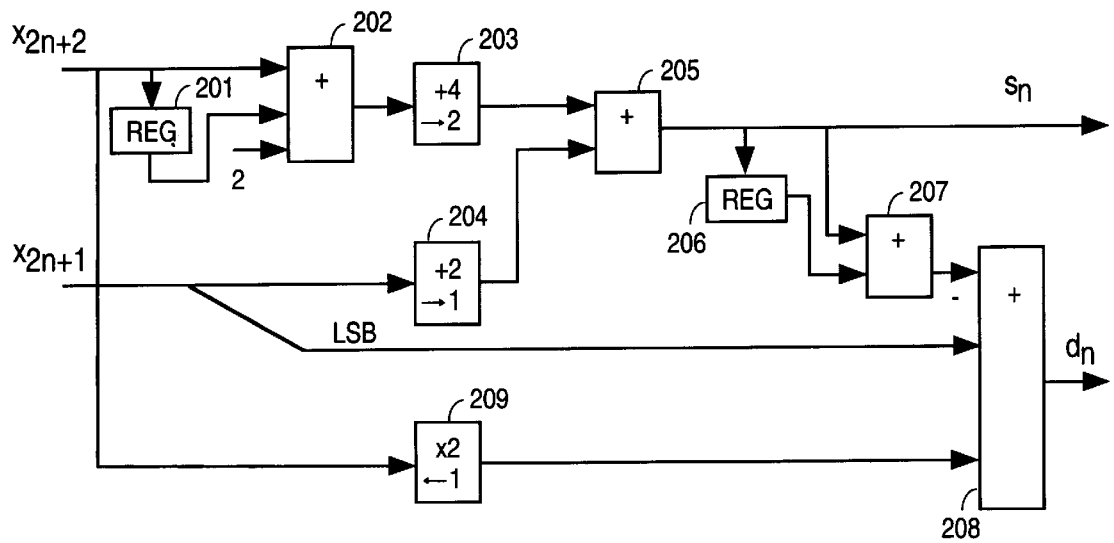
FIG. 2 is a block diagram of one embodiment of a forward 5,3 reversible filter.

FIG. 2 is a hardware block diagram of one embodiment of forward 5,3 reversible filter of the present invention. Referring to FIG. 2, separate pairs of the inputs are presented during one clock cycle. The inputs are shown as $x_{2n+2}$ and $x_{2n+1}$, while the outputs are $s_n$ and $d_n$. The $x_{2n+2}$ input is coupled to register 201, an input of adder 202, and multiplier 209. Note that in this embodiment of the filter, all multiplications and divisions are implemented by hardwired shifts (shown in FIG. 1 as arrows indicating the shift direction). In alternative embodiments, a portion or all of the multiplications and divisions are implemented in other dedicated logic, well-known in the art. The $x_{2n+1}$ input is coupled to the divide-by-two block 204 and its least significant bit (LSB) is coupled to one input of adder 208.

The output of register 201 is coupled an input of adder 202 and acts to delay an input one clock cycle. Adder 202 adds the $x_{2n+2}$ input, the input to the filter from the previous clock cycle as received from register 201, and the integer 2. The output of adder 202 is inputted to a divide 203 which divides the output of adder 202 by four. In the present invention, the divide operation is implemented as a shift to the right two bit positions (as indicated by the arrow).

Adder 205 receives the output of divider 203 along with the output of divider 204, which divides the $x_{2n+1}$ input by two using a shift to the right by one bit position. The output of adder 205 represents the $s_n$ output of the filter.

The output of adder 205 is also input into register 206, which creates a one clock delay to the result, and to adder 207. Adder 207 adds the output of adder 205 to the output of adder 205 from the previous clock cycle, which is provided by register 206. The output of adder 207 is coupled to one input of adder 208. Adder 208 subtracts the output of adder 207 from the LSB of the $x_{2n+1}$ input and the output of multiplier 209, which multiplies the $x_{2n+2}$ input by two using a shift to the left by one bit position. The output of adder 208 is the dn output of the filter.

In operation, to generate the $s_n$ output for a particular value of n, the $x_{2n+2}$ for the current n is added to the $x_{2n+2}$ for the previous n, which is stored in register 201, and added to 2 using adder 202. The result of the addition is divided by four by divider 203. The result of the division is added using adder 205 to the result of dividing the input $x_{2n+1}$ by two, which was performed by divider 204. The result of this addition is the $s_n$ output.

In order to generate the $d_n$ output for a particular value of n, the $s_n$ output for the current n value is added to the $s_n$ output for the previous n value by adder 207. The result of adder 207 is subtracted by adder 208 from the quantity of the LSB of the $x_{2n+1}$ input plus the result of multiplying the $x_{2n+2}$ input by two using multiplier 209.

Reversible 3,5 Transform with Growth in Smooth Coefficients

Komatsu et al. present a 5,3 reversible filter. A dual 3,5 filter is as follows:

$$s_n = x_{2n+1} + (x_{2n} + x_{2n+2})/2$$

$$d_n = x_{2n+2} - (s_n + s_{n+1})/4$$

Note that the low pass (smooth) filter output is one bit larger than its input. This growth in coefficient size is undesirable for multiple pyramidal decompositions.

Short Even Filters

Even filters, for purposes of the present invention, have a region of support which is an even number of samples (the length of the filter is even). For a linear phase even filter, the symmetry of the filter weights is:

$$W_k = W_{L-1-k} \text{ where L is the length of filter and } 0 \leq k < L/2$$

A minimal length even filter has length two, which is not overlapped. If one filter in a pair is minimal length, then the filters in the pair are short filters. If both filters in a pair have length greater than two (both are overlapped), then the filters in the pair are referred to herein as long filters.

The Two/Six Transform

An example of an exact-reconstruction system comprises the Two/Six (TS)-Transform which has the Z-domain definition, $$\begin{cases} H_0(Z) = \frac{1}{\sqrt{2}}(1 + Z^{-1}) \\ H_1(Z) = \frac{1}{8\sqrt{2}}(-1 - Z^{-1} + 8Z^{-2} - 8Z^{-3} + Z^{-4} + Z^{-5}) \end{cases}$$

After substitution, the output is $$\hat{X}(Z) = 2Z^{-3}X(Z),$$

which is an exact-reconstruction transform.

The rational unnormalized version of the TS-transform comprises:

$$\begin{cases} h_0(Z) = \frac{1}{2}(1 + Z^{-1}) \\ h_1(Z) = \frac{1}{8}(-1 - Z^{-1} + 8Z^{-2} - 8Z^{-3} + Z^{-4} + Z^{-5}) \end{cases}$$

In one embodiment of the RTS-transform, a divide-by-eight is implemented as a divide-by-two and then a divide-by-four in order to provide additional accuracy. Note that mathematically the equation $$\frac{1}{8}(-1 - Z^{-1} + 8Z^{-2} - 8Z^{-3} + Z^{-4} + Z^{-5} + 4)$$

and the equation $$\frac{1}{4}\left(\frac{1}{2}(-1 - Z^{-1}) + 4(Z^{-2} - Z^{-3}) + \frac{1}{2}(Z^{-4} + Z^{-5}) + 2\right)$$

are the same when performed with infinite precision arithmetic. The reason the second equation represents a reversible filter is apparent when physically implemented with integer arithmetic.

Note that in both the reversible TS-transform, the low-pass filter is implemented so that the range of the input signal x(n) is the same as the output signal $y_0(n)$. For example, if the signal is an 8-bit image, the output of the low-pass filter is also 8 bits. This is an important property for a pyramidal system where the low-pass filter is successively applied because in prior art systems the range of the output signal is greater than that of the input signal, thereby making successive applications of the filter difficult. In addition, the low-pass filter has only two taps which makes it a non-overlapping filter. This property is important for the hardware implementation.

In a more generic format, the reversible TS-transform is defined by the expression of the two outputs of a low-pass and a high-pass filter:

$$\begin{cases} s(n) = \left\lfloor \frac{x(2n) + x(2n+1)}{2} \right\rfloor \\ d(n) = \left\lfloor -\frac{\left\lfloor \frac{x(2n) + x(2n+1)}{2} \right\rfloor + 4(x(2n+2) - x(2n+3)) + \left\lfloor \frac{x(2n+4) + x(2n+5))}{2} \right\rfloor}{4} \right\rfloor \end{cases}$$

The notation $\lfloor . \rfloor$ means to round down or truncate and is sometimes referred to as the floor function. Similarly, the ceiling function $\lceil . \rceil$ means round up to the nearest integer.

The expression for d(n) can be simplified and written with the use of s(n) (moreover the integer division by 4 can be rounded by adding a 2 to the numerator). These result in:

$$\begin{cases} s(n) = \left\lfloor \frac{x(2n) + x(2n+1)}{2} \right\rfloor \\ d(n) = x(2n+2) - (2n+3) + \left\lfloor \frac{-s(n) + s(n+2) + 2}{4} \right\rfloor \end{cases}$$

The TS-transform is reversible and the inverse is:

$$\begin{cases} x(2n) = s(n) + \left\lfloor \frac{p(n) + 1}{2} \right\rfloor \\ x(2n+1) = s(n) - \left\lfloor \frac{p(n)}{2} \right\rfloor \end{cases}$$

where p(n) must first be computed by, $$p(n) = d(n-1) - \left\lfloor \frac{-s(n-1) + s(n+1) + 2}{4} \right\rfloor$$

The results from the low-pass filter may be used twice (in the first and third terms) in the high-pass filter. Therefore, only two other additions need to be performed to arrive at the results of the high-pass filter.

The TS-transform, in addition to being reversible, is also efficient.

Hence, it lends itself quite well to lossless compression, The TS-transform (like the S-transform) has no growth in the smooth output, i.e., if the input signal is b bits deep, so is the smooth output. This is useful for in pyramidal systems, where the smooth output is decomposed further. There is no systemic error due to rounding in the integer implementation of the transform, so all error in a lossy system can be controlled by quantization.

Among the four filters participating in a wavelet transform, the low-pass synthesis filter is the most important because it combines the quantized coefficients and also smooths the artifacts. This fact has led to the choice of a relatively long (six-tap) and particularly well behaved filter for the low-pass synthesis filter in the present invention. Note that in a QMF system, there are only two independent filters.

Many overlapped, non-minimal length reversible filters may be used in the present invention.

The strict reversibility requirements for filters can be relaxed by noting the following. High pass coefficients are encoded and decoded in the some order. Pixel values corresponding to previously decoded high pass coefficients are known exactly, so they can be used in current high pass filtering.

Reversibility by Dynamic Offset Selection for Controlling Rounding

In one embodiment, the present invention provides transforms that have reversibility by dynamic offset selection. The inverses sometimes have non-linear operations to undo rounding. Dynamic offset selection of the present invention explicitly controls rounding in the forward transform with non-linear operations (in addition to rounding associated with division). In one embodiment, the offset is used at predetermined times before division to control how the rounding takes place. The dynamic offset selection of the present invention enables creation of reversible implementations of overlapped transforms, because information shared by the overlap can be used.

Reversible TS-transform with Dynamic Offset Selection

The present invention provides implementations of the TS-transform with improved rounding. While small differences in rounding typically have small effects on system performance, the ability to choose a desirable rounding option for a particular application is useful. The different choices of rounding result in different implementations that may have desirable properties other than rounding accuracy for use in some applications.

For analyzing rounding, consider the example of integer division by 8. The well-known best rounding scheme is to round down 1/8, 2/8 and 3/8, and to round up 5/8, 6/8 and 7/8. When the remainder is 4/8, rounding up or down is acceptable, and doing both equally is best. (Rounding is not required when the remainder is 0/8.) Since integer division is assumed to always round towards negative infinity, adding an offset of 3 or 4 before integer division is best. This rounding is summarized in Table 1.

TABLE 1

| | Optimal rounding for division by 8 | | | | | | | |
|---|---|---|---|---|---|---|---|---|
| remainder | 5/8 | 6/8 | 7/8 | 0/8 | 1/8 | 2/8 | 3/8 | 4/8 |
| rounding | up | up | up | — | down | down | down | up/down |

Using the notation above, one reversible TS-transform is as follows.

$$s_n = (x_{2n} + x_{2n+1})/2$$

$$d_n = x_{2n+2} - x_{2n+3} - (s_n - s_{n+2} + a)/4$$

where a is an offset that controls the rounding. To analyze the rounding, $d_n$ can be written in terms of the rational filter applied to the original inputs with a new offset a' which differs from a by the rounding errors ($s_n, s_{n+2}$) in the low pass (smooth) filter coefficients.

$$d_n = (-x_{2n} - x_{2n+1} + 8x_{2n+2} - 8x_{2n+3} + x_{2n+4} + x_{2n+5} + a')/8$$

$$x_{2n} + x_{2n+1} = 2s_n + s_n$$

where $s_n$ is the parity of $x_{2n} + x_{2n+1}$ and is 0 or 1

$$a' = a + s_n - s_{n+2}$$

In one embodiment, the offset is a=0 which performs rounding according to Table 2. Note that even remainders (0/8, 2/8, 4/8, 6/8) imply that a'=a and odd remainders (1/8, 3/8, 5/8, 7/8) imply that either a'=a+1 or a'=a-1. The values of a' are -1, 0 and 1.

TABLE 2

| | Rounding when a = 0. | | | | | | | |
|---|---|---|---|---|---|---|---|---|
| remainder | 5/8 | 6/8 | 7/8 | 0/8 | 1/8 | 2/8 | 3/8 | 4/8 |
| rounding | down | down | down/up | — | down | down | down | down |

Upon review of Table 2, the rounding performed when the remainders are 5 or 6 is always bad. Similarly, when the remainder is 7, the rounding is bad at times. (In each of these cases, the desirable rounding to be performed is to round up.)

In another embodiment of the TS-transform described above, the offset is a=4 which performs rounding according to Table 3. This is an improvement over a=2 but is biased such that 3/8 sometimes rounds up and 4/8 always rounds up. The values of a' are 3, 4 and 5. It is convenient to denote TS-transforms by the values of a', so a=4 is a TS-transform with offset 3, 4, 5.

TABLE 3

| | Rounding when a = 4 | | | | | | | |
|---|---|---|---|---|---|---|---|---|
| remainder | 5/8 | 6/8 | 7/8 | 0/8 | 1/8 | 2/8 | 3/8 | 4/8 |
| rounding | up | up | up | — | down | down | up/down | up |

Based on the two preceding examples, it is clear that optimal rounding cannot be achieved with any constant value of a. The present invention provides implementations of the TS-transform where a changes dynamically. In one embodiment, the present invention provides optimal rounding. To assure reversibility, the function used to change a only depends on information that is known when applying the inverse filter. The present invention also allows reversible TS-transforms with non-optimal rounding schemes to be constructed. These other transform implementations demonstrate the power of dynamic offset selection for creating reversible implementations of overlapped filters.

Reversibility requires that the unknown rounding errors $s_n$ and $s_{n+2}$ not effect the result of the division by 8. To study the effect of $s_n$ and $s_{n+2}$, the remainder of the division is considered. Let $$m_u = (2s_n - 2s_{n+2} + 4 + s_n - s_{n+2}) \bmod 8 \quad \text{"modulus with unknowns"}$$

$$m_k = (2s_n - 2s_{n+2} + 4) \bmod 8 \quad \text{"modulus with only knowns"}$$

The value of $m_k$ is computable from known quantities and is even. The value of $m_u$ depends on the value of rounding error $s_n - s_{n+2}$ which can be -1, 0 or 1. Table 4 shows the information known for the possible values of $m_k$.

TABLE 4

| | Information Contained in $m_k$ | |
|---|---|---|
| $m_k$ | $m_u$ | reversible with a = 4? |
| 0 | 7,0,1 | no (at least without more information) |
| 2 | 1,2,3 | yes |
| 4 | 3,4,5 | yes |
| 6 | 5,6,7 | yes |

When $m_u$ transitions from 7 to 0, the result of the division changes; otherwise the result of the division is the same. When $m_k$ is 2, 4 or 6, the rounding error cannot change the result of the division used to calculate $d_n$ when an offset a=4 used. Only when $m_k$ is 0 can the rounding error effect the value of $d_n$ when a=4. If $s_n$=1 and $s_{n+2}$=0, then $d_n$ is rounded down; otherwise, it is rounded up. make the transform reversible when $m_k$ is 0 and "$s_n$=1 and $s_{n+2}$=0" is not known, the offset a can be changed to 2. (Equivalently an offset of 5 could also be used to reversibility, however, the rounding would change). In the present invention, the offset may be changed using one of several methods with different complexities.

Figure 4:
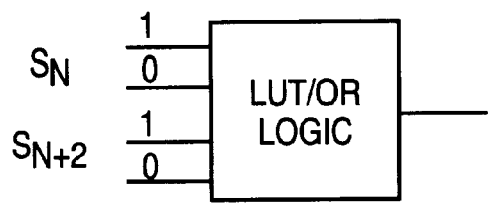
FIG. 4 illustrates one embodiment of logic/look-up table with associated truth table for the variable depicting modules with only knowns (Mx).

Note that $m_k$ depends only on the two least significant bits of $s_n$ and $s_{n+2}$, so it can be determined if it is equal to zero with a twobit add and compare, a look-up table or four-input logic. An exemplary look-up table or logic and its associated truth table are shown in FIG. 4.

Thus, in the present invention, the offset may be selected dynamically. There are multiple ways to select the offset. The following indicates three exemplary ways to select the offset.

Dynamic Offset Selection Method 1

In one embodiment of the present invention, the values of $s_n$ and $s_{n+2}$ are not used in selecting an offset. Offset a is 4 when $m_k$>0 and a is 2 when $m_k$=0. Table 5 shows that the rounding is the biased down dual of the rounding for the TS-transform when the offset a' is the constant 4. Therefore, if this dynamic method and the static α=4 method are used equally, on average the rounding biases would cancel out.

TABLE 5

| | Rounding for dynamic offset selection method 1 and a = 2 or 4 | | | | | | | |
|---|---|---|---|---|---|---|---|---|
| remainder | 5/8 | 6/8 | 7/8 | 0/8 | 1/8 | 2/8 | 3/8 | 4/8 |
| rounding | up/down | up | up | — | down | down | down | down |

Note that this dynamic offset selection method, as well as others, may be implemented in software and/or hardware.

Dynamic Offset Selection Method 2

In an alternate embodiment, data is processed sequentially in raster order so that $s_n$ is always known. The offset a is 2 when $m_k=0$ and $s_n=1$; otherwise the offset a is 4. Note that $m_k=0$ and $s_n=1$ implies that the remainder is either 3/8 or 4/8. Table 6 illustrates the rounding.

TABLE 6

| Rounding for dynamic offset selection method 1 and a = 2 or 4 | | | | | | | |
|---|---|---|---|---|---|---|---|
| remainder | 5/8 | 6/8 | 7/8 | 0/8 | 1/8 | 2/8 | 3/8 | 4/8 |
| rounding | up | up | up | — | down | down | down | up/down |

This method achieves the optimal rounding if $s_n$ is equally likely to be 0 or 1 (which is a reasonable assumption). Note that the dual, when processing in the reverse of raster order considering $s_{n+2}=0$, is equivalent.

Dynamic Offset Selection Method 3

In still another embodiment, both $s_n$ and $s_{n+2}$ are used to select the offset. This requires looking ahead in some cases, such that coefficients may need to be accessed twice. The pseudo code for such an implementation is listed below.

```
going forwards, while (m_k>0 or s_n=0)
    filter with offset a = 4
save position of last location where filter was applied
while (m_k=0)
    look ahead
    filter with offset a = 4
    going backwards, while S_{n+2}=1 (and saved position not reached)
        filter with offset a = 4
    for gap between saved position and current position
        filter with offset a = 4 or 2
repeat
```

In this method, as the processing occurs in order, the data is filtered with a filter using offset a=4 while $m_k$ is greater than zero or $s_n$ is equal to zero. Once $m_k$ is no longer greater than zero or $s_n$ does not equal zero, the last position is the data stream to which the filter was applied is saved.

Next, as $m_k$ equals zero, the data stream is traversed. Once $m_k$ no longer equals zero, the traversing of the data stream stops. Then processing continues backwards (up until the last saved position), filtering with a filter having offset a=4, while $s_{n+2}$ equals one.

Once $s_{n+2}$ is no longer equal to one, a gap may be left between the current position and the last saved position. In the gap, the filter applied has either an offset a equal to four or two. For "filling the gap", either of the two previous discussed dynamic offset selection methods could be used.

This method can be slightly improved when going forward by also using offset a=4 when $s_{n-1}=1$, since $s_{n+1}$ can be computed from known values. Similarly, when going backwards, if a look ahead allows $s_{n+3}$ to be computed and then $s_{n+3}=0$, then $s_{n+1}$ can be computed from known values.

Gaps of size one imply that $s_n$ and $s_{n+2}$ are known and can be filtered with offset a=4. For gaps of size two when $s_{n-1}$ is one or $s_{n+3}$ is zero, offset a=4 can be used. Otherwise, for gaps of size 2, of the four possibly values for the two unknown s's, if there is only one consistent pair of values, offset a=4 can be used.

For larger gaps, a value in the middle of the gap can be filtered with offset a=2. Based on the value of s recovered at this location, either the following (when s=0) or previous (when s=1) location can be filtered with offset a=4. Filtering with offset a=4 can continue as long as the value of s remains the same. Remaining gaps can be handed by again starting in the middle of the gap.

In this embodiment, using offset a=2 rarely occurs. This rarity may be a better advantage in some applications than optimal rounding. However, using offset a=2 cannot be eliminated entirely. Below are two sequences of filter inputs where using offset a=4 all the time does not allow reversibility—at least one filtering operation with offset a=2 is required. (Assume that at the boundaries are handled as follows: Let the samples be $x_0 \ldots x_9$ where $x_{-1}=x_2$, $x_{-2}=x_3$, $x_{10}=x_7$, $x_{11}=x_6$.).

1 0 0 1 2 3 3 3 4 4
1 0 0 0 2 2 2 3 4 4

If using offset a=4 always was desirable for high speed, high quality lossy decompression, a side channel could be used to transmit s. Using the preceding dynamic offset selection method is beneficial when a value of s is needed to be transmitted. This causes some modest compression inefficiency for the average case, and at worst spends an extra ⅔ bit per high pass (detail) filter operation. Alternatively, for a modest loss in lossy decompression quality, the use of offset a=4 could be assumed always.

All of the above discussion of using offset a'=4,2 or 4,5 could equivalently use 3,2 or 3,5, respectively. The choice of where to use the second offset occurs when $m_k=7$ and whether "$s_n=0$ and $s_{n+2}=1$" is unknown.

Figure 3:
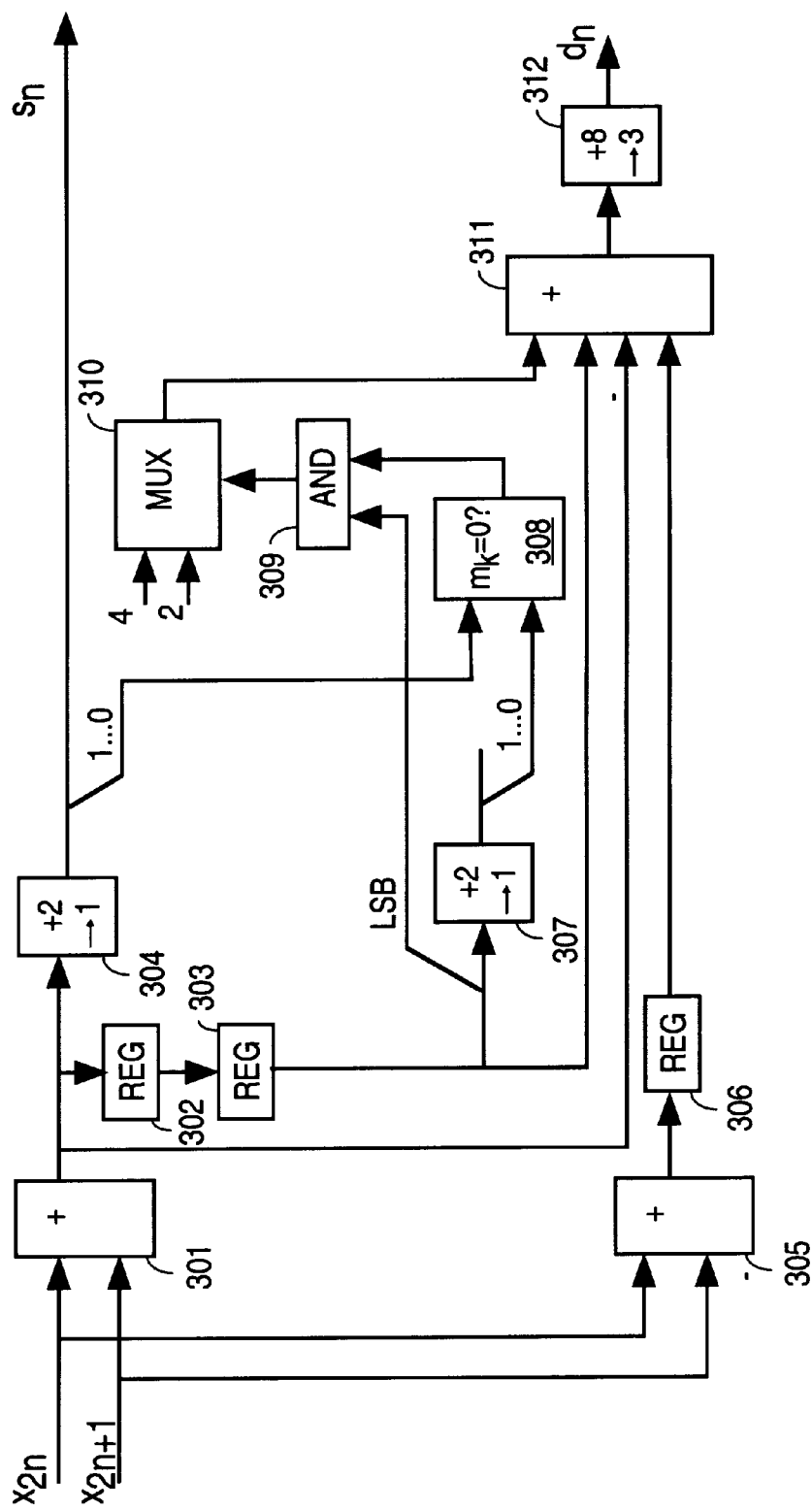
FIG. 3 is a block diagram of one embodiment of a forward TS filter.

FIG. 3 is a hardware block diagram of the forward TS-filter with offset a being 4 and 2, where dynamic offset selection method 2 is shown. Referring to FIG. 3, the filter receives $x_{2n}$ and $x_{2n+1}$ as inputs and produces $s_n$ and $d_n$ as outputs. The two inputs are received by adder 301, which performs addition, and adder 305, which performs subtraction. Adder 301 adds the $x_{2n}$ and $x_{2n+1}$ inputs and outputs the result to divider 304, register 302 and adder 311. Divider 304 divides the result by 2 using a shifting the result to the right one bit position. The output of divider 304 is the $s_n$ output. Bits 1 . . . 0 of the output of divider 304 are also input into "$m_k=0$?" block.

The output of register 302 is coupled to the input of register 303. The output of register 303 is coupled to one input of adder 311 and the input of divider 307. The LSB of the output of register 303 is coupled to one input of AND gate 309. Registers 302 and 303 stage the results for two clock cycles. Thus, when the results of the addition of the $x_{2n}$ and $x_{2n+1}$ inputs is being inputted into register 302, the output of register 303 consists of the result of the addition of the inputs that was generated two clock cycles earlier.

Divider 307 divides the output of register 303 by two. In one embodiment, the divide-by-two is implemented by shifting the input to the right one bit position. The 1 . . . 0 bits of the result of the division are inputted into the "$m_k=0$?" block 308. The output of block 308 is a signal that indicates if $m_k=0$. The "$m_k=0$?" logic block 308 may be an adder and a comparator, a look-up table or hardwired logic. This signal output from block 308 along with the LSB of the output of register 303 are inputted into AND logic 309, which generates an input selection signal to multiplexer (MUX) 310, causing the output from MUX 310 of either an offset of 2 or 4. The offset is received by adder 311.

Adder 305 subtracts the $x_{2n+1}$ input signal from the $x_{2n}$ input signal. The result of the subtraction is stored in register 306.

Adder 311 adds the offset from MUX 310 to the output of register 303 and the output of register 306 (which is the result from the previous clock cycle of the subtraction of input $x_{2n+1}$ from $x_{2n}$) less the output of adder 301. The result of the addition is sent to a divider 312. Divider 312 divides the output of adder 311 by 8 by shifting the result to the right by three bit positions. The output of divider 312 is the $d_n$ output of the filter.

Note that if the AND logic 309 and the LSB signal is removed, dynamic offset selection method 1 is implemented.

In operation, the $s_n$ output for a particular value of n is generated by adding the $x_{2n}$ input to the $x_{2n+1}$ input using adder 301. The result of the addition is divided by two using divider 304. The result of the division is the $s_n$ output.

The $d_n$ output for a particular value of n is generated by adding the offset α output from MUX 310 with the result of adding the inputs $x_{2n}$ and $x_{2n+1}$ with adder 301 for the n−2 (as stages by register 303), with the result of adding $x_{2n}$ and $x_{2n+1}$ for the current value of n using adder 301 and with the result of subtracting $x_{2n+1}$ from $x_{2n}$ for using adder 305 for the previous value of n (as staged by register 306). This produces a result which is divided by 8 by divider 312 to generate the $d_n$ output.

Improved Rounding for TS-transform Low Pass Filter

The following change to low pass (smooth) filter in the TS-transform (with offset 3,4,5) alternates between rounding 0.5 up and rounding 0.5 down. (Note that this change in offsets is not dynamically based on input data). The high pass (detail) filters are unchanged. The +1 offset in even s values cancels out in even d values. The odd s values are unchanged, so the odd d values are unchanged.

$$s_n = (x_{2n} + x_{2n+1} + 1)/2$$

$$s_{2n+1} = (x_{2n} + x_{n+1})/2$$

This alternation of rounding for the 0.5 case tends to preserve energy in the low pass (smooth) outputs.

Ladder Filters and Polyphase Decomposition

As discussed above, the present invention provides for implementing overlapped transforms by decomposition into finite impulse response (FIR) ladder filters. The following describes the polyphase decomposition for two filter banks which are related to wavelets.

Let X(z) be an input signal in the z domain. Let H(z) be an FIR filter, which is a polynomial in $z^{-1}$.

Let Y(z) be the result of the application of H(z) to X(z) decimated by 2. Then Y(z) has the cumbersome and useless expression of $X(z^{1/2}) \cdot H(z^{1/2})$. In terms of polyphase decomposition, the expression is much more meaningful.

The following are the polyphase decompositions of H(z) and X(z).

$$H(z) = H_0(z^2) + z^{-1} H_1(z^2)$$

$$X(z) = X_0(z^2) + z X_1(z^2).$$

From this, Y(z) is obtained, which is X(z)·H(z) decimated by 2 as $$Y(z) = H_0(z) X_0(z) + H_1(z) X_1(z).$$

Note the equation above is applied to two filters $H_0(z)$ and $H_1(z)$, which are given below as:

$$\begin{cases} H_0(z) = H_{0,0}(z^2) + z^{-1} H_{0,1}(z^2) \\ H_1(z) = H_{1,0}(z^2) + z^{-1} H_{1,1}(z^2) \end{cases}$$

Hence, $$\begin{cases} Y_0(z) = H_{0,0}(z) X_0(z) + H_{0,1}(z) X_1(z) \\ Y_1(z) = H_{1,0}(z) X_0(z) + H_{1,1}(z) X_1(z) \end{cases}$$

In matrix notation, $$\begin{bmatrix} Y_0(z) \\ Y_1(z) \end{bmatrix} = \begin{bmatrix} H_{0,0}(z) & H_{0,1}(z) \\ H_{1,0}(z) & H_{1,1}(z) \end{bmatrix} \cdot \begin{bmatrix} X_0(z) \\ X_1(z) \end{bmatrix}$$

The above matrix of filters is referred to herein as the polyphase matrix and is denoted by $$H = \begin{bmatrix} H_{0,0}(z) & H_{0,1}(z) \\ H_{1,0}(z) & H_{1,1}(z) \end{bmatrix}$$

If the polyphase matrix is reversible, then it may be decomposed to obtain multiple matrices which are reversible. Let $$A = \begin{bmatrix} a & b \\ c & d \end{bmatrix}$$

be a matrix with det(A)=1 and b≈0. (Note that a, b, c and d may be constants or polynomials in $z^{-1}$ (filters)). If det(A)=1 and b≈0, then there is the following decomposition $$A = \begin{bmatrix} 1 & 0 \\ (d-1)/b & 1 \end{bmatrix} \begin{bmatrix} 1 & b \\ 0 & 1 \end{bmatrix} \begin{bmatrix} 1 & 0 \\ (a-1)/b & 1 \end{bmatrix}$$

Each of the matrices in the decomposition is reversible. This decomposition may be realized as a ladder filter.

Ladder Filter General Implementation

Figure 5A:
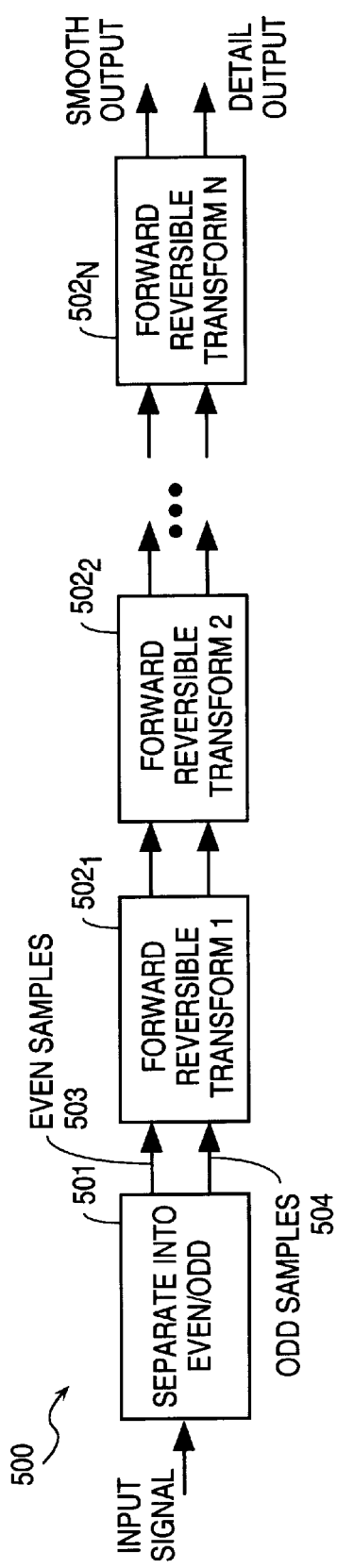
FIGS. 5A and 5B are block diagrams of one embodiment of forward and inverse decomposed filters respectively.

FIG. 5A is a block diagram of one embodiment of a forward decomposed filter. Referring to FIG. 5A, the forward decomposed filter 500 includes separation block 501 that is coupled to receive an input signal. Separation block 501 separates the input signal into even and odd samples and provides them on separate outputs. For instance, given samples 0, 1, 2, 3, 4, 5, . . . , one of the outputs of separation block 501 (e.g., output 503 depicted in FIG. 5A) contains the even samples 0, 2, 4, . . . , while the other output of separation block 501 (e.g., output 504 depicted in FIG. 5A) contains the odd samples 1, 3, 5, . . . Separation block 501 may be a demultiplexer, registers, memory access control, or other hardware necessary to separate samples from an input signal based on predetermined criteria (e.g., odd/even).

The even and odd sample outputs from separation block 501 are fed into the first of a cascaded set of forward reversible transforms $502_{1-N}$ which are coupled in a ladder configuration. Each of the forward reversible transforms $502_{1-N}$ may be a ladder filter element. Each of the forward reversible transforms $502_{1-N}$ may also be other reversible transforms such as the S-transform or a transform containing a dynamic offset. The output of the last transform, forward reversible transform N $502_N$ (i.e., the output of forward decomposed filter 500) comprises coefficients provided on two outputs. Typically, one of these two outputs is a high pass output, and the other is a low pass output. For many ladder filter elements in this invention (e.g., intermediate filter elements preceding the last filter element of a ladder realization), the upper output is modified, and the lower output is unchanged (or just delayed).

FIG. 6A is a block diagram of one embodiment of a general ladder filter element for reversible transforms and filtering. Referring to FIG. 6A, a forward ladder filter element 600 is shown having delays $601_{1-L}$ and $601_{L-M}$ coupled serially with the output of the one delay being coupled to the input of the next delay. Delay 601 is coupled to receive an input signal 605. The input signal 605 may be the even samples from the separation block 501 if forward ladder filter element is the first transform in a cascaded connection of transforms or else may be the signal on an output of the previous transform (ladder filter element). The input signal 605 and the output of each of delays $601_{1-L-M}$ are input into function block 603. For linear filters, function block 603 may perform a function that comprises an accumulation of multiplication by weights. For non-linear filters, function block 603 may determine a weighted median or other function of the inputs.

The output of function block 603 is rounded to the nearest integer by round-to-integer block 604. The result of the rounding is coupled to one input of adder 607. The other input of adder 607 is the output of a second series of delays $602_{1-N}$, the first of which is coupled to the second input signal 606 of the forward ladder filter element 600.

Note that the delay elements $601_{1-L-M}$ and $602_{1-N}$, as well as other delays of the present invention, may be memory, buffers, registers, latches, or other hardware that is capable of applying a delay to an input signal.

Adder 607 adds the rounded result that is output from round-to-integer block 604 to the output of delay $602_N$. The output of adder 607 is the upper output of the forward ladder filter element 600, while the output of delay $601_L$ represents the lower output.

Figure 5B:
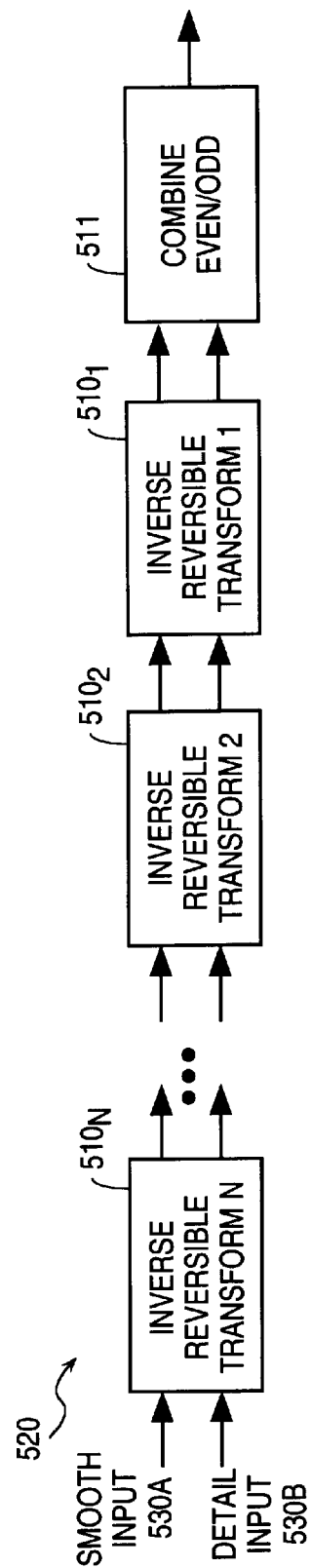

The inverse decomposed filter and inverse ladder filter elements are similar to their counterparts in the forward direction. FIG. 5B is a block diagram of one embodiment of an inverse decomposed filter 520. Referring to FIG. 5B, an inverse reversible transform $510_N$ is coupled to receive input signals 530A and 530B, representing a pair of transformed signals. Inverse reversible transform $510_N$ is one of multiple transforms $510_{N-1}$ cascaded together, with each receiving two outputs from the previous transform and providing two output to the next. As with the forward decomposed filter, the inverse reversible transforms may be ladder filter elements. They may also be other reversible transforms such as the S-transform or a transform with a dynamic offset. The outputs of the last transform, inverse reversible transform $510_1$, are even and odd samples and are input to combine block 511.

Combine block 511 performs the inverse of separation block 501 by combining the even and odd samples from inverse transform $510_1$ to create a perfect reconstruction of the original input signal to the system (such as the input signal to separation block 501). Combine block 511 may comprise a multiplexer, registers, memory access control, or any other hardware capable of interleaving sample values based on predetermined criteria (e.g., odd/even).

FIG. 6B is a block diagram of one embodiment of an inverse ladder filter element. Referring to FIG. 6B, inverse ladder filter element 650 is the same as forward ladder filter element 600 of FIG. 6B, except subtractor 608 replaces adder 607 and subtracts the rounded result of round-to-integer block 604 from the output of delay $602_N$ to create one of the two output signals.

The following discussion sets forth the application of polyphase decomposition described above to specific transforms to obtain reversibility.

S-transform

The S-transform (in one dimension) is a reversible implementation of the system $$\begin{cases} H_0(z) = \frac{1}{2}(1 + z^{-1}) \\ H_1(z) = -1 + z^{-1} \end{cases}$$

This implementation is defined in the spatial domain by $$\begin{cases} y(2n) & = \frac{1}{2}(x(2n-1) + x(2n)) \\ y(2n+1) & = x(2n-1) - x(2n) \end{cases}$$

It is important that the division by 2 in the definition of y(2n) be performed as integer division. The S-transform as described above is not a ladder system. The simple reason for the reversibility of the S-transform is that the sum and the difference of two numbers determine the numbers completely. If the input is integer (which is assumed throughout), the sum and the difference have the same parity and hence share the same least significant bit (LSB). Therefore, by dividing one of them by 2 (thereby eliminating the LSB), no information is lost. This simple fact is remarkable since it separates the S-transform from other reversible transforms which are all based on the ladder systems. However, the S-transform has another implementation which comes out directly from the ladder theory.

The corresponding polyphase matrix of the transform is $$H = \begin{bmatrix} 1/2 & 1/2 \\ -1 & 1 \end{bmatrix}$$

This polyphase matrix has the following decomposition $$H = \begin{bmatrix} 1 & 1/2 \\ 0 & 1 \end{bmatrix} \begin{bmatrix} 1 & 0 \\ -1 & 1 \end{bmatrix}$$

Notice that this leads to a reversible but different implementation of the S-transform.

Figure 7A:
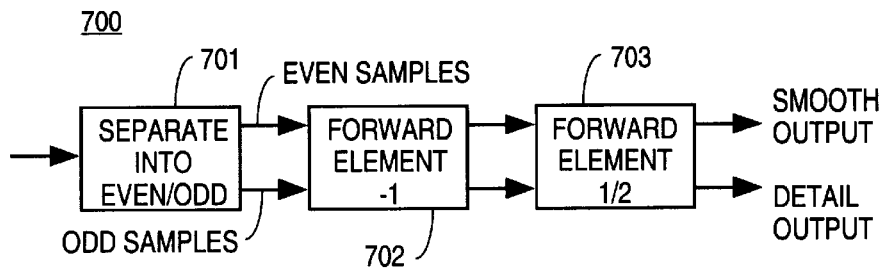
FIGS. 7A and 7B illustrate the forward and reverse decomposed filters, respectively, implementing the Stransform.
Figure 7B:
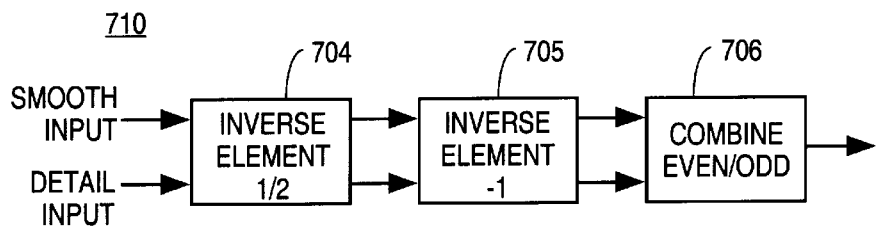
Figure 19A:
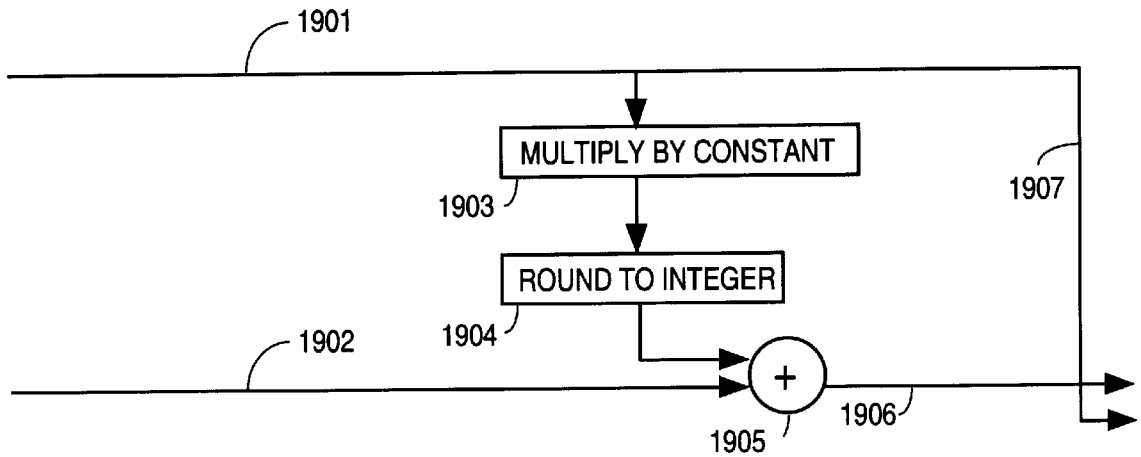
FIGS. 19A and 19B illustrate one embodiment of the forward and inverse even decomposition filter elements, respectively.

The forward and reverse decomposed filters implementing the S-transform are shown in FIGS. 7A and 7B respectively. Referring to FIG. 7A, an input signal is separated into even and odd samples by separation block 701. The even and odd samples are output on separate outputs to forward element 702. The outputs of forward element 702 are coupled to the inputs of forward element 703, which outputs two outputs. Each of forward elements 702 and 703 includes notation of "−1" and "½" respectively. This number is the multiplication constant that is used in the element when a "multiply by constant" operation is performed, such as shown in FIG. 19A. The notation in FIG. 19A indicating the constant will be used with other figures.

Referring to FIG. 19A, forward element 1900 comprises inputs 1901 and 1902, multiplier 1903, rounding unit 1904, adder 1905 and outputs 1907 and 1908. Each of these components is well-known in the art. Input 1901 undergoes a multiplication by a constant by multiplier 1903. In the case of FIG. 7A, the constant is −1 for forward element 702 and ½ for forward element 703. The result of the multiplication is rounded to the nearest integer by rounding unit 1904. The result of the rounding is added to input 1902 by adder 1905. The output of adder 1905 comprises output 1906 of forward element 1900. Input 1901 comprises output 1907 of forward element 1900. Thus, input 1901 was output from forward element 1910 unchanged.

Referring to FIG. 7B, the inverse decomposed filter 710 comprises an inverse element 704 which is coupled to receive transformed signals and, using a constant of ½, outputs a pair of output signals. The pair of output signals are coupled to the inputs of inverse element 705. Using a multiplication constant of −1, inverse element 705 transforms the signals on it inputs. The outputs of inverse element 705 are even and odd samples on different outputs that are coupled to the inputs of combine block 706. Combine block 706 combines the even and odd samples by interleaving the samples to create a perfect reconstruction of the original input signal to the system.

Figure 19B:
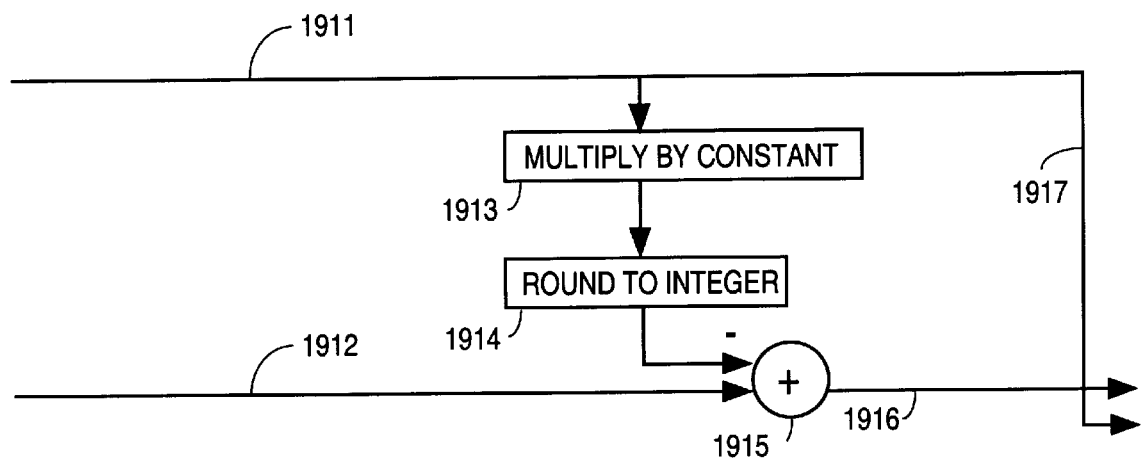

In one embodiment, inverse elements 704 and 705 comprise inverse element 1910 of FIG. 19B. Referring to FIG. 19B, inverse element 1910 comprises inputs 1911 and 1912, multiplier 1913, rounding unit 1914, subtracter 1915 and outputs 1917 and 1918. Each of these components is well-known in the art. Input 1911 undergoes a multiplication by a constant by multiplier 1913. In the case of FIG. 7B, the constant is ½ for inverse element 704 and −1 for inverse element 705 The result of the multiplication is rounded to the nearest integer by rounding unit 1914. The result of the rounding is subtracted from input 1912 by subtracter 1915. The output of subtracter 1915 comprises output 1916 of inverse element 1910. Input 1911 comprises output 1917 of inverse element 1910. Thus, input 1911 was output from inverse element 1910 unchanged.

The TS-transform

The TS-transform is $$\begin{cases} H_0(z) = \frac{1}{2}(1+z^{-1}) \\ H_1(z) = \frac{1}{8}(1+z^{-1}-8z^{-2}+8z^{-3}-z^{-4}-z^{-5}) \end{cases}$$

The polyphase matrix of TS-transform is $$H = \begin{bmatrix} \frac{1}{2} & \frac{1}{2} \\ \frac{1}{8}(1-8z^{-1}-z^{-2}) & \frac{1}{8}(1+8z^{-1}-z^{-2}) \end{bmatrix}$$

This leads to the following decomposition $$H = \begin{bmatrix} 1 & 0 \\ \frac{1}{4}(1-z^{-2}) & 1 \end{bmatrix} \begin{bmatrix} 1 & \frac{1}{2} \\ 0 & z^{-1} \end{bmatrix} \begin{bmatrix} 1 & 0 \\ -1 & 1 \end{bmatrix}$$

Notice the close relationship between the effect of the last two matrices and the S-transform (except for a delay term $z^{-1}$).

The S-transform "polyphase" matrix of the TS-transform is derived by $H \cdot S^{-1}$ where H and S are the polyphase matrices of the TS-transform and the S-transform respectively.

$$H \cdot S^{-1} = \begin{bmatrix} 1 & 0 \\ \frac{1}{4}(1-z^{-2}) & z^{-1} \end{bmatrix}$$

This matrix represents a ladder system and results in a reversible implementation of the TS-transform by going through the S-transform.

$$\begin{bmatrix} 1 & 0 \\ \frac{1}{4}(1-z^{-2}) & 1 \end{bmatrix} \begin{bmatrix} 1 & \frac{1}{2} \\ 0 & z^{-1} \end{bmatrix} \begin{bmatrix} 1 & 0 \\ -1 & 1 \end{bmatrix} = \begin{bmatrix} 1 & 0 \\ \frac{1}{4}(1-z^{-2}) & 1 \end{bmatrix} \begin{bmatrix} 1 & 0 \\ 0 & z^{-1} \end{bmatrix} \begin{bmatrix} \frac{1}{2} & \frac{1}{2} \\ -1 & 1 \end{bmatrix}$$

Figure 8A:
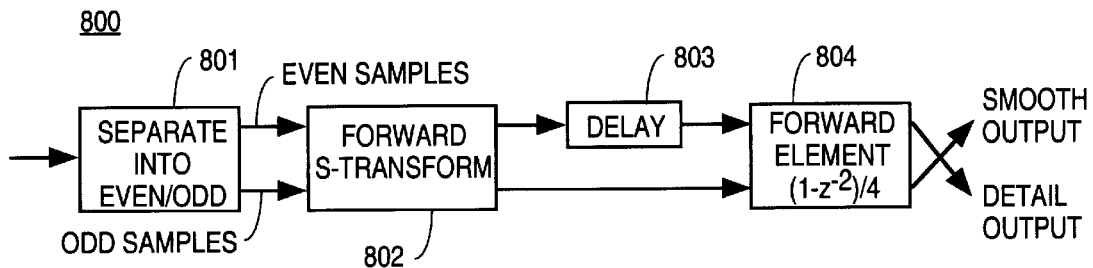
FIGS. 8A and 8B illustrate one embodiment of the forward and inverse decomposed filter implementations, respectively, of a TS-transform respectively.
Figure 8B:
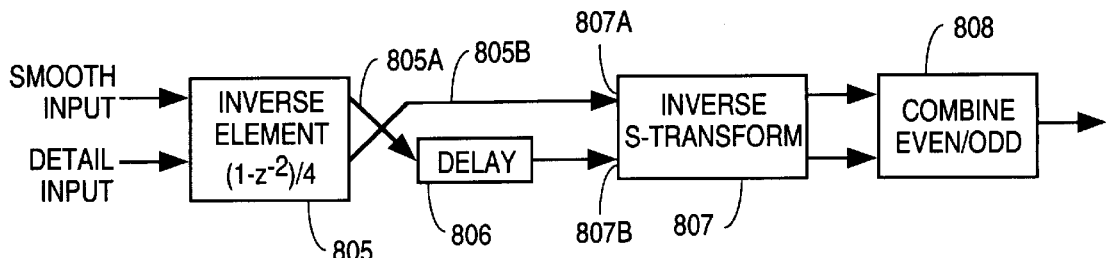

FIGS. 8A and 8B illustrate one embodiment of the forward and inverse decomposed filter implementations of a TS-transform respectively. Referring to FIG. 8A, the forward decomposed filter 800 comprises a separation block 801 that is coupled to receive the input signal and separates the input signal into even and odd samples which are output on separate outputs. Those outputs are coupled to the inputs of forward S-transform 802. The signals output from forward S-transform 802, one of which is coupled to delay element 803 and the other is coupled to one input of forward element 804. The output of delay element 803 is coupled to the other input of forward element 804. Using a multiplication constant of ¼ and a polynomial (sum of products) of $(1-z^{-2})$, forward element 804 generates coefficients, which are the smooth and detail outputs. In one embodiment, forward element 804 comprises forward element 600 in FIG. 6A.

Referring to FIG. 8B, inverse decomposed filter 810 comprises an inverse element 805 that is coupled to receive two separate input signals, i.e. the smooth and detail inputs. In one embodiment, these input signals comprise coefficients. Inverse element 805 inversely transforms these input signals using a multiplication constant of ¼ and a polynomial (sum of products) of $1-z^{-2}$. In one embodiment, inverse element 805 comprises inverse element 650 in FIG. 6B.

Output 805A of the inverse element 805 is coupled to the input of delay element 806. Output 805B of inverse element 805 is coupled to input 807A of inverse S-transform 807. The output of delay element 806 is coupled to input 807B of inverse S-transform 807. The inverse S-transform 807 performs the inverse transform and generates two output signals comprised of even and odd samples, respectively. The even and odd sampled signals are coupled to inputs of combine block 808, which interleaves the samples to create a perfect reconstruction of the original input signal to the system.

The same structure used for the TS-transform may be used with the following parameters for a "case 2" even filter decomposition (in the Long Even Filters section described below), which will be described in more detail below.

A general form of the TS-transform with normalization such that 2-tap is ½, ±½ is as follows:

$$\begin{bmatrix} (P_0 + P_2 z^{-2}) & 1 \\ 1 & 0 \end{bmatrix} \begin{bmatrix} 1 & 0 \\ 0 & z^{-1} \end{bmatrix} \begin{bmatrix} 1 & 1 \\ \frac{1}{2} & -\frac{1}{2} \end{bmatrix} \text{ if } s = 1$$

$$\begin{bmatrix} (P_0 + P_2 z^{-2}) & 1 \\ -1 & 0 \end{bmatrix} \begin{bmatrix} 1 & 0 \\ 0 & z^{-1} \end{bmatrix} \begin{bmatrix} 1 & -1 \\ \frac{1}{2} & \frac{1}{2} \end{bmatrix} \text{ if } s = -1$$

where $P_0$, $P_2$ and s are parameters. (The parameters are defined for the Long Even Filters section herein.)

Note that FIGS. 22A and 22B illustrate alternatives to the generalized form with arbitrary nomalization.

The 3,5 Transform

The 3,5 filters of LeGall-Tabatabai has one normalization with growth in the low-pass as follows:

$$\begin{cases} H_0(z) = \frac{1}{2}(1 + 2z^{-1} + z^{-2}) \\ H_1(z) = \frac{1}{8}(-1 - 2z^{-1} + 6z^{-2} - 2z^{-3} - z^{-4}) \end{cases}$$

The polyphase matrix of this transform is $$H = \begin{bmatrix} \frac{1}{2}(1+z^{-1}) & 1 \\ \frac{1}{8}(-1+6z^{-1}-z^{-2}) & -\frac{1}{4}(1+z^{-1}) \end{bmatrix}$$

Since det (H)=$-z^{-1}$, in order to decompose this polyphase matrix into the three matrices format described above, it is multiplied by the matrix J where J is a matrix of determinant $-z$ and defined by $$J = \begin{bmatrix} 0 & z \\ 1 & 0 \end{bmatrix}$$

The inverse of J is $$J^{-1} = \begin{bmatrix} 0 & 1 \\ z^{-1} & 0 \end{bmatrix}$$

Hence, $$H \cdot J = \begin{bmatrix} \frac{1}{2}(1+z^{-1}) & 1 \\ \frac{1}{8}(-1+6z^{-1}-z^{-2}) & -\frac{1}{4}(1+z^{-1}) \end{bmatrix} \cdot J$$

$$= \begin{bmatrix} 1 & \frac{1}{2}(z+1) \\ -\frac{1}{4}(1+z^{-1}) & \frac{1}{8}(-z+6-z^{-1}) \end{bmatrix}$$

$$= \begin{bmatrix} 1 & 0 \\ -\frac{1}{4}(1+z^{-1}) & 1 \end{bmatrix} \begin{bmatrix} 1 & \frac{1}{2}(z+1) \\ 0 & 1 \end{bmatrix} \begin{bmatrix} 1 & 0 \\ 0 & 1 \end{bmatrix}$$

Therefore, to obtain H, the above set of matrices are multiplied by $J^{-1}$ as follows:

$$H = \begin{bmatrix} 1 & 0 \\ -\frac{1}{4}(1+z^{-1}) & 1 \end{bmatrix} \cdot \begin{bmatrix} 1 & \frac{1}{2}(z+1) \\ 0 & 1 \end{bmatrix} \cdot J^{-1}$$

$$= \begin{bmatrix} 1 & 0 \\ -\frac{1}{4}(1+z^{-1}) & 1 \end{bmatrix} \cdot \begin{bmatrix} \frac{1}{2}(1+z^{-1}) & 1 \\ z^{-1} & 1 \end{bmatrix}$$

Figure 9A:
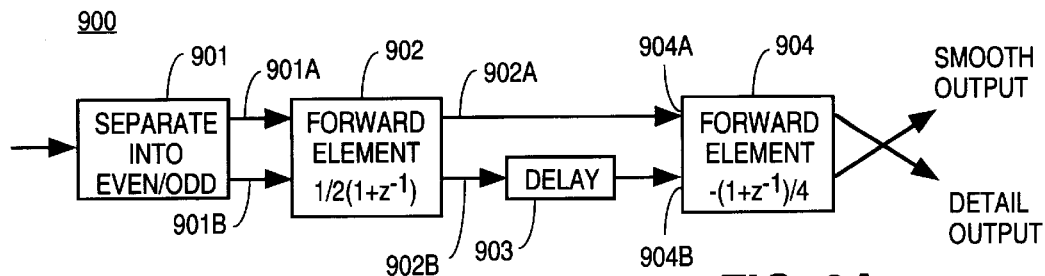
FIGS. 9A and 9B illustrate one embodiment of the forward and reverse decomposed filters, respectively, implementing the 3,5 filter pair with growth in the low pass.
Figure 9B:
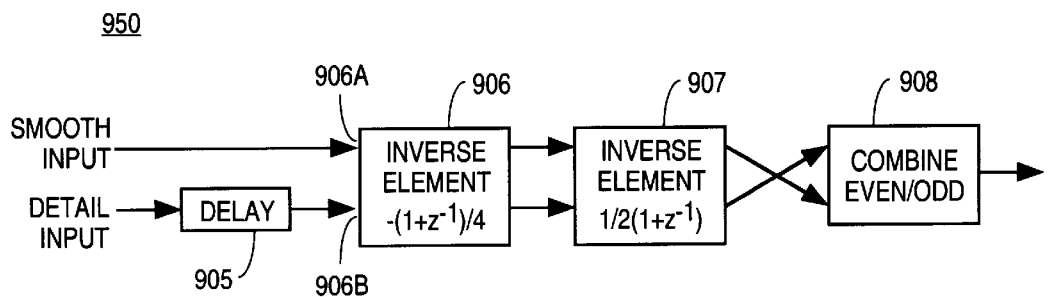

FIGS. 9A and 9B illustrate one embodiment of the forward and reverse decomposed filters, respectively, implementing the 3,5 filter pair with growth in the low pass. Referring to FIG. 9A, separation block 901 separates an input signal into even and odd samples which are output on separate outputs. Output 901A carrying the even samples and output 901B carrying the odd samples from separation block 901 are input to forward element 902, which transforms the signals using a multiplication constant of ½ and a polynomial (sum of terms) of $(1+z^{-1})$. Output 902A of forward element 902 is coupled to input 904A of forward element 904, while output 902B of forward element 902 is coupled to the input of a delay element 903. The output of delay element 903 is coupled to input 904B of forward element 904. Forward element 904 transforms these signals using a multiplication constant of $-\frac{1}{4}$ and a polynomial of $(1+z^{-1})$. The outputs of forward element 904 comprise the smooth and detail outputs of forward decomposed filter 900.

Figure 12A:
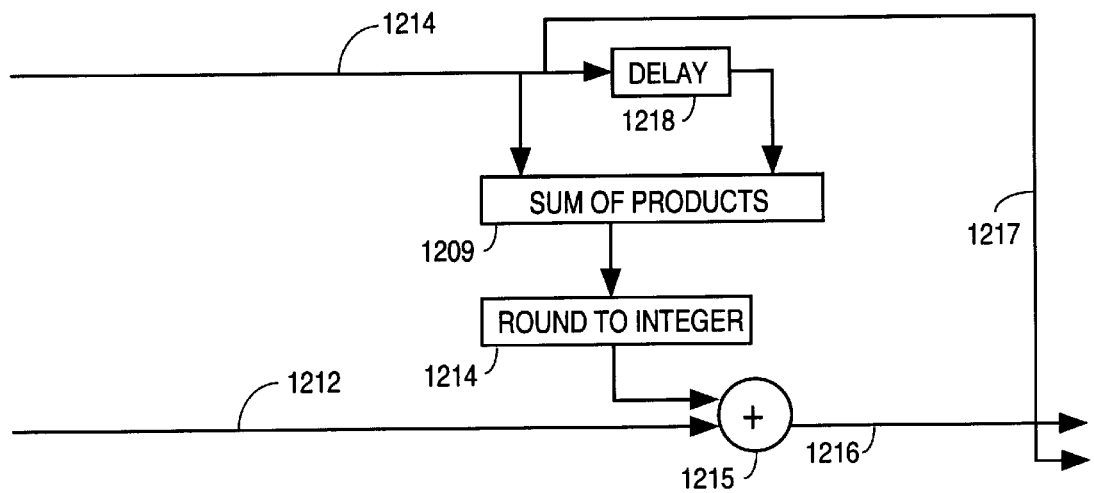
FIGS. 12A and 12B illustrate forward and inverse odd decomposition filter elements, respectively.
Figure 12B:
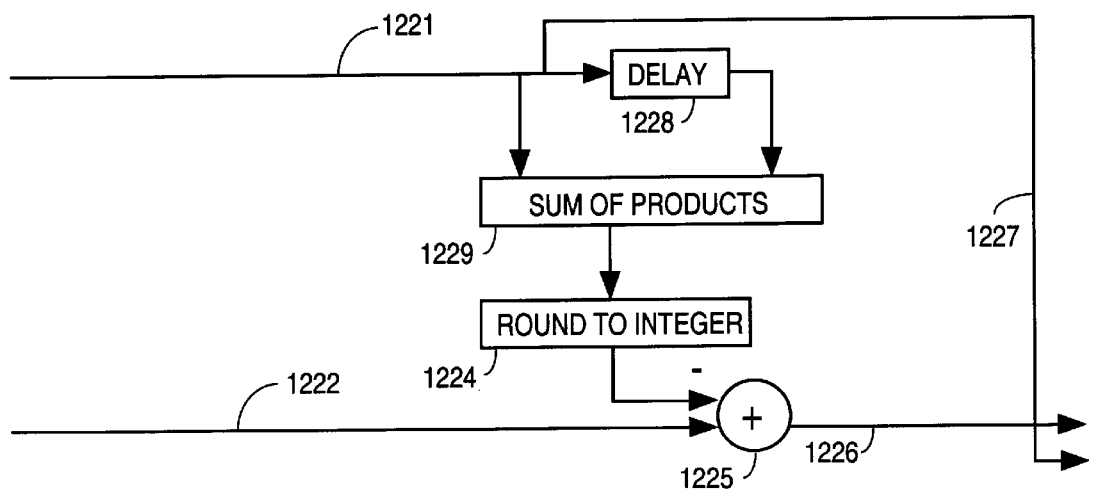
Figure 12C:
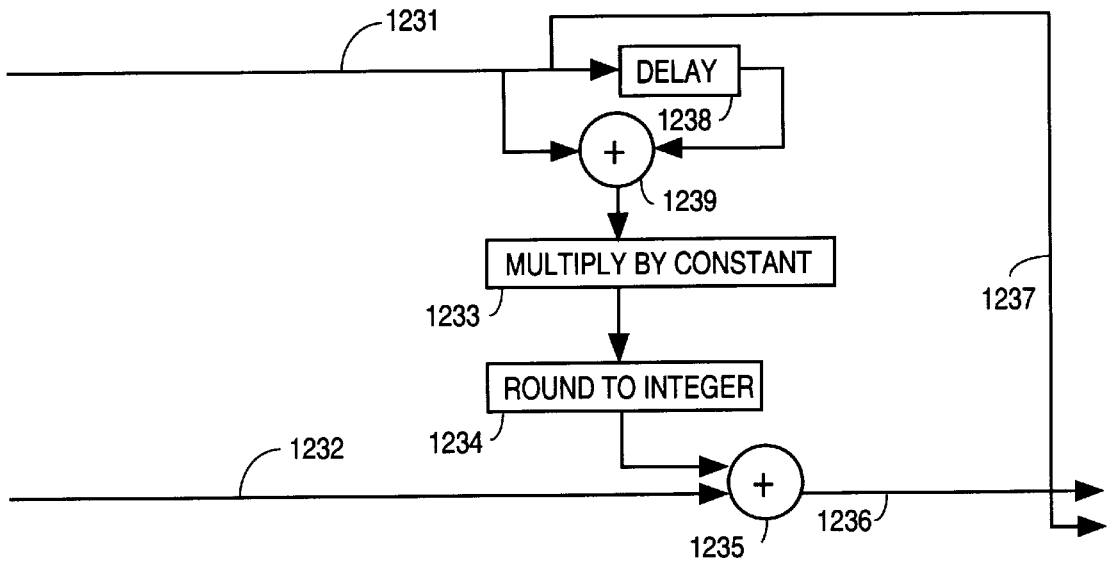
FIGS. 12C and 12D illustrate alternate embodiments of the forward and inverse odd decomposition filter elements, respectively.

In one embodiment, forward elements 902 and 904 comprise forward element 1230 of FIG. 12C. Referring to FIG. 12C, forward element 1230 comprises inputs 1231 and 1232, delay 1238, adder 1239, multiplier 1233, rounding unit 1234, adder 1235 and outputs 1237 and 1238. Each of these components is well-known in the art. Input 1231 is delayed by delay 1238 (e.g., a register, latch, etc.). In the case of FIG. 9A, the delay is $z^{-1}$ for forward elements 902 and 904.

Adder 1239 adds the output of delay 1238 to input 1231. The result of the addition is multiplied by a constant by multiplier 1233. In the case of FIG. 9A, the constant is ½ for forward element 902 and $-\frac{1}{4}$ for forward element 904. The result of the multiplication is rounded to the nearest integer by rounding unit 1234. The result of the rounding is added to input 1232 by adder 1235. The output of adder 1235 comprises output 1236 of forward element 1230. Input 1231 comprises output 1237 of forward element 1230. Thus, input 1231 is output from forward element 1230 unchanged.

Referring to FIG. 9B, inverse decomposed filter 950 comprises a delay element 905 which is coupled to receive the detail input signal. The output of delay element 905 is coupled to input 906B of inverse element 906. Input 906A of inverse element 906 is coupled to receive the smooth input to inverse decomposed filter 950. Inverse element 906 inversely transforms the signals using a multiplication constant of $-\frac{1}{4}$ and a polynomial (sum of terms) of $(1+z^{-1})$. The outputs of inverse element 906 are coupled to the inputs of inverse element 907. Inverse element 907 inversely transforms these input signals using a multiplication constant of ½ and a polynomial of $(1+z^{-1})$ to obtain even and odd samples. The outputs of inverse element 907, which are even and odd samples on separate outputs, are coupled as shown to inputs of combine block 908. Combine block 908 combines the even and odd samples to create a perfect reconstruction of the input signal.

Figure 12D:
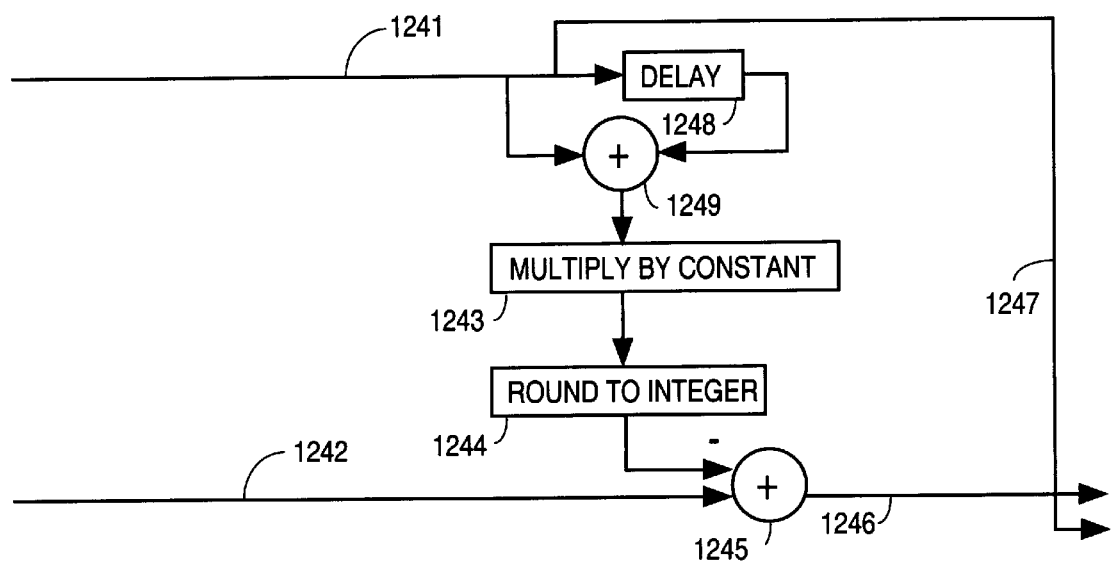

In one embodiment, inverse elements 906 and 907 comprise inverse element 1240 of FIG. 12D. Referring to FIG. 12C, inverse element 1240 comprises inputs 1241 and 1242, delay 1248, adder 1249, multiplier 1243, rounding unit 1244, subtracter 1245 and outputs 1247 and 1248. Each of these components is well-known in the art. Input 1241 is delayed by delay 1248 (e.g., a register, latch, etc.). In the case of FIG. 9B, the delay is $z^{-1}$ for inverse elements 906 and 907.

Adder 1249 adds the output of delay 1248 to input 1241. The result of the addition is multiplied by a constant by multiplier 1243. In the case of FIG. 9B, the constant is $-\frac{1}{4}$ for inverse element 906 and ½ for inverse element 907. The result of the multiplication is rounded to the nearest integer by rounding unit 1244. The result of the rounding is subtracted from input 1242 by subtracter 1245. The output of subtracter 1245 comprises output 1246 of inverse element 1240. Input 1241 comprises output 1247 of inverse element 1240. Thus, input 1241 is output from inverse element 1240 unchanged.

Another normalization of the 3,5 filters of LeGall-Tabatabai which has no growth in the low-pass is as follows:

$$\begin{cases} H_0(z) = \frac{1}{4}(1 + 2z^{-1} + z^{-2}) \\ H_1(z) = \frac{1}{4}(-1 - 2z^{-1} + 6z^{-2} - 2z^{-3} - z^{-4}) \end{cases}$$

The polyphase matrix of this transform is $$H = \begin{bmatrix} \frac{1}{4}(1 - z^{-1}) & \frac{1}{2} \\ \frac{1}{4}(-1 + 6z^{-1} - z^{-2}) & -\frac{1}{2}(1 + z^{-1}) \end{bmatrix}$$

Since $\det(H) = -z^{-1}$, in order to obtain a decomposition of reversible matrices, the polyphase matrix H is multiplied by the matrix J where J is a matrix of determinant $-z$ and defined by $$J = \begin{bmatrix} 1 & 0 \\ 0 & -z \end{bmatrix}$$

The inverse of J is $$J^{-1} = \begin{bmatrix} 1 & 0 \\ 0 & -z^{-1} \end{bmatrix}$$

Hence, multiplying H by J is as follows:

$$H \cdot J = \begin{bmatrix} \frac{1}{4}(1 + z^{-1}) & -\frac{1}{2}z \\ \frac{1}{4}(-1 + 6z^{-1} - z^{-2}) & \frac{1}{2}(z + 1) \end{bmatrix} \cdot J$$

$$= \begin{bmatrix} 1 & 0 \\ -1 + z^{-1} & 1 \end{bmatrix} \begin{bmatrix} 1 & -\frac{1}{2} \\ 0 & z^{-1} \end{bmatrix} \begin{bmatrix} 1 & 0 \\ -\frac{1}{2}(-3 + z^{-1}) & z \end{bmatrix}$$

Therefore, to obtain H, the above matrices are multiplied by $J^{-1}$ $$H = \begin{bmatrix} 1 & 0 \\ -1 + z^{-1} & 1 \end{bmatrix} \begin{bmatrix} 1 & -1/2 \\ 0 & z^{-1} \end{bmatrix} \begin{bmatrix} 1 & 0 \\ -1/2(-3 + z^{-1}) & z \end{bmatrix}$$

Figure 10A:
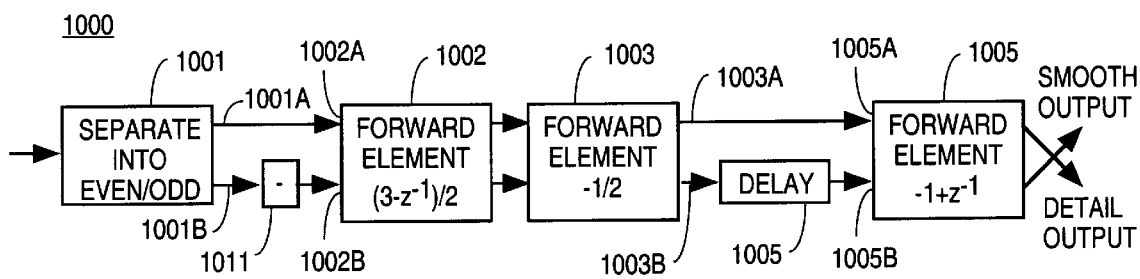
FIGS. 10A and 10B illustrate one embodiment of the forward and inverse decomposed filters, respectively, implementing the 3,5 transform without growth in the low pass.
Figure 10B:
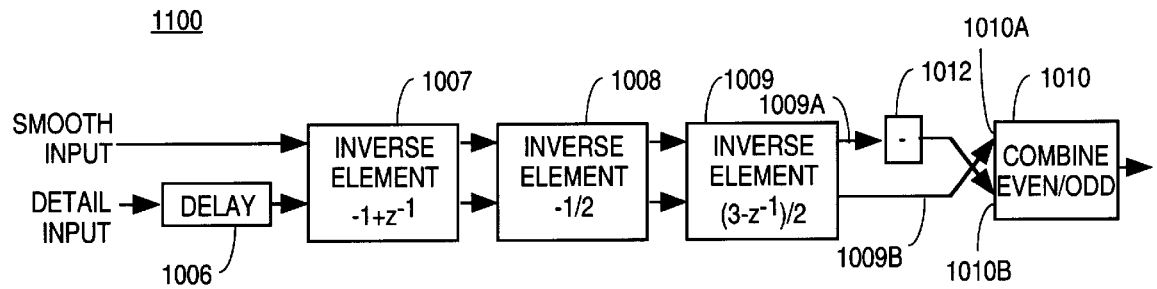

FIGS. 10A and 10B illustrate one embodiment of the forward and inverse decomposed filters, respectively, implementing the 3,5 transform without growth in the low pass. Referring to FIG. 10A, forward decomposed filter 1000 comprises separation block 1001 that separates the input signal into even samples output on output 1001A and odd samples which are output on output 1001B. The odd samples undergo negation by negating block 1011. The negated odd samples are input to input 1002B of forward element 1002. Input 1002A of forward element 1000 receives the even samples from separation block 1001. The forward element 1002 transforms these inputs using a multiplication constant of ½ and a polynomial (sum of products) of $(3 - z^{-1})$. In one embodiment, forward element 1002 comprises forward element 1210 of FIG. 12A. The resulting transformed signals are output to forward element 1003. Forward element 1003 transforms these input signals using a multiplication constant of –½ In one embodiment, forward element 1003 comprises forward element 1900 of FIG. 19A. The transformed signals on output 1003B are input to delay element 1004. The output of delay element 1004 is coupled to input 1005B of forward element 1005, while input 1005A of forward element 1005 is coupled to output 1003A of forward element 1003. Forward element 1005 transforms these input signals using a polynomial of (sum of products) of $-1 + z^{-1}$. In one embodiment, forward element 1005 comprises the forward element of FIG. 12A. The resulting transformed signals are the separate smooth and detail outputs of forward decomposed filter 1000, as shown.

In one embodiment, forward elements 1002 and 1005 comprise forward element 1210 of FIG. 12A. Referring to FIG. 12A, forward element 1210 comprises inputs 1211 and 1212, delay 1218, sum of products 1219, rounding unit 1214, adder 1215 and outputs 1217 and 1218. Each of these components is well-known in the art. Input 1211 is delayed by delay 1218 (e.g., a register, latch, etc.). In the case of FIG. 10A, the delay is $-z^{-1}$ for forward element 1002 and is $z^{-1}$ for forward element 1005.

Sum of products 1219 generates a sum of products. In the case of forward element 1002, the sum of products is the quantity of $\frac{3}{2}$ times the input signal plus the quantity of $-\frac{1}{2}$ times the input signal delayed by $z^{-1}$. In the case of forward element 1005, the sum of products is the quantity of –1 times the input signal plus the quantity of the input signal delayed by $z^{-1}$.

The result of the summation is rounded to the nearest integer by rounding unit 1214. The result of the rounding is added to input 1212 by adder 1215. The output of adder 1215 comprises output 1216 of forward element 1210. Input 1211 comprises output 1217 of forward element 1210. Thus, input 1211 is output from forward element 1210 unchanged.

Referring to FIG. 10B, the inverse decomposed filter 1100 comprises a delay element 1006 coupled to receive a detail input to inverse decomposed filter 1100. The output of delay element 1006 is coupled to a first input of inverse element 1007, while the upper input of inverse element 1007 is coupled to the second input the inverse decomposed filter 1100. Inverse element 1007 inversely transforms these input signals using a polynomial (sum of products) of $-1 + z^{-1}$. In one embodiment, inverse element 1007 comprises inverse element 1220 of FIG. 12B. The resulting transformed signals are coupled to inputs of inverse element 1008 respectively.

Inverse element 1008 transforms these inputs using a multiplication constant of –½. In one embodiment, inverse element 1008 comprises inverse element 1910 of FIG. 19B. The resulting transformed signals are coupled to inputs of inverse element 1009 respectively, which inversely transforms these inputs using a multiplication constant of ½ and a polynomial (sum of products) of $(3 - z^{-1})$. In one embodiment, inverse element 1009 comprises inverse element 1220 of FIG. 12B.

Output 1009A of inverse element 1009 is coupled to negation block 1012 which negates the signals. The output of negation block 1012, representing odd samples of the original input signal to separation block 1001, is coupled to input 1010B of combine block 1010, while input 1010A of combine block 1010 is coupled to output 1009B of inverse element 1009, which is the even samples of the original input signal to separation block 1001. Combine block 1010 combines even and odd samples to create a perfect reconstruction of the original input signal.

In one embodiment, inverse elements 1007 and 1009 comprise inverse element 1220 of FIG. 12B. Referring to FIG. 12B, inverse element 1220 comprises inputs 1221 and 1222, delay 1228, sum of products block 1229, rounding unit 1224, subtracter 1225 and outputs 1227 and 1228. Each of these components is well-known in the art. Input 1221 is delayed by delay 1228 (e.g., a register, latch, etc.). In the case of FIG. 10B, the delay is $z^{-1}$ for inverse element 1007 and $-z^{-1}$ for inverse element 1009.

Sum of products 1229 generates a sum of products. In the case of inverse element 1007, the sum of products is the quantity of $-1$ times the input signal plus the quantity of the input signal delayed by $z^{-1}$. In the case of inverse element 1009, the sum of products is the quantity of $3/2$ times the input signal plus the quantity of $-1/2$ times the input signal delayed by $z^{-1}$. The result of the summation is rounded to the nearest integer by rounding unit 1224. The result of the rounding is subtracted from input 1222 by subtracter 1225. The output of subtracter 1225 comprises output 1226 of inverse element 1220. Input 1221 comprises output 1227 of inverse element 1220. Thus, input 1221 was output from inverse element 1220 unchanged.

Long Odd Filters

As discussed above, long odd filters are filters of length 5 or more that have a region of support which is an odd number of samples.

Non-symmetric decomposition

To eliminate the overlap in any odd length linear phase filter pair, start with the filter in polyphase form:

$$\begin{bmatrix} a_0 + \ldots + a_n z^{-n} + a_{n+1} z^{-(n+1)} & b_0 + \ldots + b_{n-1} z^{-(n-1)} + b_n z^{-n} \\ c_0 + \ldots + c_m z^{-m} + c_{m+1} z^{-(m+1)} & d_0 + \ldots + d_{m-1} z^{-(m-1)} + d_m z^{-m} \end{bmatrix}$$

the polyphase matrix may be decomposed non-symmetrically with:

$$\begin{bmatrix} b_0 + \ldots + b_n z^{-(n-1)} + b_n z^{-n} & a'_0 + \ldots + a'_{n-2} z^{-(n-2)} + a'_{n-1} z^{-(n-1)} \\ d_0 + \ldots + d_{m-1} z^{-(m-1)} + d_m z^{-m} & c'_0 + \ldots + c'_{m-2} z^{-(m-2)} + c'_{m-1} z^{-(m-1)} \end{bmatrix} \begin{bmatrix} p_0 + p_1 z^{-1} & 1 \\ 1 & 0 \end{bmatrix}$$

repeatedly until it is FIR, and where $$p_0 = \frac{a_{n+1}}{b_n}$$

$$p_1 = \frac{a_{n+1}}{b_n} + \frac{a_{n+1} b_{n+1}}{b_n^2}$$

$$a'_0 = a_0 - p_0 b_0$$

$$c'_0 = c_0 - p_0 d_0$$

$$c'_i = a_i - p_0 b_i - p_1 b_{i-1} \text{ for } i = 1 \ldots n-1$$

$$c'_j = c_j - p_0 d_j - p_1 d_{j-1} \text{ for } j = 1 \ldots m-1 \text{ or } m+1$$

In one embodiment, the last matrix with $p_0+p_1 z^{-1}$, 1, 1, and 0 and its inverse may be implemented with the forward and inverse decomposition filter elements shown in FIGS. 12A and 12B respectively.

Note that for most filters of interest, $c'_m$ and $c'_{m+1}$ are zero or so close to zero that they can be ignored, but this is not required.

Symmetric Decomposition

The odd linear phase filters have symmetry $a_i = a_{n+1-i}$ and $b_j = b_{n-j}$.

To eliminate the overlap in any odd length linear phase filter pair, start with the polyphase form:

$$\begin{bmatrix} a_0 + \ldots + a_n z^{-n} + a_{n+1} z^{-(n+1)} & b_0 + \ldots + b_{n-1} z^{-(n-1)} + b_n z^{-n} \\ c_0 + \ldots + c_m z^{-m} + c_{m+1} z^{-(m+1)} & d_0 + \ldots + d_{m-1} z^{-(m-1)} + d_m z^{-m} \end{bmatrix}$$

The polyphase matrix can be decomposed symmetrically with:

$$\begin{bmatrix} b_0 + \ldots + b_{n-1} z^{-(n-1)} + b_n z^{-n} & a'_0 + \ldots + a'_{n-2} z^{-(n-2)} + a'_{n-1} z^{-(n-1)} \\ d_0 + \ldots + d_{m-1} z^{-(m-1)} + d_m z^{-m} & c'_0 + \ldots + c'_{m-2} z^{-(m-2)} + c'_{m-1} z^{-(m-1)} \end{bmatrix} \begin{bmatrix} 1 & 0 \\ 0 & z^{-1} \end{bmatrix} \begin{bmatrix} p + p z^{-1} & 1 \\ 1 & 0 \end{bmatrix}$$

repeatedly until it is FIR, and where $$p = \frac{a_0}{b_0}$$

$$a'_i = a_{i+1} - p(b_i + b_{i+1}) \text{ for } i = 0 \ldots n-1$$

$$c'_j = c_{j+1} - p(d_j + d_{j+1}) \text{ for } j = 0 \ldots m-1 \text{ or } m+1$$

In one embodiment, the last matrix and its inverse may be implemented with the forward and inverse decomposition filter elements shown in FIGS. 12C and 12D, respectively.

The following illustrate the application of these long odd filter decompositions to specific transforms.

5,7 Filter

The following is a 5,7 transform:

$$\begin{cases} H_0(z) = \frac{1}{16}(1 + 4z^{-1} + 6z^{-2} + 4z^{-3} + z^{-4}) \\ H_1(z) = \frac{1}{16}(3 + 12z^{-1} + 5z^{-2} + 40z^{-3} + 5z^{-4} + 12z^{-5} + 3z^{-6}) \end{cases}$$

The polyphase matrix of this system is $$H = \begin{bmatrix} \frac{1}{16}(1 + 6z^{-1} + z^{-2}) & \frac{1}{4}(1 + z^{-1}) \\ \frac{1}{16}(3 + 5z^{-1} + 5z^{-2} + 3z^{-3}) & \frac{1}{4}(3 - 10z^{-1} + 3z^{-2}) \end{bmatrix}$$

This matrix may be rewritten as:

$$H = \frac{1}{16} \begin{bmatrix} (1 + 6z^{-1} + z^{-2}) & (4 + 4z^{-1}) \\ (3 + 5z^{-1} + 5z^{-2} + 3z^{-3}) & (12 - 40z^{-1} + 12z^{-2}) \end{bmatrix}$$

One FIR Decomposition of the 5,7 Transform

One FIR ladder filter decomposition for 5,7 transform is as follows:

$$\begin{bmatrix} \frac{1}{16}(1+5z^{-1}) & -z^{-1} \\ \frac{1}{16}(3+2z^{-1}+15z^{-2}) & -3z^{-1}-3z^{-2} \end{bmatrix} \begin{bmatrix} 1 & 4 \\ 0 & 1 \end{bmatrix} \begin{bmatrix} 1 & 0 \\ \frac{1}{4}z^{-1} & 1 \end{bmatrix}$$

Next, the determinant of the first matrix is made 1 as follows:

$$\begin{bmatrix} \frac{1}{16}(1+5z^{-1}) & z \\ \frac{1}{16}(3+2z^{-1}+15z^{-2}) & 3z+3 \end{bmatrix} \begin{bmatrix} 1 & 0 \\ 0 & -z^{-2} \end{bmatrix} \begin{bmatrix} 1 & 4 \\ 0 & 1 \end{bmatrix} \begin{bmatrix} 1 & 0 \\ \frac{1}{4}z^{-1} & 1 \end{bmatrix}$$

After the determinant of the first matrix is made 1, the decomposition is then completed.

$$\begin{bmatrix} 1 & 0 \\ 3+2z^{-1} & 1 \end{bmatrix} \begin{bmatrix} 1 & z \\ 0 & 1 \end{bmatrix} \begin{bmatrix} 1 & 0 \\ \frac{1}{16}(-15z^{-1}+5z^{-2}) & 1 \end{bmatrix} \begin{bmatrix} 1 & 0 \\ 0 & -z^{-2} \end{bmatrix} \begin{bmatrix} 1 & 4 \\ 0 & 1 \end{bmatrix} \begin{bmatrix} 1 & 0 \\ \frac{1}{4}z^{-1} & 1 \end{bmatrix}$$

From this decomposition, the positive power of z is removed to make the filter realizable.

$$\begin{bmatrix} 1 & 0 \\ 3+2z^{-1} & 1 \end{bmatrix} \begin{bmatrix} 1 & 1 \\ 0 & z^{-1} \end{bmatrix} \begin{bmatrix} 1 & 0 \\ \frac{1}{16}(-15z^{-1}+5z^{-2}) & 1 \end{bmatrix} \begin{bmatrix} 1 & 0 \\ 0 & -z^{-1} \end{bmatrix} \begin{bmatrix} 1 & 4 \\ 0 & 1 \end{bmatrix} \begin{bmatrix} 1 & 0 \\ \frac{1}{4}z^{-1} & 1 \end{bmatrix}$$

The above matrix decomposition may be implemented using forward element 1210 of FIG. 12A and inverse element 1220 of FIG. 12B for the first, third and last matrices, forward element 1900 of FIG. 19A (with an added delay) and inverse element 1910 of FIG. 19B for the second and fifth matrices, and a delay for the fourth matrix.

An Alternative Decomposition for the 5,7 Transform

An alternative decomposition is as follows:

$$\begin{bmatrix} \frac{1}{4}(1+z^{-1}) & -\frac{1}{4} \\ \frac{1}{4}(3-10z^{-1}+3z^{-2}) & \frac{1}{4}(-3+13z^{-1}) \end{bmatrix} \begin{bmatrix} \frac{1}{4}(5+z-1) & 1 \\ 1 & 0 \end{bmatrix}$$

The first matrix has determinant $z^{-2}$. The following shows the decomposition complete as a ladder filter:

$$\begin{bmatrix} 1 & 0 \\ 3-13z^{-1}+4z^{-2} & 1 \end{bmatrix} \begin{bmatrix} 1 & -\frac{1}{4}z^2 \\ 0 & 1 \end{bmatrix} \begin{bmatrix} 1 & 0 \\ 3z^{-2}-z^{-3} & 1 \end{bmatrix} \begin{bmatrix} 1 & 0 \\ 0 & z^{-2} \end{bmatrix} \begin{bmatrix} \frac{1}{4}(5+z^{-1}) & 1 \\ 1 & 0 \end{bmatrix}$$

The positive powers of z are removed which obtains:

$$\begin{bmatrix} 1 & 0 \\ 3-13z^{-1}+4z^{-2} & 1 \end{bmatrix} \begin{bmatrix} 1 & -\frac{1}{4} \\ 0 & z^{-2} \end{bmatrix} \begin{bmatrix} 1 & 0 \\ 3z^{-2}-z^{-3} & 1 \end{bmatrix} \begin{bmatrix} \frac{1}{4}(5+z^{-1}) & 1 \\ 1 & 0 \end{bmatrix}$$

The above matrix decomposition may be implemented using forward element 600 of FIG. 6A and inverse element 650 of FIG. 6B for the first matrix, forward element 1900 of FIG. 19A (with an added delay) and inverse element 1910 of FIG. 19B for the second matrix, and forward element 1210 of FIG. 12A and inverse element 1220 of FIG. 12B for the third and fourth matrices.

Symmetric Alternative Decomposition for the 5,7 Transform

A symmetric decomposition is also follows:

$$\begin{bmatrix} \frac{1}{4}(1+z^{-1}) & \frac{1}{4} \\ \frac{1}{4}(3-10z^{-1}+3z^{-2}) & \frac{1}{4}(1+z^{-1}) \end{bmatrix} \begin{bmatrix} 1 & 0 \\ 0 & z^{-2} \end{bmatrix} \begin{bmatrix} \frac{1}{4}(1+z^{-1}) & 1 \\ 1 & 0 \end{bmatrix}$$

Figure 11A:
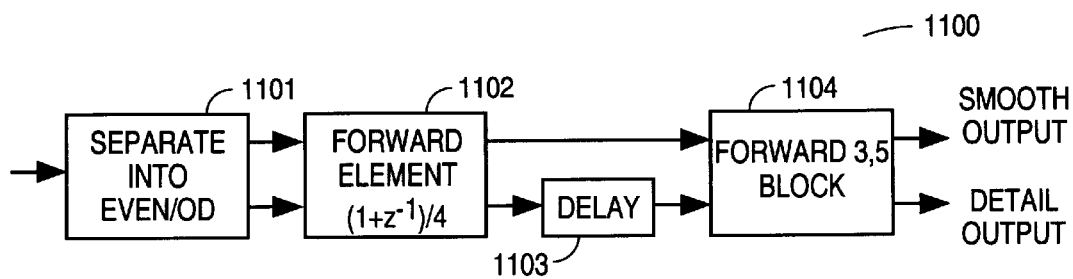
FIGS. 11A and 11B illustrate the forward and inverse decomposed filters, respectively, implementing of a 5,7 pair using 3,5 blocks.
Figure 11B:
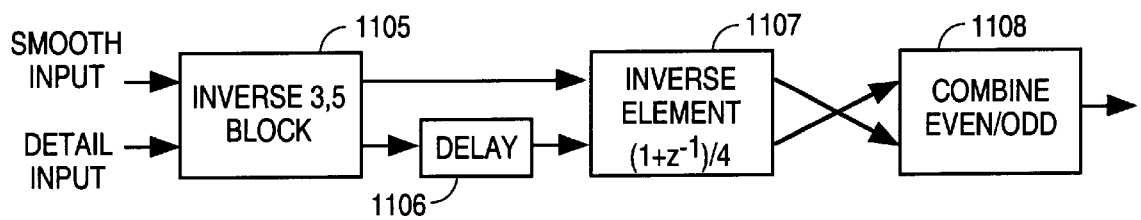

The first matrix is the 3,5 system 1 1 1, 3 3 –10 3 3. This can be implemented is a ladder filter or using the other methods for 3,5 or 5,3 transforms (short odd filters). FIGS. 11A and 11B illustrate the forward and inverse decomposed filter, respectively, implementing of the 5,7 pair using 3,5 blocks. Note that forward element 1102 and inverse element 1107 use a multiplication constant of ¼ and a polynomial (sum of products) of $(1+z^{-1})$. In one embodiment, forward element 1102 and inverse element 1107 may comprise the forward element of FIG. 12C and the inverse element of FIG. 12D, respectively.

The forward and inverse 3,5 blocks are reversible implementation of $(1+z^{-1}+z^{-2})/4$, $(3+3z^{-1}-10z^{-2}+3z^{-3}+3z^{-4})/4$.

Figure 11C:
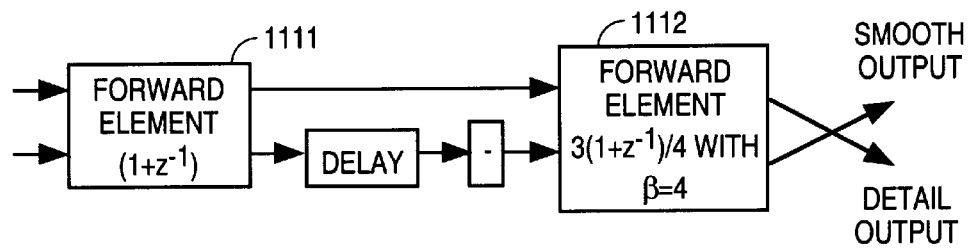
FIGS. 11C and 11D illustrate alternate embodiments of the forward and inverse decomposed ladder filter realizations, respectively, of a 5,7 filter.
Figure 11D:
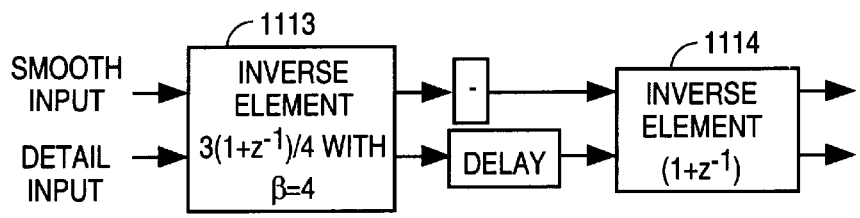

FIGS. 11C and 11D illustrate one embodiment of the forward and inverse decomposed ladder filter realizations of the 5,7 filter defined above, respectively. Referring to FIGS. 11C and 11D, forward element 1111 and inverse element 1114 use a multiplication constant of 1 and a polynomial of $(1+z^{-1})$, while forward element 1112 and inverse element 1113 use multiplication constant of ¼ and a polynomial of $(1+z^{-1})$ with β equal to 4. In one embodiment, forward element 1111 and inverse element 1114 comprise forward element 1230 of FIG. 12C and inverse element 1240 of FIG. 2D, respectively.

Figure 12E:
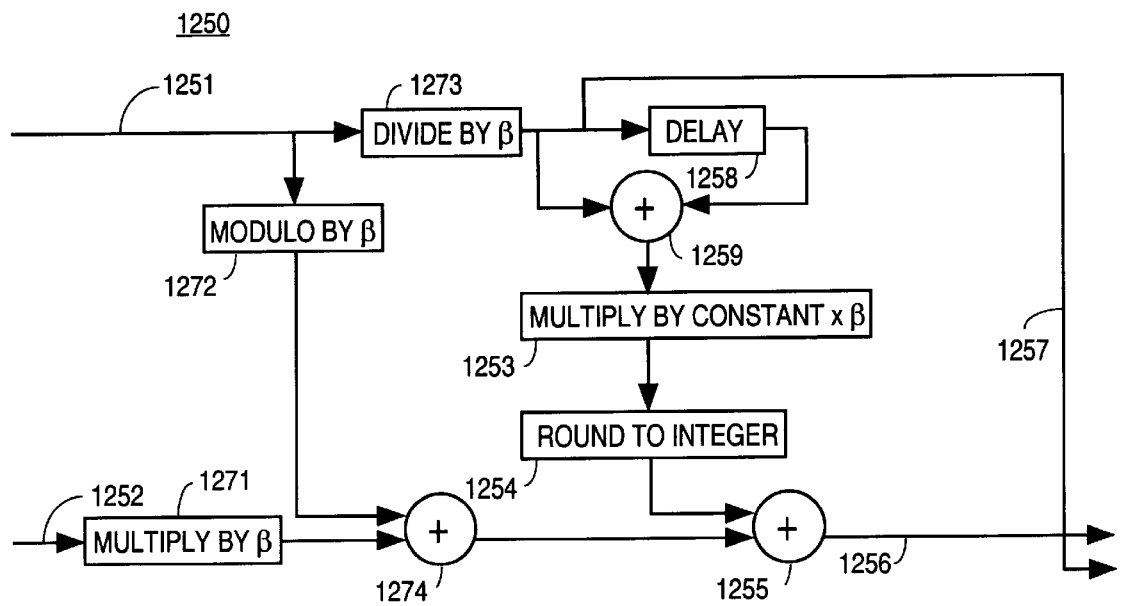
FIGS. 12E and 12F illustrate additional embodiments of the forward and inverse odd decomposition filter elements, respectively, incorporating a β factor.

In one embodiment, forward element 1112 comprises forward element 1250 of FIG. 12E. Referring to FIG. 12E, forward element 1250 comprises inputs 1251 and 1252, divide-by-β block 1273, modulo β block 1272, multiply-by-β block 1271, adder 1274, delay 1258, adder 1259, multiplier 1253, rounding unit 1254, adder 1255 and outputs 1257 and 1258. Each of these components is well-known in the art.

Input 1251 is divided by divide-by-β block 1273. The results of the division are input into delay 1258 and adder 1259. The output of delay 1258 is also input to adder 1259. Adder 1259 adds the two to produce a result. In the case of FIG. 11C, the result of applying delay 1258 and adder 1259 are to produce a polynomial of $1+z^{-1}$ times the input signal 1251.

The output of adder 1259 is multiplied by a constant (¾ in the case of forward element 1112) and by β. In the case of forward element 1112, the result of the multiplication is $3(1+z^{-1})/4$ times the input signal 1251. The result of the multiplication is rounded to the nearest integer by rounding unit 1254. The result of the rounding is input to adder 1255.

The other input to adder 1255 is the output of adder 1274, which adds the product of input 1252 multiplied by β by block 1271 and the modulo β of input 1251 performed by block 1272. The output of adder 1255 comprises output 1256 of forward element 1250. The output of divide-by-β 1273 comprises output 1257 of forward element 1250.

Figure 12F:
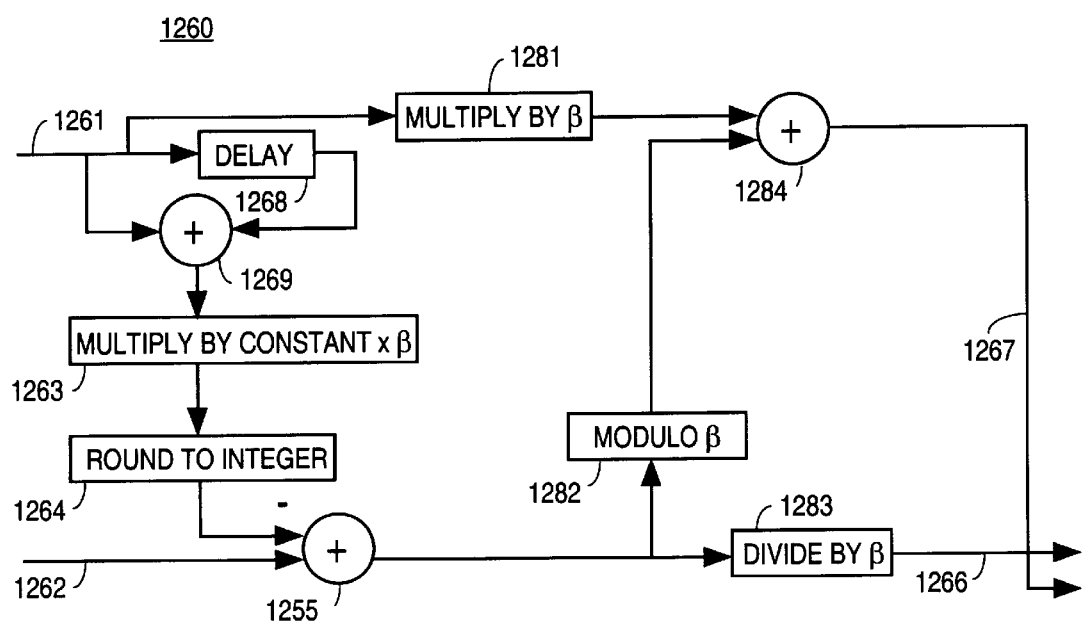

In one embodiment, inverse element 1113 comprises inverse element 1260 of FIG. 12F. Referring to FIG. 12F, inverse element 1260 comprises inputs 1261 and 1262, divide-by-β block 1283, modulo β block 1282, multiply-by-β block 1281, adder 1284, delay 1268, adder 1269, multiplier 1263, rounding unit 1264, adder 1265 and outputs 1267 and 1268. Each of these components is well-known in the art.

Input 1261 is input into delay 1268 and adder 1269. The output of delay 1268 is also input to adder 1269. Adder 1269 adds the two to produce a result. In the case of FIG. 11D, the result of applying delay 1268 and adder 1269 are to produce a polynomial of $1+z^{-1}$ times the input signal 1261.

The output of adder 1269 is multiplied by a constant (¾ in the case of inverse element 1113) and by β. In the case of inverse element 1113, the result of the multiplication is $3(1+z^{-1})/4$ times the input signal 1261. The result of the multiplication is rounded to the nearest integer by rounding unit 1264. The result of the rounding is input to adder 1265. The other input to adder 1265 is input 1262.

Input 1261 is also multiplied by f by block 1281. The result of the multiplication are added by adder 1284 to the output of block 1282, which performs the modulo β on the output of adder 1265. The output of adder 1265 is also divided by β by block 1283. The output of adder 1284 comprises output 1267 of inverse element 1260. The output of divide-by-β 1283 comprises output 1267 of inverse element 1260.

Another implementation is:

$$\begin{bmatrix} \frac{1}{4} & 0 \\ \frac{3}{4}(1+z^{-1}) & -4+\alpha \end{bmatrix}\begin{bmatrix} 1 & 0 \\ 0 & z^{-1} \end{bmatrix}\begin{bmatrix} (1+z^{-1}) & 1 \\ 1 & 0 \end{bmatrix}\begin{bmatrix} 1 & 0 \\ 0 & z^{-1} \end{bmatrix}\begin{bmatrix} \frac{1}{4}(1+z^{-1}) & 1 \\ 1 & 0 \end{bmatrix}$$

where the a added to the product of −4 and an even sample is the two least significant bits of the corresponding odd sample (odd sample modulo 4).

FIGS. 12E and 12F illustrate another alternative embodiment of the forward and odd decomposition filter elements respectively that use dynamic offsets for parameter β.

The 9,7 Filter

The 9,7 filter may also be decomposed. Table 7 below lists the filter coefficients for the 9,7 filter. The center tap is listed first, and the filters are symmetric.

TABLE 7

Approximate 9,7 filter coefficients

| 9 tap low pass filter | | | 7 tap low pass filter | | |
|---|---|---|---|---|---|
| normalized | $\Pi c1$ | $\Pi c3$ | normalized | $\Pi c2$ | $\Pi c3$ |
| | 0.151314 | 0.852699 | | −0.129078 | −0.788486 |
| 0.852699 | 5.635295 | 1.000000 | 0.788486 | −6.108601 | 1.000000 |
| 0.377402 | 2.494164 | 0.442597 | 0.418092 | −3.239065 | 0.530247 |
| −0.110624 | −0.731089 | −0.129734 | −0.040689 | 0.315228 | −0.051604 |
| −0.023849 | −0.157850 | −0.028011 | −0.064539 | 0.500000 | −0.081852 |
| 0.037828 | 0.249997 | 0.044421 | | | |

TABLE 8

Parameters for 9,7 filter

| a | = | 3.2/b | = | 4−U | = | 1.68477 |
|---|---|---|---|---|---|---|
| 3.2/a | = | b | = | 3.2/(4−U) | = | 1.89937 |
| 4−a | = | 4−(3.2/b) | = | U | = | 2.31523 |

The 9,7 filter in Polyphase form $$\begin{bmatrix} \frac{1}{4}+(2-2Y+\beta)z^{-1}+\left(\frac{7}{2}-4y+6\beta\right)z^{-2}+(2-2y+\beta)z^{-3}+\frac{1}{4}z^{-4} \\ \frac{1}{2}+\left(\frac{7}{2}-4\alpha\right)z^{-1}+\left(\frac{7}{2}-4\alpha\right)z^{-2}+\frac{1}{2}z^{-3} \end{bmatrix}$$

$$\begin{bmatrix} 1-\frac{y}{2}+\left(3-\frac{7}{2}y+4\beta\right)z^{-1}+\left(3-\frac{7}{2}y+4\beta\right)z^{-2}+\left(1-\frac{y}{2}\right)z^{-3} \\ -2+\alpha-(4-6\alpha)z^{-1}-(2-\alpha)z^{-2} \end{bmatrix}$$

The decomposition of this polyphase is as follows where F0, F1, G0, G1, F2, F3, G2, G3, P2 and P1 are given below: F2 & F3, G2 & G3 are a 5,3 transform that can be implemented as described above.

$$\begin{bmatrix} F0 & F1 \\ G0 & G1 \end{bmatrix} = \begin{bmatrix} F2 & F3 \\ G2 & G3 \end{bmatrix}\begin{bmatrix} P2 & 1 \\ 1 & 0 \end{bmatrix}\begin{bmatrix} P1 & 1 \\ 1 & 0 \end{bmatrix}$$

where

F0=0.0378285 $(1-2.92436\ z+22.5412\ z^2-2.92436\ z^3+z^4)$

F1=0.075657 $(1+z)$ $(-0.31523+5.30357\ z-0.31523\ z^2)$

F2=0.480011 $(0.937816+4.27059\ z+0.937816\ z^2)$

F3=0.509856 $(1+z)$

G0=−0.064539 $(1+z)$ $(1-7.47816\ z+z^2)$

G1=−0.129078 $(-0.31523+6.10862\ z-0.31523\ z^2)$

G2=−0.768023 $(1+z)$ G3=0.869867

P1=−1.58614 $(1+z)$

P2=−0.0529792 $(1+z)$

This may be decomposed further into:

$$\begin{bmatrix} 1.1496 & 0 \\ 0 & -0.869867 \end{bmatrix}\begin{bmatrix} 1 & 0 \\ 0 & z^{-1} \end{bmatrix}\begin{bmatrix} 0.443505w & 1 \\ 1 & 0 \end{bmatrix}\begin{bmatrix} 1 & 0 \\ 0 & z^{-1} \end{bmatrix}\begin{bmatrix} 0.88292w & 1 \\ 1 & 0 \end{bmatrix}$$

where $w=(1+z^{-1})$.

$$\begin{bmatrix} 1 & 0 \\ 0 & z^{-1} \end{bmatrix}\begin{bmatrix} -0.052972w & 1 \\ 1 & 0 \end{bmatrix}\begin{bmatrix} 1 & 0 \\ 0 & z^{-1} \end{bmatrix}\begin{bmatrix} -1.58614w & 1 \\ 1 & 0 \end{bmatrix}$$

This matrix is the multiplication by two normalization factors and does not have to be implemented for reversibility. For bitplane coding, the quantizer can take these factors into account when deciding what bitplanes of the various coefficients to keep. If the normalization is desirable, it can be reversibility implemented with the decomposition as follows:

$$\begin{bmatrix} 1.1496 & 0 \\ 0 & -0.869867 \end{bmatrix} = \begin{bmatrix} 1.1496 & 1 \\ 1 & 0 \end{bmatrix}\begin{bmatrix} 1 & 0.869867 \\ 0 & -1 \end{bmatrix}\begin{bmatrix} 1 & 0 \\ -1.1496 & -1 \end{bmatrix}$$

A general form for normalization by a and 1/a is as follows:

$$\begin{bmatrix} \frac{1}{a} & 0 \\ 0 & -a \end{bmatrix} = \begin{bmatrix} \frac{1}{a} & 1 \\ 1 & 0 \end{bmatrix}\begin{bmatrix} 1 & a \\ 0 & -1 \end{bmatrix}\begin{bmatrix} 1 & 0 \\ -\frac{1}{a} & -1 \end{bmatrix}$$

Figure 13A:
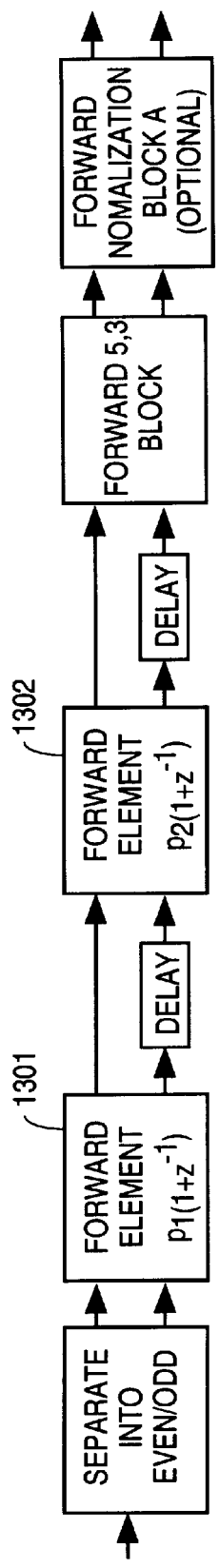
FIGS. 13A and 13B illustrate one embodiment of the forward and inverse decomposed filters, respectively, for implementing the 9,7 transform using 5,3 blocks.
Figure 13B:
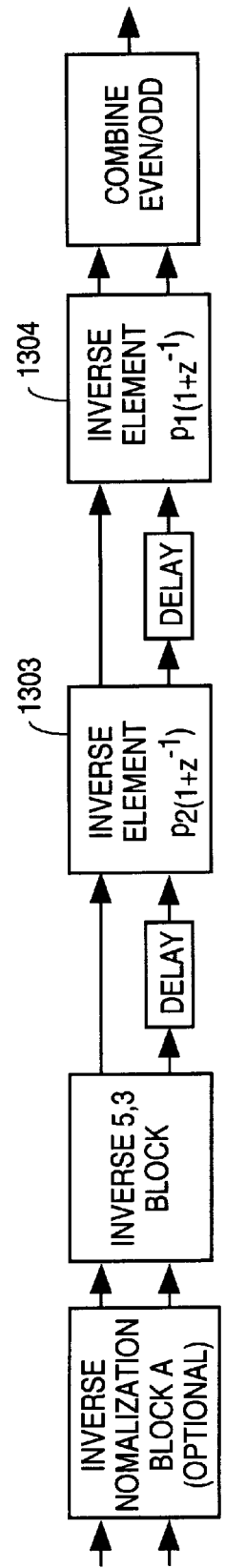

FIGS. 13A and 13B illustrate one embodiment of the forward and inverse decomposed filters respectively, for implementing the 9,7 transform using 5,3 blocks. Referring to FIGS. 13A and 13B, the forward element 1301 and the inverse element 1304 use a multiplication constants of $p_1(1+z^{-1})$, while the forward element 1302 and the inverse element 1303 use a multiplication constant of $p_2(1+z^{-1})$.

The parameterized values are as follows:

p1=−1.58614

P2=−0.0529792 g=g2/g3=0.88292 q=0.443505

The optional block is for nomalization, where a=0.869867. The 6,10 transform uses a similar nomalizing factor (a=1.1559)

Figure 14A:
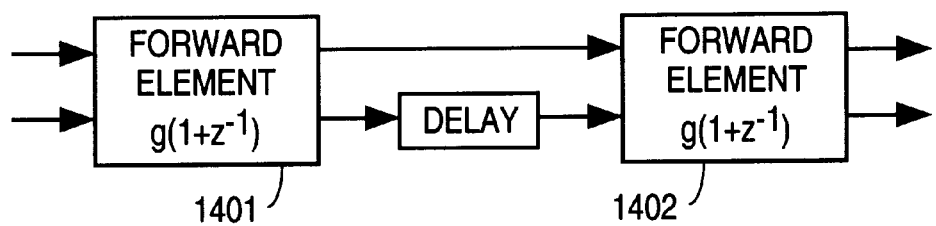
FIGS. 14A and 14B illustrate one embodiment of the forward and inverse decomposed 5,3 blocks of FIGS. 13A and 13B respectively.
Figure 14B:
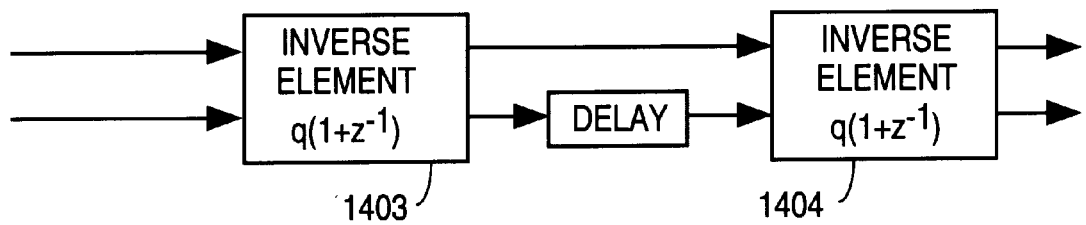

FIGS. 14A and 14B illustrate one embodiment of the forward and inverse decomposed 5,3 blocks, respectively, of FIGS. 13A and 13B respectively. Referring to FIGS. 14A and 14B, forward element 1401 and inverse element 1404 use a multiplication constant of $g(1+z^{-1})$, while forward element 1402 and inverse element 1403 use a multiplication constant of q and a polynomial (sum of products) of $(1+z^{-1})$.

Figure 14C:
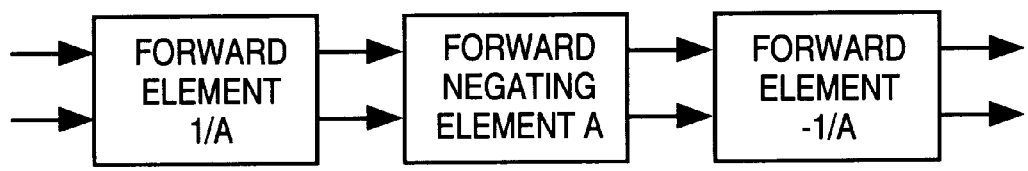
FIGS. 14C and 14D illustrate one embodiment of the forward and inverse even filtered decomposition blocks for normalization respectively of the forward and inverse decomposed filters of FIGS. 13A and 13B respectively.
Figure 14D:
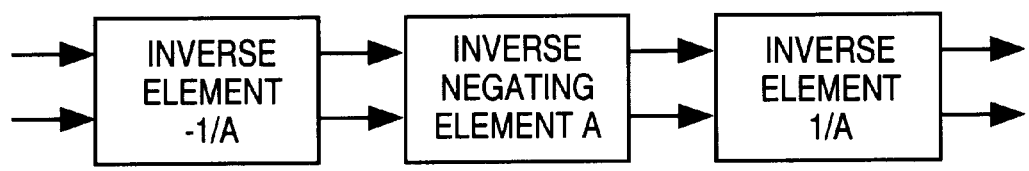
Figure 20A:
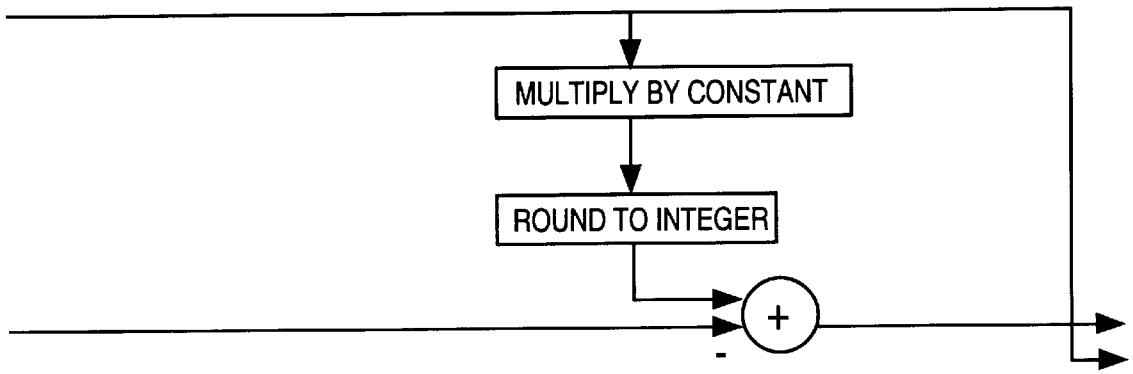
FIGS. 20A and 20B illustrate forward and inverse even decomposition filter negating elements, respectively.
Figure 20B:
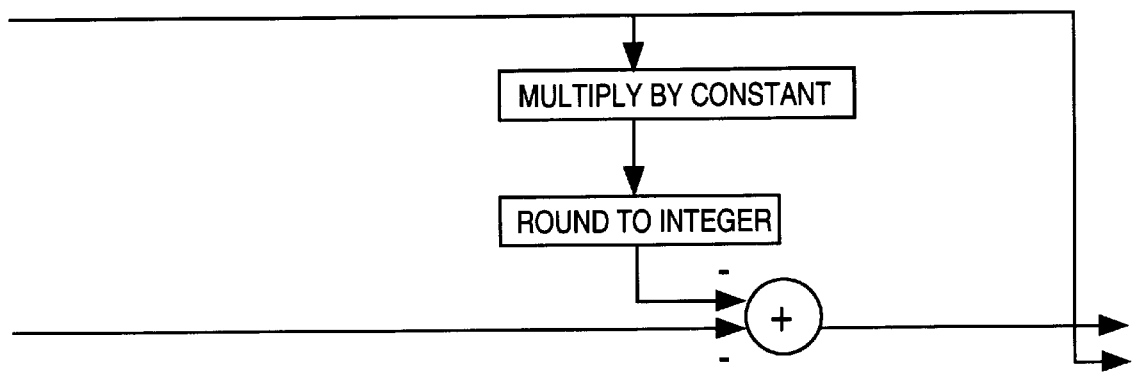

FIGS. 14C and 14D illustrate one embodiment of the forward and inverse even filter decomposition blocks for normalization respectively of the forward and inverse decomposed filters of FIGS. 13A and 13B respectively. Note that the one embodiment of negating element is shown in FIGS. 20A and 20B.

Recall that the transform was defined in terms of parameters a, b, g, where a is the unique real solution of the equation, $$w^3 - 4w^2 + 5.8w - 3.2,$$

and b=3.2/a, g=4−a. The polyphase matrix of this transform may be rewritten as, $$H = \begin{bmatrix} H_{0,0} & H_{0,1} \\ H_{1,0} & H_{1,1} \end{bmatrix}$$

$$H_{0,0} = u(1 + (8 + b - 2c)z^{-1} + (14 + 6b - 4c)z^{-2} +$$
$$(8 + b - 2c)z^{-2} + z^{-4}$$

$$H_{0,1} = u\left(4 - \frac{c}{2} + (12 + 4b - 7c/2)*z^{-1} + (12 + 4b - 7c/2)*\right.$$
$$\left. z^{-2} + \left(4 - \frac{c}{2}\right)z^{-3}\right)$$

$$H_{1,0} = u(-1/2 + (-7/2 + 4a)z^{-1} + (-7/2 + 4a)z^{-2} +$$
$$-1/2z^{-3})$$

$$H_{1,1} = u(2 - a + (4 - 6a)z^{-1} + (2 - +a)z^{-2})$$

The parameters u,v are scaling factors which are subject to 51.2uv=1 and are to be determined for othogonality. The usual approach to the optimization for orthogonality leads to the search for the minimums of the function, $$F(u) = -\frac{1}{51.2}(132.8 + 4a) +$$
$$(380.59 + 424a + 140.8a^2)u^2 + \frac{1}{51.2^2}(48 - 112a + 76a^2)u^{-2}$$

From this, the following may be obtained:

$$u = \frac{1}{\sqrt{51.2}}\left(\frac{48 - 112a + 76a^2}{380.59 - 424a + 140.8a^2}\right)$$

From this, u=0.14436 and hence v=0.135295, which leads to the deviation E=0.0213668. Daubechies et al. in their paper give the values u=0.151314, v=0.129078 which leads to deviation E=0.0335337.

Non-symmetric 9,7

One non-symmetric decomposition of the 9,7 is as follows:

$$\begin{bmatrix} f_2 & f_3 \\ g_2 & g_3 \end{bmatrix}\begin{bmatrix} 0 & 1 \\ 1 & p_2 \end{bmatrix}\begin{bmatrix} p_1 & 1 \\ 1 & 0 \end{bmatrix}$$

where

-continued $$p1 = \frac{-10 + 17a - 8a^2 - 2z + az}{2(-2+a)^2}$$

$$g2 = \frac{8(-1a)^2 v(2 - a + 2z - 5az)}{(-2+a)^2}$$

$$f2 = -11.9001\ u + 200.213\ u\ z + 242.503\ u\ z^2$$

$$p2 = \frac{(-2+a)^2(4 - 28a + 29a^2 + 4z - 12az + 5a^2 z)}{4(-1+a)^2(-2+5a)^2}$$

$$g3 = \frac{8(-2+a)^2 av}{(-2+5a)^2}$$

$$f3 = -0.032456\ u - 0.115341\ u\ z - 1.68904\ u\ z^2$$

$a = 1.68477$ $b = 1.899369053342593$ $c = 2.31523$ $u = 0.0378285$ $v = 0.064539$

Long Even Filters

For even filters, a FIR implementation is achieved by eliminating overlap until the S-transform or a similar non-overlapped transform is reached.

An even linear phase filter with length n+1 or m+1 is symmetric such that $a_i = b_{n+1-i}$ and $c_j = d_{m+1-j}$. There are two cases based on the values of a0 and b0.

Case 1: $|a0| \neq |b0|$

Any even length linear phase filter pair with $|a_0| \neq |b_0|$:

$$\begin{bmatrix} a_0 + \ldots + a_n z^{-n} + a_{n+1} z^{-(n+1)} & b_0 + \ldots + {}_n z^{-n} + b_n z^{-(n+1)} \\ c_0 + \ldots + c_m z^{-m} + c_{m+1} z^{-(m+1)} & d_0 + \ldots + d_m z^{-m} d_m z^{-(m+1)} \end{bmatrix}$$

can be decomposed with $$\begin{bmatrix} a'_0 + \ldots + a'_{n-1} z^{-(n-1)} + a'_n z^{-n} & b'_1 z^{-1} + \ldots + b'_n z^{-n} + b'_{n+1} z^{-(n+1)} \\ c'_0 + \ldots + c'_{m-1} z^{-(m-1)} + c'_m z^{-m} & d'_1 z^{-1} + \ldots + d'_m z^{-m} + d'_{m+1} z^{-(m+1)} \end{bmatrix} \begin{bmatrix} p & q \\ q & p \end{bmatrix}$$

where $$p = \sqrt{|a_0^2 - b_0^2|}$$

$$q = \frac{b_0}{\sqrt{|a_0^2 - b_0^2|}}$$

$a'_i = s(pa_i - qb_i)$ for $i = 0 \ldots n$ $b'_i = s(-qa_i + pb_i)$ for $i = 1 \ldots n+1$ $c'_i = s(pc_i - qd_i)$ for $i = 0 \ldots n$ $d'_i = s(-qc_i + pd_i)$ for $i = 1 \ldots n+1$ $$s = \begin{cases} 1 & \text{if } (|a_0| > |b_0|) \\ -1 & \text{if } (|a_0| < |b_0|) \end{cases}$$

$$r = \frac{p-1}{q} = \frac{a_0 - \sqrt{|a_0^2 - b_0^2|}}{b_0},\ r' = \frac{p+1}{q} = \frac{a_0 + \sqrt{|a_0^2 - b_0^2|}}{b_0}$$

so $$\begin{bmatrix} p & q \\ q & p \end{bmatrix}^{-1} = \begin{cases} \begin{bmatrix} p & -q \\ -q & p \end{bmatrix} & \text{if } |a_0| > |b_0| \\ \begin{bmatrix} -p & q \\ q & -p \end{bmatrix} & \text{if } |b_0| > |a_0| \end{cases}$$

Next, a $z^{-1}$ can be factored out of the polynomials for b and d. In other words, a delay can be moved in the filter implementation. Moving the delay results in the following matrix:

$$\begin{bmatrix} a'_0 + \ldots + a'_{n-1}z^{-(n-1)} + a'_n z^{-n} & b'_1 + \ldots + b'_n z^{-(n-1)} + b'_{n+1} z^{-n} \\ c'_0 + \ldots + c'_{m-1}z^{-(m-1)} + c'_m z^{-m} & d'_1 + \ldots + d'_m z^{-m} + d'_{m+1} z^{-m} \end{bmatrix} \begin{bmatrix} 1 & 0 \\ 0 & z^{-1} \end{bmatrix} \begin{bmatrix} p & q \\ q & p \end{bmatrix}$$

Symmetry is still preserved such that $a'_i = b'_{n+1-i}$ and $c_j = d_{m+1-j}$ so the decomposition can be applied repeatedly until the overlap is eliminated.

Case 2: $|a_0| = |b_0|$ $$\begin{bmatrix} a_0 + \ldots + a_n z^{-n} + a_{n+1} z^{-(n+1)} & b_0 + \ldots + b_n z^{-n} + b_n z^{-(n+1)} \\ c_0 + \ldots + c_m z^{-m} + c_{m+1} z^{-(m+1)} & d_0 + \ldots + d_m z^{-m} + b_m z^{-(m+1)} \end{bmatrix}$$

$$s = \begin{cases} 1 & \text{if } a_0 = b_0 \\ -1 & \text{if } a_0 = -b_0 \end{cases}$$

$$\begin{bmatrix} a'_0 + \ldots + a'_{(n+1)} z^{-(n-1)} & b'_0 + \ldots + b^1_{(n-1)} z^{-(n-1)} \\ c'_0 + \ldots + c'_{(m-1)} z^{-(m-1)} & d'_0 + \ldots + d^1_{(m-1)} z^{-(m-1)} \end{bmatrix}$$

$$\begin{bmatrix} p_0 + \frac{1}{2}z^{-1} + p_2 z^{-2} & -s\left(p_0 + \frac{1}{2}z^{-1} - p_2 z^{-2}\right) \\ s & 1 \end{bmatrix}$$

where $$p_0 = \frac{sa_0 + b_0}{2(sa_1 - b_1)} = \frac{b_0}{sa_1 - b_1}$$

$$p_2 = \frac{sa_0 + b_0}{2(sb_1 - a_1)} = \frac{b_0}{sb_1 - a_1}$$

$$a'_i = a_{i+1} - sb_{i+1}$$

$$b'_i = \frac{sa_i + b_i}{2} + p_0(-sa_{i+1} + b_{i+1}) + p_2(-sa_{i-1} + b_{i-1})$$

$$c'_j = c_{j+1} - sd_{j+1}$$

$$d'_j = \frac{sc_j + d_j}{2} + p_0(-sc_{j+1} + d_{j+1}) + p_2(-sc_{j-1} + d_{j-1})$$

$$\begin{bmatrix} p_0 + \frac{1}{2}z^{-1} + p_2 z^{-2} & -s\left(p_0 + \frac{1}{2}z^{-1} - p_2 z^{-2}\right) \\ s & 1 \end{bmatrix} = \begin{bmatrix} z & s\left(\frac{1}{2} - p_0 z - p_2 z^{-1}\right) \\ -sz & \frac{1}{2} + p_0 z + p_2 z^{-1} \end{bmatrix}$$

These decompositions for even filters are applied below to the 4,4 transform, 6,14, and the 6,10 transform.

The 4,4 Transform

The LeGall-Tabatabai 4,4 transform up to a scale factor is defined by $$\begin{cases} H_0(z) = \frac{1}{4\sqrt{2}}(1 + 3z^{-1} + 3z^{-1} + z^{-3}) \\ H_1(z) = \frac{1}{2\sqrt{2}}(-1 - 3z^{-1} + 3z^{-2} + z^{-3}) \end{cases}$$

The polyphase matrix of this system is $$H = \begin{bmatrix} \frac{1}{4\sqrt{2}}(1+3z^{-1}) & \frac{1}{4\sqrt{2}}(3+z^{-1}) \\ \frac{1}{2\sqrt{2}}(-1+3z^{-1}) & \frac{1}{2\sqrt{2}}(-3+z^{-1}) \end{bmatrix}$$

A 2×2 transform referred to herein as the A transform is defined by the following polyphase matrix. The A-transform "polyphase" matrix $H_A$ of this system is $$A = \begin{bmatrix} \frac{1}{2\sqrt{2}} & \frac{3}{2\sqrt{2}} \\ \frac{3}{2\sqrt{2}} & \frac{1}{2\sqrt{2}} \end{bmatrix}$$

The "A-polyphase" matrix of H is $$H_A = H \cdot A^{-1} = \begin{bmatrix} \frac{1}{2} & \frac{z^{-1}}{2\sqrt{2}} \\ -1 & z^{-1} \end{bmatrix}$$

which is the S-transform up to a delay factor corresponding to $z^{-1}$. To complete the description of a reversible implementation of the 4,4 system, the ladder expansion of the A transform is given as:

$$A = \begin{bmatrix} 1 & 0 \\ \frac{1+2\sqrt{2}}{3} & 1 \end{bmatrix} \begin{bmatrix} 1 & \frac{3\sqrt{2}}{4} \\ 0 & -1 \end{bmatrix} \begin{bmatrix} \frac{1}{2} & \frac{z^{-1}}{2} \\ -1 & z^{-1} \end{bmatrix}$$

The two irrational numbers $$\frac{1-2\sqrt{2}}{3} \text{ and } \frac{3\sqrt{2}}{4}$$

have to be implemented with some precision depending on the application. The decoder does exactly the same implementation for reversibility.

The parameters which bring the transform as close as possible to orthogonal correspond to the multiplication of $H_0(z)$ by $\sqrt{2}$ and of $H_1(z)$ by $\sqrt{2}/2$. Notice that this can be achieved in 2-dimensional implementation by simple alignment of the coefficients.

Figure 15A:
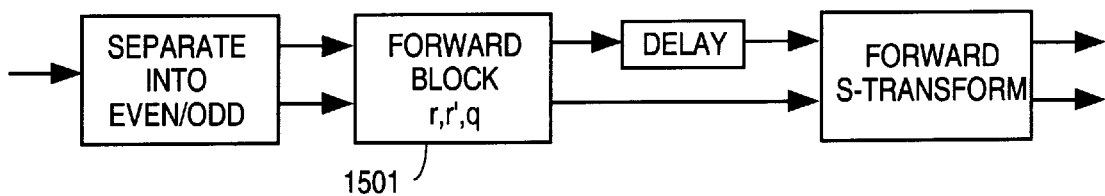
FIGS. 15A and 15B illustrate one embodiment of the forward and inverse decomposed filters, respectively, for implementing a 4,4 transform.
Figure 15B:
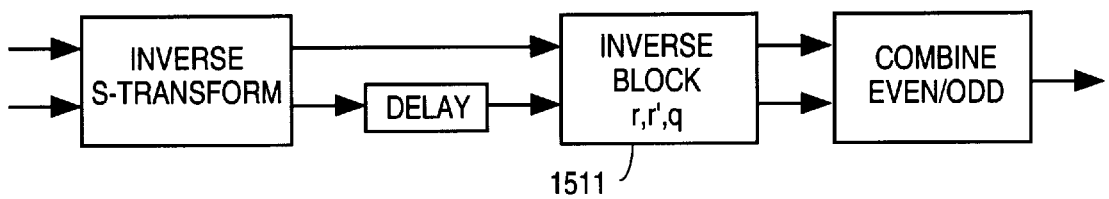

FIGS. 15A and 15B illustrate one embodiment of the forward and inverse decomposed filters, respectively, for implementing a 4,4 transform. Referring to FIGS. 15A and 15B, forward and inverse blocks are shown with references to r, r' and q. In this case, $$r = \frac{1-2\sqrt{2}}{3}$$

$$r' = \frac{1+2\sqrt{2}}{3}$$

$$q = \frac{3\sqrt{2}}{4}$$

Figure 16A:
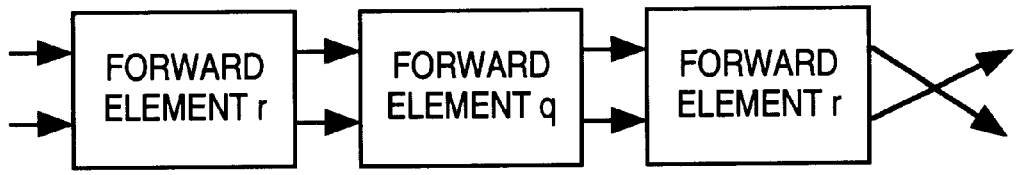
FIGS. 16A and 16B illustrate one embodiment of the forward and inverse even filtered decomposition block, respectively, for s=1 for use in the forward and inverse decomposed filters of FIGS. 15A and 15B respectively.
Figure 16B:
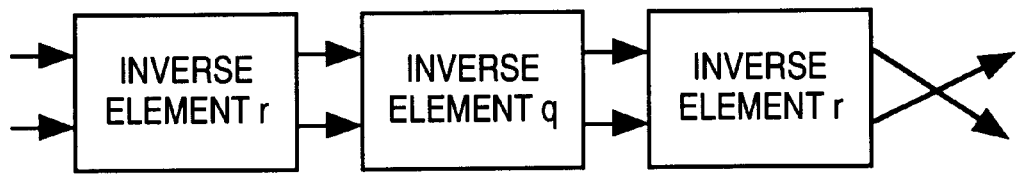
Figure 16C:
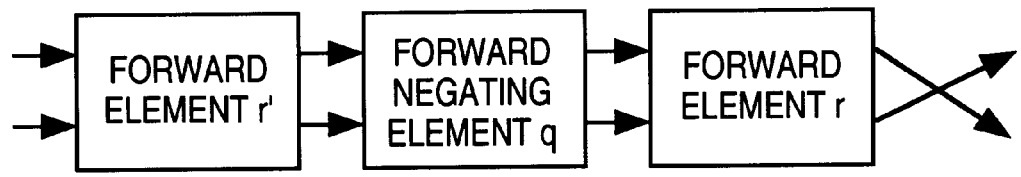
FIGS. 16C and 16D illustrate one embodiment of the forward even filtered decomposition block, respectively, for s=−1 for use in the forward and inverse decomposed filters of FIGS. 15A and 15B respectively.
Figure 16D:
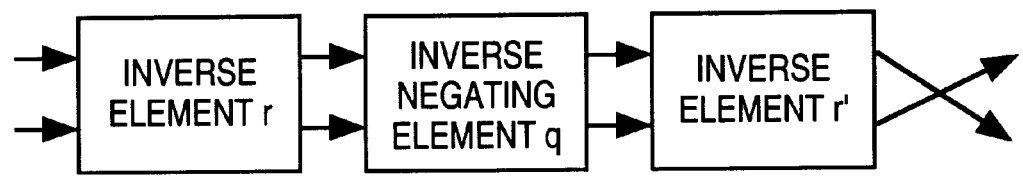

FIGS. 16A and 16B illustrate one embodiment of the forward and inverse even filtered decomposition blocks 1501 and 1511, respectively, for s=1 for use in the forward and inverse decomposed filters of FIG. 15A and 15B respectively. S is the sign of the coefficients and is equal to 1 (positive) or −1 (negative) and is defined for "case 1" and "case 2". FIGS. 16C and 16D illustrate one embodiment of the forward even filtered decomposition block, respectively, for s=−1 for use in the forward and inverse decomposed filters of FIGS. 15A and 15B respectively. The block diagrams for s=−1 are based on the following (r'=(d+1)/b, q=b, r=(a−1)/b).

$$\begin{bmatrix} a & b \\ c & d \end{bmatrix} = \begin{bmatrix} 1 & 0 \\ \frac{d+1}{b} & 1 \end{bmatrix} \begin{bmatrix} 1 & b \\ 0 & -1 \end{bmatrix} \begin{bmatrix} 1 & 0 \\ \frac{a-1}{b} & 1 \end{bmatrix}$$

Note that in each of FIGS. 16A–D, the r, q and r' represent multiplication constants employed in the element embodiments. Given ad−cb=−1 (determinant is −1)

FIGS. 19A and 19B illustrate one embodiment of the forward and inverse even decomposition filter elements, respectively. FIGS. 20A and 20B illustrate forward and inverse even decomposition filter negating elements, respectively.

The 6,14 Transform

The 6-14 transform of Jeon and Kim (See J. Jeon & J. Kim, "A New Technique of Linear Phase QMF Filter Design", Visual Communications and Image Processing '90, SPIE Vol. 1360, 1990 (pg. 860–867)) is defined by $$\begin{cases} H_0(z) = \frac{1}{8}(-1+z^{-1}+4z^{-2}+4z^{-3}+z^{-4}-z^{-5}) \\ H_1(z) = \frac{1}{128}(-1+z^{-1}+10z^{-2}-2z^{-3}-23z^{-4}-25z^{-5}+116z^{-6} - \\ \qquad 116z^{-7}+25z^{-8}+23z^{-9}+2z^{-10}-10z^{-11}-z^{-12}+z^{-13}) \end{cases}$$

The polyphase matrix of this system is $$H = \begin{bmatrix} H_{0,0} & H_{0,1} \\ H_{1,0} & H_{1,1} \end{bmatrix}$$

where $$H_{0,0} = \frac{1}{8}(-1+4z^{-1}+z^{-2})$$

$$H_{0,1} = \frac{1}{8}(1+4z^{-1}-z^{-2})$$

$$H_{1,0} = \frac{1}{128}(-1+10z^{-1}-23z^{-2}+116z^{-3}+25z^{-4}+2z^{-5}-z^{-6})$$

$$H_{1,1} = 1/128(1+2z^{-1}-25z^{-2}-116z^{-3}-23z^{-4}-10z^{-5}+z^{-6})$$

This polyphase matrix can be decomposed into ladder filters, but it is better first to go through a simpler transformation. Consider the transform $$\begin{cases} H_0(z) = 1/8(-1+z^{-1}+4z^{-2}+4z^{-3}+z^{-4}-z^{-5}) \\ H_1(z) = 1-z^{-1} \end{cases}$$

The polyphase matrix of this transform which is referred to herein as F $$F = \begin{bmatrix} \frac{1}{8}(-1+4z^{-1}+z^{-2}) & \frac{1}{8}(1+4z^{-1}-z^{-2}) \\ 1 & -1 \end{bmatrix}$$

This is a reversible system with ladder decomposition $$F = \begin{bmatrix} 1 & -\frac{1}{8}(1+4z^{-1}-z^{-2}) \\ 0 & \end{bmatrix} \begin{pmatrix} z^{-1} & 0 \\ 1 & 1 \end{pmatrix}$$

The inverse of F is $$F^{-1} = \begin{bmatrix} z & \frac{1}{8}(z+4-z^{-1}) \\ z & \frac{1}{8}(z-4-z^{-1}) \end{bmatrix}$$

Therefore, the Jeon and Kim transform with respect to the F transform has the following "polyphase" matrix $$H_F = H \cdot F^{-1} = \begin{bmatrix} 1 & 0 \\ \frac{1}{16}(1-6z^{-1}+6z^{-3}-z^{-4}) & z^{-3} \end{bmatrix}$$

This is already a ladder filter.

Figure 17A:
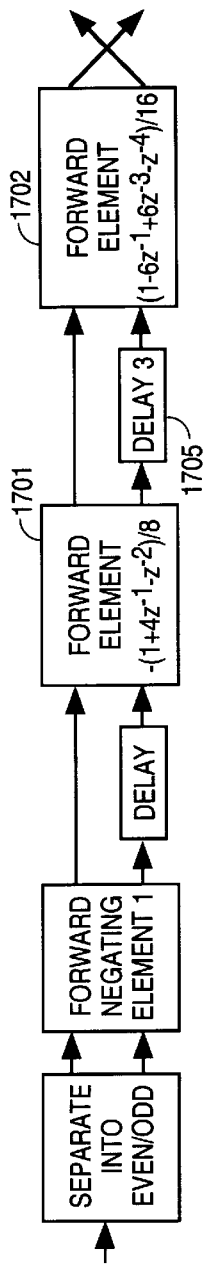
FIGS. 17A and 17B illustrate one embodiment of the forward and inverse decomposed filters, respectively, for implementing a 6,14 transform.
Figure 17B:
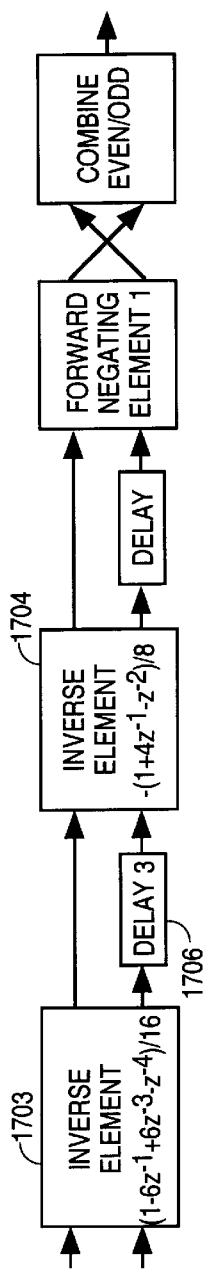

FIGS. 17A and 17B illustrate one embodiment of the forward and inverse decomposed filters, respectively, for implementing a 6,14 transform. Referring to FIGS. 17A and 17B, forward element 1701 and inverse element 1704 use a multiplication constant of −½A, and a polynomial of (i+Az$^{-1}$−z$^{-2}$) while forward element 1802 and inverse element 1803 use a multiplication constant ¹⁄₁₆ and a polynomial of (1−16z$^{-1}$+6z$^{-3}$−z$^{-4}$).

Note delays 1705 and 1706 are each a cascade of three delays.

The 6,10 Integer Transform

Figure 18A:
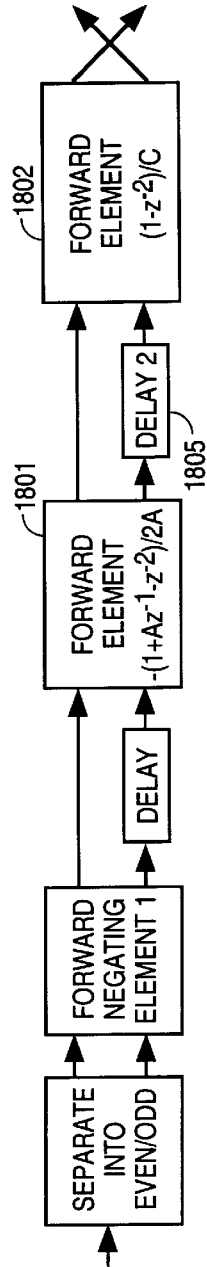
FIGS. 18A and 18B illustrate an embodiment of the forward and inverse decomposed filters. respectively, for implementing a 6,10 integer filter.
Figure 18B:
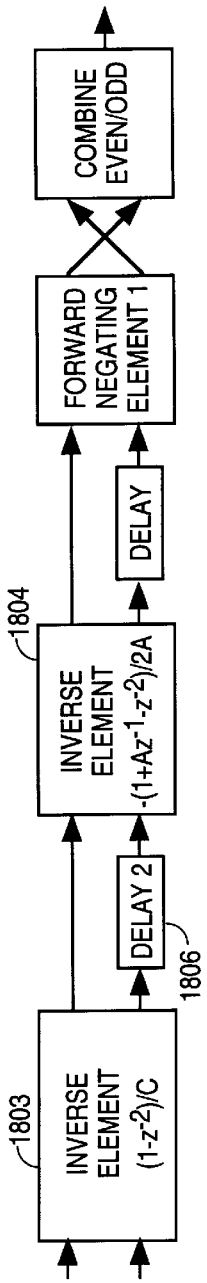

FIGS. 18A and 18B illustrate an embodiment of the forward and inverse decomposed filters, respectively, for implementing a 6,10 integer filter. Referring to FIGS. 18A and 18B, forward element 1801 and inverse element 1808 have a multiplication constant of −½A and polynomial of (1+Az$^{-1}$−z$^{-2}$), while forward element 1802 and inverse element 1803 use a multiplication constant of ⅟c and a polynomial of (1−z$^{-2}$). This gives filters $$\begin{bmatrix} \frac{1}{2A}(-1+Az^{-1}+z^{-2}) & \frac{1}{2A}(1+Az^{-1}-z^{-2}) \\ \frac{-1+Az^{-1}-(2AC-2)z^{-2}-Az^{-3}-1Z^{-4}}{2AC} & \frac{1+Az^{-1}+(2AC-2)z^{-2}-Az^{-3}+Z^{-4}}{2AC} \end{bmatrix}$$

If A=8, then the 6 tap high pass filter has no response to a quadratic and if C=4 the 10 tap high pass filter has no response to quadratic. If A is not 8, then the 6 tap high pass filter has no response only to DC. If A=8/3 and C=4, then the 10-tap high pass filter has no response to a 4th order input (Same order as 10 from 2,10, but with smaller response to 5th order). If A=4 and C=4, then the 10 tap high pass filter has no response to a quandratic and the 6 tap filter is similar in terms of moments to a 2 tap filter.

Note delays 1805 and 1806 are a cascade of two delays each.

FIGS. 19A and 19B illustrate one embodiment of the forward and inverse even decomposition filter elements, respectively. FIGS. 20A and 20B illustrate forward and inverse even decomposition filter negating elements, respectively.

The 6,10 Irrational Transform
A 6,10 irrational transform is:

$$\begin{bmatrix} f0 & f1 \\ g0 & g1 \end{bmatrix}$$

where
 f0=u(−1−4z+6az−3z$^2$−2az$^2$)
 f1=u(−3+2a−4z+6az−z$^2$)
 g0=v(1+12z+4bz−10cz+26z$^2$+40bz$^2$−30cz$^2$+20z$^3$+20bz$^3$−22cz$^3$+5z$^4$−2cz$^4$)
 g1=v(−5+2c−20z−20bz+22cz−26z$^2$+−40bz$^2$+30cz$^2$−12z$^3$−4bz$^3$+10cz$^3$−z$^4$)
and where
 f0=u(−1+6.10862z+0.36954z$^2$)
 f1=u(0.36954+6.10862z−z$^2$)
 g0=v(1−3.55482z+32.5179z$^2$+7.05232z$^3$+0.36954z$^4$)
 g1=v(−0.36954−7.05232z−32.5179z$^2$+3.55482z$^3$−z$^4$)
for
 a=1.68477
 b=1.89937
 c=2.31523
 u=0.129078
 v=0.018914

An irrational 6,10 transform uses the coefficient in Table 9 below:

TABLE 9

Approximate 6,10 irrational filter coefficients.

| 6 tap low pass filter normalized | 10 tap low pass filter nomalized |
| --- | --- |
| 0.788486 | 0.615051 |
| 0.047699 | 0.133389 |
| −0.129078 | −0.067237 |
| — | 0.006989 |
| — | 0.018914 |

FIGS. 21A and 21B illustrate an embodiment of the forward and inverse decomposed filters, respectively, of the 6,10 irrational transform using 2,6 blocks respectively. Referring to FIGS. 21A and 21B, forward block 2101 and inverse block 2106 use r, q multiplication constants, forward block 2102 and inverse block 2105 use r, r', and q. Multiplication constants, forward block 2103 and inverse block 2104 use the 2,6 blocks where
 p=−1.07618
 q=0.397691
 r=(p−1)/q=−5.220
 p$_1$=0.103762

$q_1=-1.00537$
$r_1=(p_1-1)/q_1=0.89145$
$r_1=(p1+1)/q_1=-1.097866$
The 2,6 block is
1.155922 1.155922−0.169378−0.169378−0.432552 0.432552 0.169378 0.169378
For the ladder filter implementation of the 2,6 block
$a=1-z^{-1}/1.155922$
$b=1.15592$
$c=(-(1+0.169378)+0.432552z^{-1}+0.169378z^{-2})/1.155922$.

FIGS. 22A and 22B are block diagrams of one embodiment of the forward and inverse even filter decomposition block. For the 6,10 filter, s=−1. This is the 2,6 block discussed above.

Le Gall-Tabatabai Polynomials

The general polynomials which were considered by Le Gall and Tabatabai are of the form, $$P(z)=a_0+a_2z^{-2}+\ldots+a_{2p-2}z^{-(2p-2)}+z^{-(2p-1)}+a_{2p-2}z^{-2p}+\ldots+a_2z^{-(4p-4)}+a_0z^{-(4p-2)}$$

Notice that the symmetries of the coefficients can be expressed as, $$z^{-(4p-4)}p(1/z)=P(z).$$

This is referred to herein as the "linear phase" condition. Any factorization of this polynomial into two polynomials leads to two low-pass filters (without regard to the quality of the filters). These filters are used as the low-pass analysis and synthesis filters. The corresponding high-pass filters are derived from the quadrature mirror condition. Because of the nature of the polynomial P(z), the system becomes exact reconstruction. The factorizations for which each factoring polynomial is also linear phase result in linear phase transforms. For each case p, there is a unique set of coefficients and, hence, a unique polynomial with a maximum order of $(1+z^{-1})$ as divisor. In each case, we are mainly interested in this extreme case. In the following, a few cases of these polynomials are discussed.

Case of p=1
  In this case $$P(z)=\frac{1}{2}(1+z^{-1})^2$$

Hence, up to a constant, a unique factorization is available which leads to the linear phase Hadamard system.

Case of p=2

$$P(z)=\frac{1}{16}(1+z^{-1})^4(-1+4z-z^2).$$

Notice that there are a few number of different ways that this polynomial can be factored. The following four are considered:

The 2,6 (TS) transform. This linear phase system is the result of choosing the two factors as $(1+z^{-1})$ and $(1+z^{-1})^3(-1+4z-z^2)$. The constant factor of 1/16 can be factored between the two in different ways on the usage. For example, 1/16=1/2×1/8 is good for reversible implementation and 1/16=1/√2×1/8√2 makes the transform very close to orthogonal.

The 5,3 (or 3,5) transform. This linear phase system is the result of the choice of the two factors as $(1+z^{-1})^2(-1+4z^{-1}-z^{-2})$ and $(1+z^{-1})^2$.

The 4,4 linear phase transform. This system correspondence to the factorization of $(1+z^{-1})^3$ and $(1+z^{-1})(-1+4z-z^2)$.

The Daubechie's 4,4 orthogonal non-linear phase transform. This system is the result of first factoring the quadratic term as $$-1+4z^{-1}-z^{-2}=(2+\sqrt{3}-z^{-1})(-2+\sqrt{3}+z^{-1}).$$

The polynomial is then factored into $$P(z)=P_1(z)P_2(z)$$

where, $$\begin{cases} P_1(z) = \frac{1}{4\sqrt{2}}(1-\sqrt{3})(1+z^{-1})^2(2+\sqrt{3}-z^{-1}) \\ P_1(z) = \frac{1}{4\sqrt{2}}(1+\sqrt{3})(1+z^{-1})^2(2+\sqrt{3}-z^{-1}) \end{cases}$$

Notice that $$\left(\frac{1}{4\sqrt{2}}\right)^2(1-\sqrt{3})(1+\sqrt{3})=-\frac{1}{16}.$$

Hence, the constants multiply to the correct number. These particular constants are chosen to make the system orthogonal, as described below. Multiplying the terms produces:

$$\begin{cases} P_1(z) = \frac{1}{4\sqrt{2}}[(1+\sqrt{3})+(3+\sqrt{3})z^{-1}+(3-\sqrt{3})z^{-2}+(1-\sqrt{3})z^{-3}] \\ P_2(z) = \frac{1}{4\sqrt{2}}[(1-\sqrt{3})+(3-\sqrt{3})z^{-1}+(3+\sqrt{3})z^{-2}+(1+\sqrt{3})z^{-3}] \end{cases}$$

This gives the two Debauchies low-pass analysis and synthesis filters.

Case of p=3
  In this case the polynomial is, $$P(z)=\frac{1}{256}(1+z^{-1})^6(3-18z^{-1}+38z^{-2}-18z^{-3}+3z^{-4})$$

As shown, P(z) has many linear phase factorizations. One is referred to as the 2,10 transform and corresponds to the following factorization of $P(z)=P_1(z)P_2(z)$.

$$\begin{cases} P_1(z) = \frac{1}{2}(1+z^{-1}) \\ P_2(z) = \frac{1}{128}(1+z^{-1})^5(3-18z^{-1}+38z^{-2}-18z^{-3}+3z^{-4}) \end{cases}$$

In order to investigate the existence of linear phase factorizations (besides the obvious ones) let, $$P(z) = \frac{1}{128}(1+z^{-1})^6 Q(z)$$

$$= \frac{1}{128}(1+z^{-1})^6 z^{-2} Q'(z),$$

where $$Q'(z)=3(z^2+z^{-2})-18(z+z^{-1})+38$$

By substituting $w=z+z^{-1}$, $$Q'(w)=3w^2-18w+32$$

Since $Q'(w)$ cannot be factored with real coefficients, there is no linear phase factorizations of $P(z)$ besides the obvious ones. On the other hand, the polynomial $$Q(z)=3-18z^{-1}+38z^{-2}-18z^{-3}+3z^{-4}$$

can be factored into non-linear phase quadratic polynomials $Q(z)=Q1(z)Q2(z)$ where $$\begin{cases} Q_1(z) = \frac{1}{\sqrt{2}}(a+bz^{-1}+cz^{-2}) \\ Q_2(z) = \frac{1}{\sqrt{2}}(c+bz^{-1}+az^{-2}) \end{cases}$$

and, $$\begin{cases} a = 1+\sqrt{10}+\sqrt{5+2\sqrt{10}} \\ b = 2-2\sqrt{10} \\ c = 1+\sqrt{10}-\sqrt{5+2\sqrt{10}} \end{cases}$$

The Daubachie 6,6 orthogonal, exact reconstruction, non-linear phase transform corresponds to the factorization, $$P(z) = \left(\frac{1}{16}(1+z^{-1})^3 Q_1(z)\right)\left(\frac{1}{16}(1+z^{-1})^3 Q_2(z)\right).$$

Case of p=4:

In this case, the Le Gall-Tabatabai polynomial is $$P(z) = \frac{1}{2048}(1+z^{-1})^8(-5+40z^{-1}-131z^{-2}+208z^{-3}-131z^{-4}+40z^{-5}-5x^{-6})$$

This polynomial has many obvious factorizations which are of linear phase. Some of the non-obvious factorizations are discussed below. Let $$P(z) = \frac{1}{2048}(1+z^{-1})^8 Q(z)$$
$$= \frac{1}{2048}(1+z^{-1})^8 z^{-3} Q'(z),$$

where $Q(z)$ and $Q'(z)$ are defined be, $$\begin{cases} Q(z) = -5+40z^{-1}-131z^{-2}+208z^{-3}-131z^{-4}+40z^{-5}-5z^{-6} \\ Q(z) = -5(z^3+z^{-3})+40(z^2+z^{-2})-131(z+z^{-1})+208 \end{cases}$$

By substituting $w=(z+z^{-1})/2$, $$Q'(w)=-40(-3.2+5.8w-4w^2+w^3).$$

The polynomial $Q'(w)$ has a unique factorization with real coefficients, $$Q'(w)=40(a-w)(\beta-qw+w^2),$$

where, $a \approx 1.68477$, $\beta=3.2a$, $q=4-a$.

Finally, $P(z)$ can be factored as, $$P(z)=P_1(z)P_2(z),$$

where, $(w=(z+z^{-1})/2)$.

$$\begin{cases} P_1(z) = c_1\left((1+z^{-1})^4 z^{-2}(\beta-\gamma w+w^2)\right) \\ P_2(z) = c_2(1+z^{-1})^4 z^{-1}(a-w) \end{cases}$$

After substituting back $w=(z+z^{-1})/2$, with the choice of $c_1 \approx 0.151314$ and $c_2 \approx 0.129078$, the famous 9,7 linear phase transform is obtained. Notice that from the above factorization of $P(z)$, all the linear phase factorizations are obtained. For non-linear phase polynomials, the polynomial $Q(z)$ can be factored into non-linear phase polynomials. The Daubachies 8,8 orthogonal transform can be derived in a similar fashion.

Orthogonality

In terms of polyphase matrix $H(z)$, orthogonality can be expressed very simply, i.e., $H^{-1}(z)=H^t(1/z)$. From this, the following definition for the deviation from orthogonal, which is based on mean square error, is as follows:

$$E=\|H^{-1}(z)-H^t(1/z)\|^2.$$

In this, $\|A\|^2$ where $A=a_{i,j}(z))$ is a matrix of z-transforms, is defined as $$\|A\|^2 = \sum_{ij} \|a_{ij}\|^2$$

Moreover, for a matrix term $$a = \sum_i a_i z_a^i$$

which is a z-transform, $\|a\|$ is defined in the obvious fashion as, $$\|a\|^2 = \Sigma a_i^2.$$

The TS-transform was defined by two filters. These filters would keep all of their basic properties if they are multiplied by constants u and v respectively, provided that $16uv=1$. This condition is needed for exact reconstruction. In order to find the best factors for orthogonality, the polyphase matrix of the TS-transform is defined in terms of the parameters as follows:

$$H = \begin{bmatrix} u & u \\ v(1-8z^{-1}-z^{-2}) & v(1+8z^{-1}-z^{-2}) \end{bmatrix}$$

Recall that the TS-transform defined before corresponds to $u=\frac{1}{2}$ and $v=\frac{1}{8}$. Hence, E the deviation from orthogonal when $$v = \frac{1}{16u}$$

is substituted is the following:

$$E = 4\left(u^2 + \frac{33}{128}u^{-2} - 1\right)$$

Minimizing E results in the following:

$$\begin{cases} u = 0.712567 \\ v = 0.087711 \end{cases}$$

This results in the deviation from orthogonal of E=0.0620192. Notice that the computed u and v are quite close to $u=1/\sqrt{2}=0.707107$ and $v=\frac{1}{8}\sqrt{2}=0.0883883$. These values result in E=0.0625 and often are used in practical implementations with significant advantage.

The 3–5 filter is another example that is considered for detailed analysis of its deviation from othogonal. Similar to the previous example, the parameterized polyphase matrix is considered.

$$H = \begin{bmatrix} u(1+z^{-1}) & 2u \\ v(-1+6z^{-1}-z^{-2}) & -2v(1+z^{-1}) \end{bmatrix}$$

The deviation from orthogonal after substituting $$v = \frac{1}{16u}$$

is,

E(u)=12u²+23/64u⁻²−4

Minimizing E leads to u=0.415998, v=0.150241 and E=0.153309.

Similarly, the 4-4 transform may be written to its parametrized polyphase matrix as $$H = \begin{bmatrix} u(1+3z^{-1}) & u(3+z^{-1}) \\ v(-1+3z^{-1}) & v(-3+z^{-1}) \end{bmatrix}$$

The deviation from orthogonal after substituting $$v = \frac{1}{16u}$$

is, $$E(u) = 2\left(-2 + \frac{5}{64}u - 2 + 20u^2\right).$$

This clearly achieves its minimum at u=¼. Hence, the best parameters for orthogonality are u=v=¼, with E=1.

The 2,10 transform (TT-transform) may be written into the polyphase matrix with parameters as follows:

$$H = \begin{bmatrix} u & u \\ v(3-22z^{-1}+128z^{-2}+22z^{-3}-3z^{-4}) & v(3-22z^{-1}-128z^{-2}+22z^{-3}-3z^{-4}) \end{bmatrix}$$

The deviation from orthogonal after substituting $$v = \frac{1}{256u}$$

is,

E(u)=4(u²+17370/65536u⁻²−1)

E(u) takes its minimum at u=0.717513. Hence, the parameters with the best orthogonality condition are u=0.717513 and v=0.00544415. The corresponding E=0.118603. A good approximation of u for implementation ease is, $u=1/\sqrt{2}=0.707107$ which corresponds to $$v = \frac{1}{128\sqrt{2}} = 0.00552427 \text{ and } E = 0.120361.$$

Ladder Decomposition of 3×3 Matrices

The theorem on the decomposition of the 2×2 matrices of determinant unity can be generalized to n×n matrices where A be an n×n matrix with det (A)=1. Then

A=PLUV where L is lower triangular with all diagonal elements equal to 1, U is upper triangular with all the diagonal elements equal to 1, V has all the diagonal elements equal to 1 and zero everywhere else except for the first column. P is a permutation matrix that is needed to cover the exceptional cases. This is shown concretely for a 3×3 matrix. Let, $$A = \begin{bmatrix} a_{1,1} & a_{1,2} & a_{1,3} \\ a_{2,1} & a_{2,2} & a_{2,3} \\ a_{3,1} & a_{3,2} & a_{3,3} \end{bmatrix}$$

be a matrix with det (A)=1, $a_{1,2}\neq 0$, and $\Delta=a_{1,2}a_{2,3}-a_{1,3}a_{2,2}\neq 0$. Then, there is the following decomposition

A=LUV, where $$L = \begin{bmatrix} 1 & 0 & 0 \\ \frac{a_{1,2}-1}{a_{1,2}} & 1 & 0 \\ b & c & 1 \end{bmatrix}$$

$$U = \begin{bmatrix} 1 & a_{1,2} & a_{1,3} \\ 0 & 1 & \frac{\Delta-a_{1,3}}{a_{1,2}} \\ 0 & 0 & 1 \end{bmatrix}$$

$$V = \begin{bmatrix} 1 & 0 & 0 \\ u & 1 & 0 \\ v & 0 & 1 \end{bmatrix}$$

The expressions for b, c, u, v can be calculated as $$b = \left(1 + \frac{a_{1,3}a_{3,2}}{a_{1,2}}(1 - a_{1,3}) + a_{2,3}a_{3,2} - a_{3,3}\right)/\Delta$$

$$c = (-a_{1,2} - a_{1,3}a_{3,2} + a_{1,2}a_{3,3})/\Delta$$

$$u = \left(\frac{a_{1,3}}{a_{1,2}}(a_{1,2} - 1) - a_{1,3}a_{2,1} + a_{1,1}a_{2,3}\right)/\Delta$$

$$v = (1 + a_{1,1}a_{2,1} - a_{1,1}a_{2,2})/\Delta$$

An Exemplary Compression/Decompression System

The present invention provides a compression/decompression system having an encoding portion and a decoding portion. The encoding portion is responsible for encoding input data to create compressed data, while the decoding portion is responsible for decoding previously encoded data to produce a reconstructed version of the original input data. The input data may comprise a variety of data types, such as image (still or video), audio, etc. In one embodiment, the data is digital signal data; however, analog data digitized, text data formats, and other formats are possible. The source of the data may be a memory or channel for the encoding portion and/or the decoding portion.

In the present invention, elements of the encoding portion and/or the decoding portion may be implemented in hardware or software, such as that used on a computer system. The present invention provides a lossless compression/decompression system. The present invention may also be configured to perform lossy compression/decompression.

Figure 23:
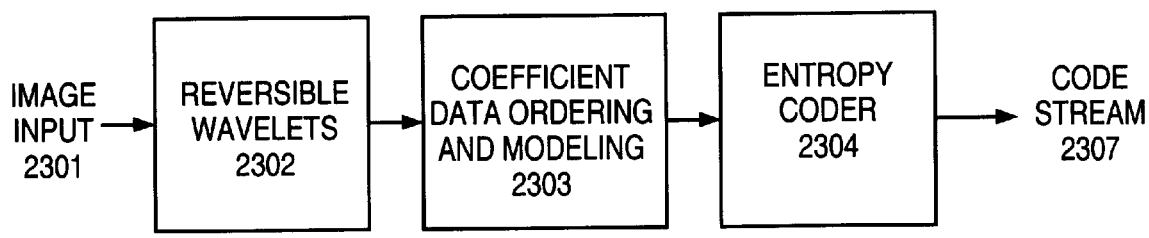
FIG. 23 is a block of one embodiment of an encoding portion of a coding system of the present invention.

FIG. 23 is a block diagram of one embodiment of the encoding portion of the system. Note the decoding portion of the system operates in reverse order, along with the data flow. Referring to FIG. 23, input image data 2301 is received by wavelet transform block 2302. The output of wavelet transform block 2302 is coupled to coefficient data ordering and modeling block 2303. In response to the output from wavelet transform block 2302, the ordering/modeling block 2303 produces at least one bit stream that is received by an entropy coder 2304. In response to the input from ordering/modeling block 2303, entropy coder 2304 produces code stream 2307.

Figure 24:
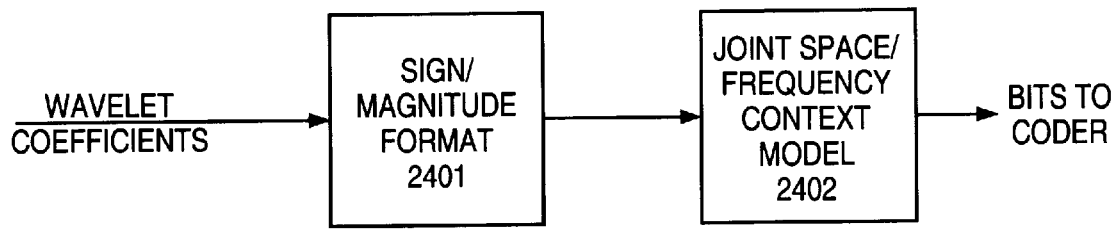
FIG. 24 is a block diagram of one embodiment of a coefficient data ordering and modeling of the present invention.

In one embodiment, the ordering/modeling block 2303 comprises a sign/magnitude formatting unit 2401 and a joint space/frequency context model 2402, such as shown in FIG. 24. In one embodiment, the joint space/frequency context model 2402 comprises a context model, as is described below. The input of the sign/magnitude unit 2401 is coupled to the output of the wavelet transform coding block 2302. The output of sign/magnitude unit 2401 is coupled to joint space/frequency modeling block 2402. The output of JSF context model 2402 is coupled to the input of entropy coder 2304 which produces the output code stream 2307.

Referring back to FIG. 23, in the present invention, the image data 2301 is received and transform coded using reversible wavelets in wavelet transform block 2302, as defined below, to produce a series of coefficients representing a multi-resolution decomposition of the image. In one embodiment of the present invention, the transform is reversible with non-linearities in addition to rounding associated with integer division. In another embodiment, the transforms are implemented with filters which may be decomposed such that all parts of an implementation are FIR. The transforms may be performed in software or hardware with no systematic error. Furthermore, the wavelets of the present invention are excellent for energy compaction and compression performance. These coefficients are received by the ordering/modeling block 2303.

The ordering/modeling block 2303 provides coefficient ordering and modeling. The coefficient ordering provides an embedded data stream. The embedded data stream allows a resulting codestream to be quantized at encode time, transmission time, or decode time. In one embodiment, ordering/modeling block 2303 orders and converts the coefficients into sign-magnitude format and, based on their significance (as described below later), the formatted coefficients are subjected to an embedded modeling method. In one embodiment, the formatted coefficients are subjected to joint spatial/frequency modeling.

The results of ordering and modeling comprise decisions (or symbols) to be coded by the entropy coder. In one embodiment, all decisions are sent to a single coder. In another embodiment, decisions are labeled by significance, and decisions for each significance level are processed by different (physical or virtual) multiple coders.

Referring back to FIG. 24, the bit stream(s) resulting from JSF context model block 2401 are encoded in order of significance using entropy coder 404. In one embodiment, entropy coder 404 comprises one or more binary entropy coders.

Such a system is shown in U.S. Ser. No. 08/498,036, entitled "Reversible Wavelet Transform and Embedded Codestream Manipulation", filed Jun. 30, 1995, U.S. Ser. No. 08/498,695, entitled "Method and Apparatus for Compression Using Reversible Wavelet Transforms and an Embedded Codestreamr", filed Jul. 3, 1995, U.S. Ser. No. 08/642,518, entitled "Compression and Decompression with Wavelet Style and Binary Style Including Quantization by Device-dependent Parser", filed May 3, 1996; and "Implementation of Compression with Reversible Embedded Wavelets," by Edward L. Schwartz, Ahmad Zandi, Martin Boliek, Proc. of SPIE 40th Annual Meeting, vol. 2564, San Diego, Calif., July 1995, which are incorporated by reference.

In the present invention, the coefficient data ordering and modeling 403 and entropy coder 404 form an encoding unit. In one embodiment, the coefficient data order and modeling block 403 and entropy coder comprise single integrated circuit.

Although not shown, the present invention also includes a decoder having an entropy decoder that decodes compressed data received from the entropy coder 404 (or other) over a channel or from a memory. The data is decoded using a similar modeling and reverse ordering block. The decoder also includes an inverse transform filter. In one embodiment, the inverse transform filter is a linear filter. In such a case, the decoder is a lossy decoder. In an alternate embodiment, the inverse transform filter is a reversible wavelet filter and, thus, the decoder may be lossy or lossless. The lossy or lossless nature may be determined using a data management unit that controls what is output from the decoder.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of various embodiment are not intended to limit the scope of the claims which in themselves recite only those features regarded as essential to the invention.

We claim:

1. An apparatus for transforming an input signal, said apparatus comprising:

a separation unit to separate the input signal into even and odd samples the even and odd samples being integers;

a cascaded set of forward overlapped reversible transforms coupled in a finite impulse response (FIR) ladder configuration as ladder filter elements, wherein inputs of a first forward overlapped reversible transform in the set of forward overlapped reversible transforms are coupled to receive the even and odd samples from the separation unit, wherein the set of forward overlapped reversible transforms have integer inputs and outputs, wherein the configuration generates output integers with no redundancy in their least significant bits.

2. The apparatus defined in claim 1 wherein one of the ladder filter elements comprises:

a first output coupled to a first input, the first output being a detail output;

at least one delay coupled to delay the first input to produce a delayed input signal;

a function unit coupled to receive the input signal and the output of said at least one delay to perform a function thereon, said function unit outputting an intermediate result;

a round-to-integer unit coupled to the function unit to round an intermediate result into a rounded intermediate result;

an adder coupled to add the rounded intermediate result to a second input to produce a second output, said second output being a smooth output.

3. The apparatus defined in claim 1 wherein one of the ladder filter elements comprises:

first and second inputs;

a multiplier coupled to the first input to multiply the first input by a constant and produce a first result;

a rounding unit coupled to the multiplier to round the first result to an integer value;

an adder coupled to the rounding unit and the second input to add the integer value to the second input to generate a second result;

a first output coupled to the adder to output the second result; and a second output coupled to the first input to output the first input unchanged.

4. The apparatus defined in claim 1 wherein one of the ladder filter elements comprises:

first and second inputs;

a multiplier coupled to the first input to multiply the first input by a constant and produce a first result;

a rounding unit coupled to the multiplier to round the first result to an integer value;

a subtractor coupled to the rounding unit and the second input to subtract the integer value from the second input to generate a second result;

a first output coupled to the adder to output the second result; and a second output coupled to the first input to output the first input unchanged.

5. The apparatus defined in claim 1 wherein one of the ladder filter elements comprises:

first and second inputs;

a delay coupled to the first input to generate a delayed first input;

a sum of products unit coupled to the first input and to the delay to generate a sum of products as a polynomial, the first unit producing a first result;

a rounding unit coupled to the sum of products unit to round the first result to an integer value;

an adder coupled to the rounding unit and the second input to add the integer value to the second input to generate a second result;

a first output coupled to the adder to output the second result; and a second output coupled to the first input to output the first input unchanged.

6. The apparatus defined in claim 1 wherein one of the ladder filter elements comprises:

first and second inputs;

a delay coupled to the first input to generate a delayed first input;

a first adder coupled to the first input and to the delay to add the first input to the delayed first input to produce a first result;

a multiplier coupled to the first adder to multiply the first result by a constant to produce a second result;

a rounding unit coupled to the multiplier to round the second result to an integer value;

a second adder coupled to the rounding unit and the second input to add the integer value to the second input to generate a third result;

a first output coupled to the second adder to output the third result; and a second output coupled to the first input to output the first input unchanged.

7. The apparatus defined in claim 1 wherein one of the ladder filter elements comprises:

first and second inputs;

a divider coupled to divide the first input by b and to output a divided first input;

a delay coupled to the divider to delay the divided first input and to produce a delayed first input;

a first adder coupled to the first input and to the delay to add the first input to the delayed first input to produce a first result;

a first multiplier coupled to the first adder to multiply the first result by a constant and by b to produce a second result;

a rounding unit coupled to the first multiplier to round the second result to an integer value;

a second multiplier coupled to the second input to multiply the second input by b;

a modulo b unit coupled to the first input to generate the modulo b of the first input;

a second adder coupled to the second multiplier and to the modulo b unit to add outputs therefrom to generate a third result;

a third adder coupled to the rounding unit and the second adder to add the integer value to the second input to generate a fourth result;

a first output coupled to the third adder to output the fourth result; and a second output coupled to the divider to output the divided first input, such the fourth result and the divided first input are outputs of said one filter element.

8. The apparatus defined in claim 1 wherein the set of forward reversible transforms comprises:

a first forward element; and a second forward element coupled to receive outputs of the first forward element.

9. The apparatus defined in claim 1 wherein the set of forward reversible transforms comprises:

a first transform;

a delay coupled to receive a first output of the first transform; and a forward element coupled to receive a second output of the first transform and an output of the delay.

10. The apparatus defined in claim 1 wherein the set of forward reversible transforms comprises:

a first forward element;

a delay coupled to receive a first output of the first forward element; and a second forward element coupled to receive a second output of the first forward element and an output of the delay.

11. The apparatus defined in claim 1 wherein the set of forward reversible transforms comprises:

a negating block coupled to receive a first input to the set of forward reversible transforms;

a first forward element coupled to receive a second input to the set of forward reversible transforms and an output of the negating block;

a second forward element coupled to receive outputs of the first forward element;

a delay coupled to receive a first output of the second forward element; and a third forward element coupled to receive a second output of the second forward element and an output of the delay.

12. The apparatus defined in claim 1 wherein the set of forward reversible transforms comprises:

a forward element;

a delay coupled to receive a first output of the first forward element; and a forward 3,5 transform block coupled to a second output of the first forward element and an output of the delay.

13. The apparatus defined in claim 1 wherein the set of forward reversible transforms comprises:

a first forward element;

a delay coupled to receive a first output of the first forward element;

a negating block coupled to receive an output of the delay; and a second forward element coupled to receive a second output of the first forward element and an output of the negating block.

14. The apparatus defined in claim 1 wherein the set of forward reversible transforms comprises:

a first forward element;

a first delay coupled to receive a first output of the first forward element;

a second forward element coupled to receive a second output of the first forward element and an output of the first delay;

a second delay coupled to receive a first output of the second forward element;

a forward 5,3 block coupled to receive a second output of the second forward element and an output of the second delay; and a forward normalization block coupled to the forward 5,3 transform block.

15. The apparatus defined in claim 1 wherein the set of forward reversible transforms comprises:

a first forward element;

a forward negating element coupled to receive outputs of the first forward element; and a second forward element coupled to receive outputs of the forward negating element.

16. The apparatus defined in claim 1 wherein the set of forward reversible transforms comprises:

a first block comprising a series of forward elements;

a delay coupled to receive a first output of the first block; and a first forward element coupled to receive a second output of the first block and an output of the delay.

17. The apparatus defined in claim 16 wherein the series of forward elements comprises:

a second forward element;

a forward negating element coupled to receive outputs of the second forward element; and a third forward element coupled to receive outputs of the forward negating element.

18. The apparatus defined in claim 16 wherein the series of elements comprises:

a second forward element;

a third forward element coupled to receive outputs of the second forward element; and a fourth forward element coupled to receive outputs of the third forward element.

19. The apparatus defined in claim 1 wherein the set of forward reversible transforms comprises:

a negating element;

a first delay coupled to receive a first output of the negating element;

a first forward element coupled to receive a second output of the negating element and an output of the first delay;

a second delay coupled to a first output of the first forward element; and a second forward element coupled to receive a second output of the first forward element and an output of the second delay.

20. A method for transforming input signals comprising:

separating the input signals into even and odd samples, the even and odd samples being integers;

applying a set of cascaded forward overlapped reversible transforms to the even and odd samples, where the set of forward reversible transforms are ladder filter elements in a finite impulse response (FIR) ladder configuration, and have integer inputs; and outputting output integers from the configuration with no redundancy in their least significant bits.

* * * * *

UNITED STATES PATENT AND TRADEMARK OFFICE
CERTIFICATE OF CORRECTION

PATENT NO. : 6,219,458 B1  
DATED : April 17, 2001  
INVENTOR(S) : Zandi et al.

Page 1 of 1

It is certified that error appears in the above-identified patent and that said Letters Patent is hereby corrected as shown below:

Column 30,
Line 49, delete "¼" and replace with -- ¾ --.

Signed and Sealed this

Twenty-ninth Day of January, 2002

Attest:

*Attesting Officer*

JAMES E. ROGAN
*Director of the United States Patent and Trademark Office*